(12) United States Patent
Rajagopalan et al.

(10) Patent No.: US 9,963,627 B2
(45) Date of Patent: May 8, 2018

(54) NANOSTRUCTURED PHASE CHANGE MATERIALS FOR SOLID STATE THERMAL MANAGEMENT

(71) Applicant: BIOASTRA TECHNOLOGIES INC., Boucherville (CA)

(72) Inventors: Sumitra Rajagopalan, Montreal (CA); Giovanni Alexander Fabra Prieto, Montreal (CA)

(*) Notice: Subject to any disclaimer, the term of this patent is extended or adjusted under 35 U.S.C. 154(b) by 128 days.

(21) Appl. No.: 14/441,835

(22) PCT Filed: Nov. 12, 2013

(86) PCT No.: PCT/CA2013/050860
§ 371 (c)(1),
(2) Date: May 8, 2015

(87) PCT Pub. No.: WO2014/071528
PCT Pub. Date: May 15, 2014

(65) Prior Publication Data
US 2015/0291868 A1   Oct. 15, 2015

Related U.S. Application Data

(60) Provisional application No. 61/724,460, filed on Nov. 9, 2012, provisional application No. 61/781,790, filed on Mar. 14, 2013.

(51) Int. Cl.
*C09K 5/00* (2006.01)
*C09K 5/02* (2006.01)
(Continued)

(52) U.S. Cl.
CPC .............. *C09K 5/02* (2013.01); *B82Y 30/00* (2013.01); *C08J 5/005* (2013.01); *C09D 5/26* (2013.01);
(Continued)

(58) Field of Classification Search
CPC .... C09K 5/02; C09K 5/00; C09K 5/06; C09K 5/063
(Continued)

(56) References Cited

U.S. PATENT DOCUMENTS 6,660,667 B2    9/2003   Zuckerman et al.
7,135,424 B2    11/2006  Worley et al.
(Continued)

FOREIGN PATENT DOCUMENTS

CN    101429423 A    5/2009
CN    102276843 A    12/2011
(Continued)

OTHER PUBLICATIONS

Frone, Adriana N. et al., "Preparation and Characterization of PVA Composites with Cellulose Nanofibers Obtained by Ultrasonication", Bioressources, Feb. 2012, vol. 6, No. 1, pp. 487-512.
(Continued)

*Primary Examiner* — Matthew Matzek
(74) *Attorney, Agent, or Firm* — BCF LLP

(57) ABSTRACT

Nanostructured phase change materials (PCMs) which are heterogeneous materials having at least two phases, at least one of the phases having at least one of its dimensions in the nanoscale, and comprising a first agent that undergoes an endothermic phase transition at a desired temperature and a second agent that assists in maintaining a nanostructure, are provided. There are also provided methods for manufacturing such PCMs, and applications thereof for providing thermoregulatory coatings and articles containing such coatings for use in a wide range of applications, such as cooling textiles, wipes, packaging, films, walls and building materials.

19 Claims, 31 Drawing Sheets

→ Box (6" X 6" X 6")

→ Stacked Papers simulating lamination

— Thermo Sensors

→ Dummy Product

(51) Int. Cl.

| | |
|---|---|
| *C09K 5/06* | (2006.01) |
| *C09K 5/14* | (2006.01) |
| *C09D 5/26* | (2006.01) |
| *C08J 5/00* | (2006.01) |
| *B82Y 30/00* | (2011.01) |
| *F28F 13/18* | (2006.01) |
| *F28F 21/06* | (2006.01) |
| *F28D 20/00* | (2006.01) |
| *F28D 20/02* | (2006.01) |

(52) U.S. Cl.
CPC ............ *C09K 5/14* (2013.01); *F28D 20/0056* (2013.01); *F28D 20/023* (2013.01); *F28D 20/025* (2013.01); *F28F 13/18* (2013.01); *F28F 21/067* (2013.01); *F28D 2020/0004* (2013.01); *F28F 2245/00* (2013.01); *F28F 2245/06* (2013.01); *F28F 2255/20* (2013.01); *Y02E 60/142* (2013.01); *Y02E 60/145* (2013.01)

(58) Field of Classification Search
USPC ............... 252/71, 73; 442/59; 428/364, 372; 977/773, 775, 778
See application file for complete search history.

(56) References Cited

U.S. PATENT DOCUMENTS

| | | | |
|---|---|---|---|
| 8,221,910 B2 | 7/2012 | Hartmann et al. | |
| 8,673,448 B2 | 3/2014 | Hartmann et al. | |
| 2005/0041406 A1* | 2/2005 | Matayabas, Jr. ........ | C09K 5/063 361/784 |
| 2007/0158611 A1 | 7/2007 | Oldenburg | |
| 2008/0233368 A1 | 9/2008 | Hartmann et al. | |
| 2008/0305027 A1 | 12/2008 | Johnston et al. | |
| 2009/0127116 A1* | 5/2009 | Thompson ....... | G01N 27/44747 204/461 |
| 2011/0121246 A1 | 5/2011 | Biggin et al. | |
| 2011/0123584 A1 | 5/2011 | Seidling et al. | |
| 2011/0193008 A1 | 8/2011 | Fieback et al. | |
| 2012/0018666 A1 | 1/2012 | Kuczynski et al. | |
| 2012/0187332 A1 | 7/2012 | Iruvanti et al. | |
| 2012/0225290 A1* | 9/2012 | Hartmann ............... | C08F 20/32 428/364 |
| 2013/0034732 A1 | 2/2013 | Parker et al. | |
| 2013/0256587 A1 | 10/2013 | Zheng et al. | |
| 2014/0085813 A1 | 3/2014 | Sedarous | |

FOREIGN PATENT DOCUMENTS

| | | |
|---|---|---|
| CN | 103666159 A | 3/2014 |
| KR | 101083817 B1 | 11/2011 |
| WO | 2010142623 | 12/2010 |

OTHER PUBLICATIONS

Li, Wei Dong et al., "Preparation and Characterization of Polyethylene terephthalate) Fabrics Treated by Blends of Cellulose Nanocrystals and Polyethylene Glycol", Journal of Applied Polymer Science, Jul. 2007, vol. 105, No. 2, pp. 373-378.
Lepoittevin, Benedicte et al., "Poly(e-caprolactone)lclay nanocomposites prepared by melt intercalation: mechanical, thermal and rheological properties", Polymer, 2002, vol. 43, iss. 14, pp. 4017-4023.
Johnston, James H., "Nano-Structured Calcium Silicate Phase Change Materials for Packaging Temperature Sensitive Products", "Nanocomposites and Polymers With Analytical Methods" edited by Dr. John Cuppoletti, Aug. 2011, Chapter 15, pp. 361-374.
Juarez D. et al., "Classification of phase change materials and his behaviour in SEBS/PCM blends", Proceedings of the 5th Manufacturing Engineering Society International Conference, Zaragoza, Jun. 2013.
Han Z.H. et al., "Synthesis of low-melting-point metallic nanoparticles with an ultrasonic nanoemulsion method", Ultrasonics 51, 2011, pp. 485-488.
Anderson, Ryan et al. "Forced Convection Heat Transfer of a Phase Change Material (PCM) Nanoemulsion", ASME 2013 Heat Transfer Summer Conference Collocated With the ASME 2013 7th International Conference on Energy Sustainability and the ASME 2013 11th International Conference on Fuel Cell Sience, Engineering and Technology, vol. 1, Jul. 2013, Paper No. HT2013-17810, pp. V001T01A023, 7 pages.
Fornunati, E. et al., "Cellulose Nanocrystals Extracted from Okra Fibers in PVA Nanocomposites", Journal of Applied Polymer Science, Jun. 2013, vol. 128, No. 5, pp. 3220-3230.
Cao, Xiadong et al., "New Nanocomposite Materials Reinforced with Flax Cellulose Nanocrystals in Waterborne Polyurethane", Biomacromolecules, 2007, vol. 8, pp. 899-904.
International Search Report, International Application No. PCT/CA2013/050860, dated Dec. 11, 2013.
Written Opinion, International Application No. PCT/CA2013/050860, dated Dec. 11, 2013.
CN 103666159 A (English, Machine Translated Text, May 8, 2014).
KR 101083817 A (English, Machine Translated Text, May 8, 2014).
CN 101429423 A (English, Machine Translated Text, May 8, 2014).
Supplementary European Search Report with regard to EP13852600 dated May 25, 2016.

* cited by examiner

A

B

A

B

A

B

A

B

A

B

A

B

NANOSTRUCTURED PHASE CHANGE MATERIALS FOR SOLID STATE THERMAL MANAGEMENT

FIELD OF THE INVENTION

This invention relates to nanostructured phase-change materials (PCMs) which are heterogeneous materials having at least two phases, at least one of the phases having at least one of its dimensions in the nanoscale, the nanostructured PCM comprising a first agent that undergoes an endothermic phase transition, and a second agent that assists in maintaining a nanostructure.

BACKGROUND OF THE INVENTION

Many polymers undergo an endothermic phase change within a specific temperature range. There are several types of such phase-change polymers. Low-melting polymers such as Poly(ethylene glycol), pluronic and Poly(caprolactone) undergo a melting transition at temperatures ranging from 15° C. to 60° C. Another class of polymers are the temperature-responsive polymers, that undergo a coil-to-globule transition at critical temperatures. For example, such polymers may undergo a phase change at a critical temperature known as the Lower Critical Solution Temperature (LCST) or at a critical temperature known as the Upper Critical Solution Temperature (UCST). At the LCST polymers transition from a single phase into a two-phase system. Such polymers include Poly(N-isopropylacrylamide), Hydroxypropyl methylcellulose (HPMC), and Poly (diethylacrylamide), among others. The LCST can also be observed for thermoresponsive polymers in the solid state (Liu and Urban, Macromolecules, 42(6) pp. 2161-2167, 2009). A critical temperature for phase change can be adjusted to a desired range through copolymerization with more hydrophilic polymers or hydrophobic polymers to increase or decrease the temperature, respectively. Some polymers are known to undergo a coil-to-globule transition, which is an endothermic phase transition and leads to significant heat absorption, generally in the range of about 50-200 J/g.

Many phase-change materials (PCMs) are known and have been used for thermoregulation, e.g., for keeping various articles within a desired temperature range or cooling the skin temperature of the human body. However, while maximum heat absorption can be achieved through an endothermic melting transition, known PCMs are unsuitable for application on articles such as textiles or packaging materials without an encapsulating agent, due to a need to contain the liquid produced by solid-liquid transitions. Thus, formulations used for thermoregulation typically include microencapsulating agents, such as urea-formaldehyde microcapsules, to contain liquid after melting. As these microcapsules do not naturally adhere to many substrates, such as textile or packaging substrates, fixative agents to promote adherence to substrates are further required.

These thermoregulatory formulations have several disadvantages. The presence of multiple components (e.g., microencapsulating agents, fixative agents) in a thermoregulatory formulation significantly reduces the proportion of pure PCM in the formulation and hence reduces its heat capacity. Furthermore, there is a limit to the quantity of a formulation that can be loaded on a surface, so that the presence of other components limits the amount of PCM that can be adhered to a surface. For example, phase change materials such as paraffin and salt hydrates absorb well over 200 kJ/kg, but encapsulation and inclusion as a textile finishing or co-spinning with cellulosic or polyester fabrics reduces their heat capacity to as little as 5 J/g in some cases (see, e.g., European Patent Application Publication No. P1846598A1). The need to saturate some substrates, such as textiles, with these PCMs has the effect of increasing thermal resistance of a textile, thus cancelling out the beneficial heat-absorbing effects of the PCM. In addition, known PCMs are short-lived, providing heat absorption for no longer than about 10 minutes, as well as flammable and/or irritating to the skin in the case of garments, or are too toxic to be in contact with food and biological products, in the case of packaging applications.

Use of nanocrystalline particles to improve mechanical properties of PCMs and to obtain solid-solid phase transitions has been reported. Yuan et al. (Yuan et al., Chinese Chemical Letters, Vol. 17, No. 8, pp 1129-1132, 2006) grafted PEG chains onto nanocrystalline particles to avoid the need to encapsulate the phase change material, and solid-solid phase transitions were obtained. However, the heat absorption capacity of the resulting nanocrystalline particles was far lower than the capacity of the starting material, resulting in poor performance as compared to encapsulated products already available. Such nanocrystalline particles therefore fail to overcome the limitations of existing PCMs.

There is a need therefore for improved PCMs that display a desired heat absorbing capacity, maintain their solid state form during phase transition, and/or do not require high amounts of fillers such as encapsulating agents or fixatives, in order to provide energy-dense PCMs and thermoregulatory formulations that maximize heat absorption using minimal quantities of material.

SUMMARY OF THE INVENTION

We report herein that at least some of the above shortcomings of present PCMs can be overcome using nanostructured phase-change materials (PCMs) which are heterogeneous materials having at least two phases, at least one of the phases having at least one of its dimensions in the nanoscale, the nanostructured PCM comprising a first agent that undergoes an endothermic phase transition, and a second agent that assists in maintaining a nanostructure.

According to a first aspect of the invention, there is provided herein a nanostructured phase-change material (PCM), comprising at least one first agent that undergoes an endothermic phase transition, e.g., that absorbs a significant amount of heat, in a desired temperature range or at a desired transition temperature, and at least one second agent, wherein the second agent assists in maintaining a nanostructure, and wherein the nanostructured PCM has at least two phases, at least one of the phases having at least one of its dimensions in the nanoscale. A nanostructured PCM of the invention may be, for example, a nanocomposite PCM or a PCM nanoemulsion. The first agent may comprise, for example, a phase-change polymer, a fatty acid, a fatty acid ester mixture, a low-melting small molecule, or a combination thereof. The second agent may be, for example, a nanocrystalline filler (in the case of a nanocomposite PCM), or an emulsifier, surfactant, film-forming polymer, or combination thereof (in the case of a PCM nanoemulsion). In either case, the second agent serves to assist in maintaining or reinforcing a nanostructure in at least one of the phases. In some embodiments, a second agent may enhance film-forming properties and/or mechanical properties of a nanostructured PCM. In some embodiments, a second agent may facilitate, enhance, help to form, and/or help to maintain a nanostructure in a nanostructured PCM. In an embodiment, a second agent may provide mechanical reinforcement for a phase-change polymer. In another embodiment, a second agent does not substantially adversely affect heat absorption of a phase-change polymer in a nanostructured PCM. In some embodiments, a second agent may increase heat absorption of a phase-change polymer in a nanostructured PCM.

As used herein, "nanoscale" dimensions refers to dimensions that are greater than or equal to one nanometer and less than or equal to one micron.

In a first embodiment, a nanostructured phase-change material is a nanocomposite phase-change material (PCM), the nanocomposite PCM comprising at least one phase-change polymer and a nanocrystalline filler having a high surface area to volume ratio, for example a high aspect ratio, wherein the at least one phase-change polymer and the nanocrystalline filler interact together non-covalently, and wherein the phase-change polymer undergoes a solid-solid phase transition or a coil-to-globule transition at a desired transition temperature. Non-covalent interactions include but are not limited to electrostatic attractions and hydrogen bonding. In an embodiment therefore, there are provided nanocomposite phase-change materials (PCMs) comprising a phase-change polymer reinforced with nanoparticles having a high aspect ratio. Accordingly, nanocomposite phase-change materials (PCMs) comprising a phase-change polymer reinforced with a nanocrystalline filler with a high aspect ratio, methods for making these PCMs, and applications thereof to provide thermoregulatory coatings are provided herein.

In a second embodiment, a nanostructured phase-change material is a PCM nanoemulsion, comprising a continuous phase having no heat-absorbing properties of its own, and a dispersed phase comprising droplets comprising at least one first agent that undergoes an endothermic phase transition, such as fatty acid esters, fatty acids, low molecular weight phase change polymers, phase-change polymers, or low-melting small molecules. This is in contrast to nanocomposite PCMs described herein in which the first agent is in the continuous phase rather than the dispersed phase. In an embodiment, a PCM nanoemulsion comprises a first agent such as a mixture of fatty acid esters encapsulated in nanodroplets stabilized by an emulsifier such as sodium caseinate.

In an embodiment, a PCM nanoemulsion of the invention has a dispersed phase comprising a first agent, e.g., a phase-change polymer, a low-molecular weight phase-change polymer, a mixture of fatty acid esters, etc., that melts in a desired temperature range to absorb large quantities of heat. When pure, a PCM nanoemulsion goes from a solid to a liquid at a transition temperature. In an embodiment, the dispersed phase of a PCM nanoemulsion forms droplets of about 200 nm or less when mixed under high shear, and an emulsifier, e.g., sodium caseinate, forms a thin interfacial layer around the droplets. At a critical particle size and a critical concentration, the PCM nanoemulsion assumes solid or solid-like properties, and the PCM nanoemulsion remains solid-like when heated to its transition temperature. The continuous (non-dispersed) phase (comprising, e.g., a polymer substrate and/or an emulsifier), together with the nanoscale domains and a certain critical volume fraction of the dispersed phase, is responsible for the PCM nanoemulsion maintaining a solid or solid-like phase throughout the phase transition and does not affect the overall enthalpy of the phase transition. In another embodiment the continuous (non-dispersed) phase (comprising, e.g., a polymer substrate and/or an emulsifier) is responsible for the PCM nanoemulsion maintaining a solid or solid-like phase throughout the phase transition and actually increases the overall enthalpy of the phase transition. In an embodiment, no more than 5% of the continuous phase is required in the PCM nanoemulsion. In an embodiment, a PCM nanoemulsion is dried and used to coat a substrate, e.g., a paper, plastic or textile substrate. A dried nanoemulsion may form a solid film that adheres directly to a substrate and remains firm and solid throughout a phase transition.

In an embodiment, the continuous phase of a PCM nanoemulsion comprises an emulsifier. An emulsifier for use in a PCM nanoemulsion may be a surfactant, such as but not limited to Tween, Sodium Dodecyl Sulphate (SDS), Pectin, Egg Lecithin, Span, or a combination thereof. In another embodiment, an emulsifier for use in a PCM nanoemulsion is sodium caseinate.

In an embodiment, the dispersed phase of a PCM nanoemulsion comprises a first agent that undergoes an endothermic phase transition at a desired transition temperature. Non-limiting examples of first agents for use in PCM nanoemulsions include phase-change polymers, fatty acids, fatty acid esters, paraffins, oligomers of PEG, hydrophilic polymers, low-melting small molecules, or combinations thereof. In an embodiment, a first agent for use in a PCM nanoemulsion is a mix of fatty acid esters, e.g., methyl palmitate and methyl stearate. In another embodiment, a first agent for use in a PCM nanoemulsion is PEG. In another embodiment, a second agent for use in a PCM nanoemulsion (which will form the continuous phase of the nanoemulsion) is a hydophilic polymer such as poly(vinyl alcohol) (PVA), poly(vinyl pyrrolidone) (PVP), hydroxypropyl cellulose (HPC), or chitosan. In an embodiment, a PCM nanoemulsion is dispersed in a solvent such as water or a dilute solution of a hydrophilic polymer.

In one embodiment, a PCM nanoemulsion comprises fatty acid esters stabilized with sodium caseinate and dispersed either in water or a dilute solution of a polymer such as poly(vinyl alcohol). In an embodiment, a PCM nanoemulsion comprises a first agent comprising a mix of fatty acid esters, e.g., methyl palmitate and methyl stearate, and a second agent comprising sodium caseinate. In one embodiment, the ratio of sodium caseinate:fatty acid ester (w/w) in such PCM nanoemulsions is from about 1:05 to about 1:45. In another embodiment, a PCM nanoemulsion comprises a first agent comprising a mix of 80% methyl palmitate and 20% methyl stearate and the first agent is dispersed in a water-based starch solution. In yet another embodiment, a PCM nanoemulsion comprises a first agent comprising a mix of 80% methyl palmitate and 20% methyl stearate and the first agent is dispersed in a water-based poly(vinyl alcohol) solution. In further embodiments, a PCM nanoemulsion comprises a first agent comprising a mix of fatty acid esters, e.g., 80% methyl palmitate and 20% methyl stearate, and a second agent comprising sodium caseinate, and the PCM nanoemulsion is dispersed in a water-based starch solution or a water-based poly(vinyl alcohol) solution.

In an embodiment, a first agent undergoes an endothermic phase transition which is a solid-solid phase transition or a coil-to-globule transition or a crystalline-amorphous transition. In another embodiment, the transition temperature is 30-39° C., 35-37° C., 20-24° C., 25-30° C., 35-40° C., or 33-40° C. In an embodiment, 50-200 J/g of heat is absorbed or released during a solid-solid phase transition. In another embodiment, about 50-200 J/g, at least about 50 J/g, at least about 100 J/g, or at least about 150 J/g of heat is absorbed or released during a solid-solid phase transition. In an embodiment, heat absorption of a first agent, e.g., a phase-change polymer, is not substantially adversely affected by a nanocrystalline filler. In another embodiment, a nanocrystalline filler enhances heat absorption of a first agent, e.g., a phase change polymer, for example by increasing heat absorption by at least about 10%, or by at least about 5-10%.

In an embodiment, a phase-change polymer is poly(ethylene glycol) (PEG). PEG may be, for example, PEG400, PEG500, PEG600, PEG650, PEG800, PEG900, PEG950, PEG1000, PEG1050, PEG1500, PEG2000, PEG2500, PEG3000, PEG3500, or PEG20,000. Alternatively, PEG may be a mixture of PEG of different molecular weights selected such that the PEG mixture undergoes a solid-solid phase transition at a desired transition temperature. In another embodiment, PEG may be mixed with other components selected such that the mixture undergoes a phase transition at a desired temperature; for example, a mixture of PEG with a freezing point depressant such as glycerol may be used, to obtain a desired transition temperature for the phase-change polymer.

In another embodiment, a phase-change polymer has the following structure:

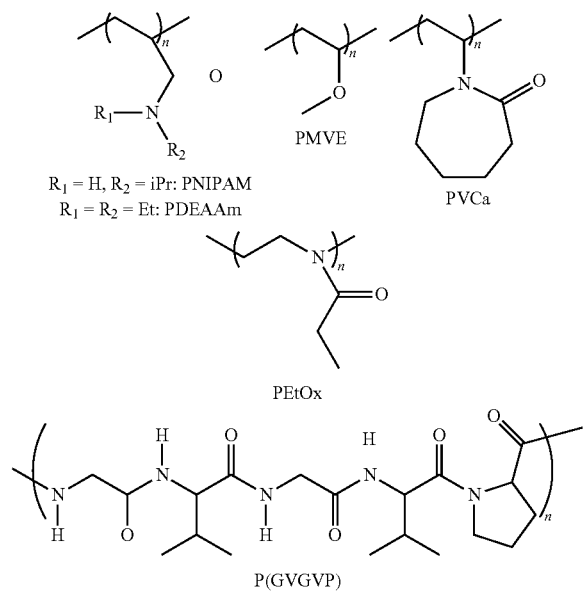

$R_1 = H, R_2 = iPr$: PNIPAM
$R_1 = R_2 = Et$: PDEAAm
PMVE
PVCa
PEtOx
P(GVGVP)

wherein n is selected such that the phase-change polymer undergoes a solid-solid phase transition at the desired transition temperature. In one embodiment, 1<n<1000. In another embodiment, n is selected such that the phase-change polymer undergoes a solid-solid phase transition at about 30-39° C., 35-37° C., 20-24° C., 25-30° C., 35-40° C., or 33-40° C.

In another embodiment, a phase-change polymer is pluronic.

In an embodiment, a nanocrystalline filler is nanocrystalline cellulose (NCC). In another embodiment, a nanocrystalline filler is a nanocrystalline starch, a nanoclay, graphene, a carbon nanotube, an organic nanoclay, or an organoclay. For example, a nanocrystalline filler may be montmorillonite, bentonite, kaolinite, hectorite, or halloysite. In another embodiment, a nanocrystalline filler can be nanofibers of a range of polymers including, but not limited to, liquid crystalline polymers such as Poly(γ-benyzl glutamate). In an embodiment, a nanocrystalline filler may be zinc oxide particles.

In one embodiment, a nanocrystalline filler is a clay. In some embodiments, a nanocrystalline filler has a high surface area to volume ration, e.g., a nanocrystalline filler may be spherical. In some embodiments, a nanocrytalline filler has a high aspect ratio, i.e., a high length-to-diameter ratio.

In an embodiment, a nanocomposite PCM comprises no more than about 5% nanocrystalline filler by weight. In another embodiment, a nanocomposite PCM comprises no more than about 3 wt %, about 5 wt %, about 8 wt %, about 5-8 wt %, about 10 wt %, or about 25 wt % of nanocrystalline filler. In yet another embodiment, a nanocomposite PCM comprises about 5 wt % to about 25 wt % nanocrystalline filler. In some embodiments, a nanocomposite PCM comprises at least about 90% or at least about 95% of phase-change polymer by weight.

In one embodiment, a nanocomposite PCM is a dispersion in a solvent, e.g., water.

In another embodiment, a nanocomposite PCM comprises a nanocrystalline filler dispersed within a phase-change polymer.

In an embodiment, a nanocrystalline filler has a high surface area to volume ratio, e.g., a high aspect ratio, e.g., an aspect ratio of at least about 20:1, or at least about 30:1.

In another aspect of the invention, a nanostructured PCM is capable of forming a thermoregulatory coating on a substrate. For example, a nanostructured PCM may bind to a substrate via simple adhesion, crosslinking, or grafting, optionally in the presence of a fixative or a crosslinking agent.

In a further aspect of the invention, there are provided thermoregulatory coatings on a substrate comprising nanostructured PCMs of the invention. In an embodiment, a thermoregulatory coating comprises a first nanostructured PCM layer which undergoes a solid-solid phase transition at 25-30° C. A thermoregulatory coating may further comprise a second nanostructured PCM layer which undergoes a solid-solid phase transition at 30-37° C. In another embodiment, a thermoregulatory coating undergoes a solid-solid phase transition at about 30-39° C., 35-37° C., 20-24° C., 25-30° C., 35-40° C., or 33-40° C. In some embodiments, a thermoregulatory coating further comprises a third layer comprising a sweat solubilization agent such as xylitol, maltitol, sorbitol, erythritol, or starch.

In an embodiment, a thermoregulatory coating absorbs or releases about 50-200 J/g, at least about 50 J/g, at least about 100 J/g, at least about 150 J/g, or at least about 200 J/g of heat during a solid-solid phase transition. In another embodiment, a thermoregulatory coating is loaded onto the substrate at a loading ratio of no more than 10, 20, 30 or 40 grams PCM/m² of substrate. In some embodiments, a thermoregulatory coating is non-flammable, non-toxic, food-safe, and/or non-irritating to skin.

In some embodiments, a thermoregulatory coating further comprises an additive for water absorption and/or an infrared (IR)-reflective component or layer.

In an embodiment, a nanocrystalline filler performs a secondary function, in addition to providing mechanical reinforcement for a nanocomposite PCM. For example, ZnO nanoparticles or fibres can also reflect incident IR or heat radiation, thus enhancing thermal buffering properties of nanocomposite PCMs comprising such nanocrystalline fillers. In an embodiment, therefore, a nanocrystalline filler comprises ZnO nanoparticles or other nanoparticles or fibres that reflect incident IR or heat radiation.

In an embodiment, a nanocomposite PCM further comprises low-molecular weight additives, e.g., fatty acids, which either enhance heat absorption or enthalpy and/or shift the transition temperature of a phase-change polymer as desired. In one embodiment, a nanocomposite PCM further comprises a freezing point depressant. Non-limiting examples of freezing point depressants include: salts such as sodium chloride, calcium chloride, potassium chloride, and magnesium chloride; ethylene glycol, glycerol, sorbitol, lactitol, sucrose, lactose, palatinol, erythritol, corn syrup, xylitol, lactose and other polyols; and fatty acids. It should be understood that many freezing point depressants are known in the art and may be used, provided their chemistry is compatible with the phase-change polymer or the nanocomposite PCM.

Other methods of shifting the transition temperature of a phase-change polymer are known in the art and may be used, in order to obtain a desired transition temperature for a phase-change polymer. For example, melting point of a phase-change polymer may be modulated through fractionation of polymers to extract only those of a certain molecular weight. For example, monodisperse PEG 600 has a transition point of 25° C., whereas the transition point of monodisperse PEG 5000 is 63° C. Transition temperature of thermoresponsive polymers can also be modulated through copolymerization with hydrophilic or hydrophobic comonomers to increase or decrease LCST, respectively. For example, copolymerizing NIPAAM with butyl acrylate decreases LCST, whereas copolymerization with acrylamide increases LCST.

In an embodiment, a phase-change polymer is mixed with a component which modulates the transition temperature of the phase-change polymer, so that a desired transition temperature is obtained. The component may be, e.g., a low molecular weight compound such as a fatty acid, or a freezing point depressant. In one embodiment, the component modulates the transition temperature without substantially adversely affecting heat absorption or enthalpy of the phase-change polymer. In another embodiment, the component increases heat absorption or enthalpy of the phase-change polymer, e.g., by at least about 5-10%.

In another embodiment, a nanostructured PCM, e.g., a nanocomposite PCM or a PCM nanoemulsion, comprises more than one phase-change polymer, e.g., two phase-change polymers. Combining more than one phase-change polymer may be advantageous to provide a polymer having desired properties, such as desired thermoregulatory or mechanical properties, e.g., a desired tensile modulus. In an embodiment, two phase-change polymers are combined to form a "double gel" polymer having mechanical properties, e.g., tensile modulus, much higher than that of a single phase-change polymer. In another embodiment, a second phase-change polymer may enhance adhesion of a nanostructured PCM to a substrate, without affecting the core thermal properties of the first phase-change polymer or of the nanostructured PCM. Phase-change polymers are typically combined prior to reinforcement with a nanocrystalline filler to form a nanocomposite PCM.

In an embodiment, porosity is induced in a nanostructured, e.g., a nanocomposite, PCM. Porosity may be induced using various techniques known in the art, including but not limited to foaming, addition of salts, mixed solvents and temperature-induced phase separation. A resulting porous nanocomposite may allow for better air circulation, thus enhancing thermal management.

Nanostructured PCMs (e.g., nanocomposite PCMs or PCM nanoemulsions) and thermoregulatory coatings may be applied to a wide range of substrates. In an embodiment, a substrate is a textile, a packaging material, a wipe, a package, a film, a packaging film, a wall, or a building material. For example, products may be packaged in a variety of packaging materials, e.g., paper containers, paper boxes, cardboard boxes, plastic containers, etc., which may be coated using PCMs and thermoregulatory coatings of the invention.

In an embodiment, thermoregulatory coatings have a cooling effect. A coating may, for example, provide a cooling effect for at least 30 minutes, and/or provide a cooling effect of about 5-10° C.

It should be understood that, as used herein, "cooling effect" and "warming effect" in relation to a subject or an article worn by a subject (such as a cooling garment), refers to a subject's perception of cooling or temperature change, rather than to a reduction in the subject's core body temperature. In other embodiments, "cooling effect" and "warming effect" may refer to a change in temperature of an article. In relation to inanimate articles such as shipping, storage or packaging containers/equipment, construction materials, electronics, and the like, a cooling effect or warming effect may refer to an actual change in temperature of the article. It will be readily understood by a skilled artisan whether the term "cooling effect" or "warming effect" in a particular instance is being used to refer to a subject's perception or to a change in temperature of an inanimate article.

In some embodiments, thermoregulatory coatings have a warming effect. Depending on fluctuations in temperature and the direction of a temperature change, heat may be released due to the exothermic nature of a solid-solid phase change. A coating may, for example, provide a warming effect for at least 30 minutes, and/or provide a warming effect of about 5-10° C.

In another aspect of the invention, there are provided articles coated with nanostructured PCMs (e.g., nanocomposite PCMs or PCM nanoemulsions) or thermoregulatory coatings described herein. For example, an article which is a cooling garment may be provided. A cooling garment may, in one example, undergo multiple endothermic phase transitions such that at least 200 J/g of heat is absorbed overall at a transition temperature range of 29-40° C. or 20-25° C., and/or provide a cooling effect to a subject wearing the garment of about 5-10° C. In an embodiment, an article provides a cooling effect which persists for at least 30 minutes, at least 45 minutes, at least 60 minutes, at least 75 minutes, at least 90 minutes, or at least 120 minutes.

In some embodiments, an article may also comprise a coating that reflects IR radiation or solar heat and/or a coating that solubilizes sweat and/or absorbs moisture.

In some embodiments, an article is a material for food packaging, e.g., a material for packaging chocolate. In some embodiments, an article is a material for transportation packaging (such as a disposable, paper or cardboard box) to provide thermal protection of temperature-sensitive products such as food, blood, plasma, and other medical products.

In an embodiment, a cooling garment's breathability, flexibility, softness, feel and/or hand is substantially the same as that of an uncoated garment.

In yet another aspect of the invention, there are provided kits comprising nanostructured PCMs described herein and instructions for use thereof to apply thermoregulatory coatings to a substrate or article.

In an aspect, there are provided textiles and/or packaging materials comprising nanostructured PCMs or thermoregulatory coatings described herein. Articles comprising these textiles or packaging materials are also provided.

In a further aspect, there are provided methods for preparing thermoregulatory coatings on a substrate or article. In an embodiment, such methods include the following steps: (a) optionally pretreating the surface of a substrate or article by washing and cleaning the surface to remove contaminants; (b) applying a solution comprising a nanostructured PCM to a substrate or article, optionally in the presence of an additive or a crosslinking agent, and mixing; and (c) curing the solution, such that a thermoregulatory coating is prepared on the substrate or article. In some embodiments, a solution comprising a nanostructured PCM is applied directly onto a substrate or article and then dried to form a coating, without the need for encapsulants or binders.

In one embodiment, there is provided herein a nanostructured phase-change material (PCM), the PCM comprising at least one first agent and at least one second agent, wherein the nanostructured phase-change material comprises at least two phases, at least one of which has dimensions in the nanoscale, wherein the first agent undergoes an endothermic phase transition at a desired transition temperature, and wherein the second agent assists in maintaining the nanoscale dimensions. In one embodiment, the nanostructured PCM is a nanocomposite phase-change material (PCM), the nanocomposite PCM comprising at least one phase-change polymer and a nanocrystalline filler having a high surface area to volume ratio, e.g., a high aspect ratio, wherein the at least one phase-change polymer and the nanocrystalline filler interact together non-covalently, and wherein the nanocomposite undergoes a solid-solid phase transition or a coil-to-globule transition at a desired transition temperature. In another embodiment, the nanostructured PCM is a PCM nanoemulsion, the PCM nanoemulsion comprising at least one first agent and at least one second agent, wherein the at least one first agent is dispersed in nanodroplets, which may be stabilized by the at least one second agent. The at least one first agent may be, for example, a phase-change polymer, a fatty acid, a fatty acid ester, a low-melting small molecule, or a mixture thereof. The at least one second agent may be, for example, an emulsifier, a surfactant, a film-forming polymer, or a combination thereof. In yet another embodiment, the PCM nanoemulsion further comprises a non phase-change polymer or a film-forming polymer. In an embodiment, the emulsifier is a surfactant.

In an embodiment, a nanostructured PCM undergoes a solid-solid phase transition or a coil-to-globule transition. Its transition temperature may be, e.g., 30-39° C., 35-37° C., 20-24° C., 20-25° C., 25-30° C., 35-40° C., or 33-40° C. In an embodiment, 50-200 J/g of heat is absorbed or released during the solid-solid phase transition. In another embodiment, about 50-200 J/g, at least about 50 J/g, at least about 100 J/g, or at least about 150 J/g of heat is absorbed or released during the solid-solid phase transition of a nanostructured PCM (e.g., of a nanocomposite PCM or a PCM nanoemulsion). In an embodiment, heat absorption of the phase-change polymer in the nanostructured PCM is not substantially adversely affected by the second agent or is increased by the second agent, e.g., by at least about 5-10%.

In an embodiment, the phase-change polymer in a nanostructured PCM is poly(ethylene glycol) (PEG). The PEG may be, for example, PEG400, PEG500, PEG600, PEG650, PEG800, PEG900, PEG950, PEG1000, PEG1050, PEG1500, PEG2000, PEG2500, PEG3000, PEG3500, or PEG 20,000, or the PEG my be a mixture of PEG of different molecular weights selected such that the PEG mixture undergoes the solid-solid phase transition at the desired transition temperature.

In an embodiment, the phase-change polymer in a nanostructured PCM has the following structure:

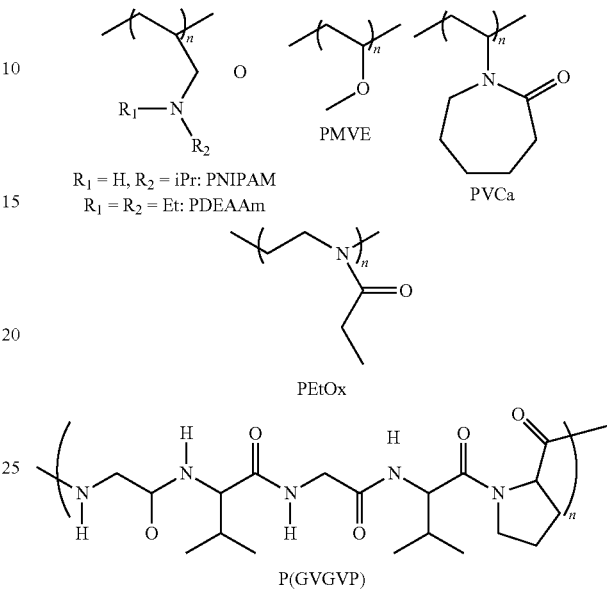

wherein n is selected such that the phase-change polymer undergoes a solid-solid phase transition at the desired transition temperature. In an embodiment, n is selected such that the phase-change polymer undergoes a solid-solid or a coil-to-globule phase transition at about 30-39° C., 35-37° C., 20-24° C., 20-25° C., 25-30° C., 35-40° C., or 33-40° C. In another embodiment, 1<n<1000.

In an embodiment, a first agent that undergoes an endothermic phase transition for use in a nanostructured PCM is a phase-change polymer, a fatty acid, a fatty acid ester, a paraffin, an oligomer of PEG, a hydrophilic polymer, or a combination thereof. In an embodiment, a first agent that undergoes an endothermic phase transition for use in a nanostructured PCM nanoemulsion is a mix of fatty acid esters, e.g., methyl palmitate and methyl stearate. In another embodiment, a second agent for use in a nanostructured PCM is a hydrophilic polymer such as poly(vinyl alcohol) (PVA), poly(vinyl pyrollidone)(PVP), hydroxyl(propyl cellulose) (HPC) or chitosan. In an embodiment, such polymers are film-forming polymers.

In an embodiment, a second agent is a nanocrystalline filler such as nanocrystalline cellulose (NCC) or a clay. In some embodiments, the second agent is a nanocrystalline starch, a carbon nanotube, graphene, an organic nanoclay, or an organoclay. An organoclay may be montmorillonite, bentonite, kaolinite, hectorite, or halloysite. In an embodiment, a nanocrystalline filler reflects IR radiation, e.g., is a metal oxide nanoparticle such as Zinc oxide (ZnO) and/or Titanium oxide (TiO2).

In other embodiments, a second agent is an emulsifier, e.g, a surfactant, a polymer solution (e.g., PVA), a non phase-change polymer, a film-forming polymer, or a combination thereof. For example, the second agent may be sodium caseinate, Tween, Sodium Dodecyl Sulphate (SDS), Pectin, Egg Lecithin, Span, or a combination thereof. Alternatively, a second agent may comprise both a surfactant and a polymer, such as PVA or chitosan or a non phase-change or film-forming polymer. It should be understood that any emulsifier, surfactant, and/or polymer with good film-forming properties may be used in PCM nanoemulsions described herein.

In an embodiment, a nanostructured PCM is a PCM nanoemulsion comprising fatty acid esters stabilized with sodium caseinate in a continuous phase of poly(vinyl alcohol) or other polymer known for its good film-forming properties.

In an embodiment, a nanostructured PCM is a nanocomposite PCM comprising no more than about 5% nanocrystalline filler by weight. In another embodiment, a nanostructured PCM is a nanocomposite PCM comprising no more than about 3 wt %, about 5 wt %, about 8 wt %, about 5-8 wt %, about 10 wt %, or about 25 wt % of nanocrystalline filler, or comprising about 5 wt % to about 25 wt % nanocrystalline filler.

In an embodiment, a nanocomposite PCM comprises at least about 90% or at least about 95% of phase-change polymer by weight.

In an embodiment, a nanostructured PCM is a nanocomposite PCM, wherein the phase-change polymer is dispersed in the nanocrystalline filler to form a solid solution.

In another embodiment, a nanostructured PCM is a PCM nanoemulsion, wherein the first agent that undergoes an endothermic phase transition at a desired transition temperature is in a dispersed phase, and the second agent that maintains a nanostructure is in a continuous phase.

In some embodiments, nanostructured PCMs are capable of forming a thermoregulatory coating on a substrate. A nanostructured PCM may bind to a substrate via simple adhesion, crosslinking, or grafting, optionally in the presence of a fixative or a crosslinking agent.

In some embodiments, there are provided thermoregulatory coatings on a substrate comprising a nanostructured PCM, e.g., a nanocomposite PCM or a PCM nanoemulsion, described herein. In an embodiment, a thermoregulatory coating comprises a first nanostructured PCM layer which undergoes a solid-solid phase transition at 25-30° C. In another embodiment, a coating further comprises a second nanostructured PCM layer which undergoes a solid-solid phase transition at 30-37° C. In an embodiment, a thermoregulatory coating undergoes a solid-solid phase transition at about 30-39° C., 35-37° C., 20-24° C., 20-25° C., 25-30° C., 35-40° C., or 33-40° C. In another embodiment, a thermoregulatory coating further comprises a third layer comprising a sweat solubilization agent such as xylitol, maltitol, sorbitol, erythritol, or starch.

In an embodiment, a thermoregulatory coating absorbs or releases about 50-200 J/g, at least about 50 J/g, at least about 100 J/g, at least about 150 J/g, or at least about 200 J/g of heat during a solid-solid phase transition.

In an embodiment, a thermoregulatory coating is loaded onto a substrate at a loading ratio of no more than 10, 20 or 30 grams PCM/m$^2$ of substrate. In another embodiment, a thermoregulatory coating is non-flammable, non-toxic, food-safe, and/or non-irritating to skin.

In an embodiment, a thermoregulatory coating further comprises an additive for water absorption. In another embodiment, a thermoregulatory coating further comprises a IR-reflective component or layer.

In an embodiment, a substrate is a textile or a packaging material, e.g., a box, e.g., a paper or cardboard box.

In an embodiment, a thermoregulatory coating provides a cooling effect for at least 30 minutes.

In another aspect, there are provided herein articles coated with nanostructured PCMs, e.g., nanocomposite PCMs or PCM nanoemulsions, described herein, or articles comprising thermoregulatory coatings described herein. An article may be, for example, a cooling garment, or a box for transporting materials. A cooling garment or a box may undergo multiple endothermic phase transitions and at least 200 J/g of heat may be absorbed overall at a transition temperature range of 29-40° C. An article may further comprise a coating that reflects IR radiation or solar heat. An article may further comprise a coating that solubilizes sweat and/or that absorbs moisture. In an embodiment, an article provides a cooling effect which persists for at least 30 minutes, at least 45 minutes, at least 60 minutes, at least 75 minutes, at least 90 minutes, or at least 120 minutes. In another embodiment, a cooling garment provides a cooling effect to a subject wearing the garment of about 5-10° C. In an embodiment, an article is a material for food packaging, e.g., for packaging chocolate. In an embodiment, an article, e.g., a cooling garment or box, undergoes multiple endothermic phase transitions and at least 200 J/g of heat is absorbed overall at a transition temperature range of 20-25° C. In an embodiment, a cooling garment's breathability, flexibility, softness, feel and/or hand is substantially the same as that of an uncoated garment.

In another aspect of the invention, there is provided a kit comprising a nanostructured PCM of the invention, e.g., a nanocomposite PCM or a PCM nanoemulsion, and instructions for use thereof to apply a thermoregulatory coating to a substrate or article.

Textiles and packaging materials comprising nanostructured PCMs of the invention, e.g., a nanocomposite PCM or a PCM nanoemulsion, are provided herein.

In another aspect of the invention, there is provided a method for preparing a thermoregulatory coating on a substrate or article, comprising optionally pretreating the surface of the substrate or article by washing and cleaning the surface to remove contaminants; applying a solution comprising a nanostructured PCM to the substrate or article, optionally in the presence of an additive or a crosslinking agent, and mixing; and curing the solution, such that a thermoregulatory coating is prepared on the substrate or article.

In an embodiment, the aspect ratio of a nanocrystalline filler is at least about 20:1 or at least about 30:1.

In another embodiment, a nanostructured PCM further comprises a component which shifts the transition temperature of a first agent, e.g., a phase-change polymer, such that the first agent undergoes a solid-solid phase transition at a desired transition temperature. The component may be, for example, a freezing point depressant such as sodium chloride, calcium chloride, potassium chloride, magnesium chloride, ethylene glycol, glycerol, sorbitol, lactitol, sucrose, lactose, palatinol, erythritol, corn syrup, xylitol, lactose, a fatty acid, or a combination thereof. In some embodiments, the heat absorption of the first agent, e.g., a phase-change polymer, in a nanostructured PCM is not substantially adversely affected by the component. In some embodiments, the heat absorption of the phase-change polymer is increased by the component, e.g., by at least about 5-10%.

There are provided herein, in an embodiment, solid-state Polymer-based nanostructured Phase Change Materials that can be directly coated from solution or melted on paper, plastic or textile to form an adherent, functional film without the need for encapsulants or binders. In some embodiments, the presence of high-aspect ratio nanosized fillers in the PCM ensures that the PCM maintains its solid state during a phase transition without reducing the enthalpy of the phase transition, thus making it suitable for applications such as packaging, textiles and construction coatings where direct coating on a substrate is preferred. In one embodiment, there is provided a formulation that is a PCM nanoemulsion in which a mixture of fatty acid esters are encapsulated in nanodroplets stabilized by sodium caseinate. The sodium caseinate acts as a surfactant or emulsifier. In another embodiment, there is provided a formulation that is a nanocomposite PCM in which a high-aspect ratio nanosized filler such as a nanoclay or NCC is dispersed in a known phase-change polymer such as PEG. In yet another embodiment, a first agent comprises two materials with phase-change properties (e.g., PEG and a polyalcohol) mixed together in order to form a homogeneous first agent for use in a nanostructured PCM with a solid-solid transition. In this embodiment, a polyalcohol may also behave as a filler to reinforce the first agent or PEG matrix.

In one embodiment, therefore, a first agent comprises a mixture of a phase-change polymer, e.g., PEG, and a polyalcohol. In another embodiment, a first agent comprises a polyalcohol.

In an embodiment, there is provided a nanostructured PCM providing an endothermic solid-solid or coil-to-globule phase transition which can be directly coated onto packaging substrates, e.g., without the need for encapsulants or binders.

In an embodiment, there are provided nanocomposite PCMs wherein a small quantity of filler, e.g., between about 5% and about 10%, is sufficient to ensure that a solid state is maintained post-phase transition.

In some embodiments, nanostructured PCMs comprise additives that can shift the transition temperature to a desired temperature point or temperature range.

In some embodiments, a second agent can enhance the thermal management properties of a first agent in a nanostructured PCM. For example, this could occur where a second agent is a filler such as ZnO nanowires that reflect heat or such as aluminum oxide that scavenges oxygen.

In some embodiments, a second agent in a PCM nanoemulsion is sodium caseinate, modified starch or lecithin, which stabilize the particles in the dispersed phase comprising the first agent and provide, e.g., a product that can be coated onto paper. In an embodiment, nanostructured PCMs are encapsulated using a physicochemical process called coacervation, which is widely used in the food industry.

In some embodiments, a second agent in a PCM nanoemulsion is a high-melting polymer that is film-forming but that cannot in itself be used as a phase-change polymer, such as PVA. The presence of high-aspect ratio nanofillers ensures a solid state transition.

BRIEF DESCRIPTION OF THE DRAWINGS

For a better understanding of the invention and to show more clearly how it may be carried into effect, reference will now be made by way of example to the accompanying drawings, which illustrate aspects and features according to embodiments of the present invention, and in which.

DETAILED DESCRIPTION OF THE INVENTION

Figure 1:
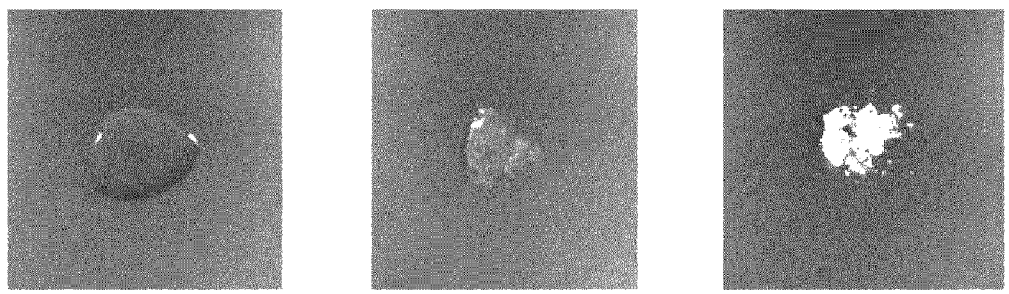
FIG. 1 shows pictures of nanocomposite PCM samples heated to 80° Celsius. Samples are, from left to right: pure PEG (MW 1000 g/mol); PEG with 5% NCC; and PEG with 25% NCC. Addition of NCC maintained a solid crystalline state of the mixture, well beyond the phase transition temperature of PEG1000.

We report herein the preparation and use of heterogeneous nanostructured phase-change materials (PCMs) comprising a first agent and a second agent. Nanostructured PCMs provided herein form thermoregulatory coatings on a wide range of substrates and articles.

As used herein, a "first agent" in a nanostructured PCM is a material that undergoes an endothermic phase transition at a desired transition temperature. Non-limiting examples of first agents for use in nanostructured PCMs include phase-change polymers, fatty acids, fatty acid esters, low-melting small molecules, and mixtures thereof. An endothermic phase transition may be a coil-to-globule transition, a crystalline-amorphous melting transition, or a solid-solid phase transition. It should be understood that any low-melting molecule, e.g., any molecule undergoing a phase transition at a desired transition temperature (e.g., 30-39° C., 35-37° C., 25-30° C., 20-24° C., 35-40° C., or 33-40° C.) can be used as a first agent in nanostructured PCMs of the invention.

As used herein, a "second agent" in a nanostructured PCM is a material that assists in maintaining a nanostructure. Non-limiting examples of second agents include nanocrystalline fillers having a high aspect ratio, emulsifiers, surfactants, and film-forming polymers.

The endothermic nature of coil-to-globule phase transitions or crystalline-amorphous melting transitions, e.g., solid-solid phase transitions, has been well-established. However, it has not previously been possible to use polymers undergoing such transitions as phase-change materials without the use of encapsulating agents or large amounts of filler, which present numerous disadvantages. The present invention is based, at least in part, on the inventors' use of phase-change polymers in heterogeneous phase-change materials which have at least two phases, at least one of which has at least one of its dimensions in the nanoscale. These heterogeneous phase-change materials, referred to herein as nanostructured phase-change materials (PCMs), comprise a first agent that undergoes an endothermic phase transition at a desired transition temperature and a second agent that maintains a nanostructure, i.e., facilitates presence of at least one phase with dimensions in the nanoscale. The inventors have found that endothermic phase-transition materials at the nanoscale have surprising properties not seen in bulk preparations which allow for provision of PCMs which can overcome at least some disadvantages in the art.

In an aspect of the invention, we report herein the surprising finding that small amounts of a nanocrystalline filler forms a nanocomposite with a phase-change polymer that has the advantageous effect of maintaining a solid-solid phase transition, either without substantially adversely altering the phase-change polymer's thermal properties, or in some embodiments, enhancing the phase-change polymer's thermal properties. In other words, a small amount of nanocrystalline filler is sufficient to reinforce a phase-change polymer structurally to maintain its solid state during phase change, without substantially decreasing the heat absorption capacity or enthalpy of the phase change, or in some cases even increasing it. This finding provides novel nanocomposite PCMs which do not require high amounts of fillers such as encapsulating agents, reinforcing agents, or fixatives, and can therefore maximize heat absorption using minimal quantities of material.

In another aspect of the invention, we report herein the surprising finding that an endothermic phase change material, fatty acid ester, oligomer, low-molecular weight molecule (or other "first agent") dispersed in a solution, in the presence of an emulsifier and/or a polymeric solution so as to form a nanoemulsion, can also maximize heat absorption using minimal quantities of material, due to the nanoscale structure of the dispersed first agent.

Thus, diverse nanostructured PCMs are provided herein, which share the properties of: 1) maintaining a solid or solid-like state through an endothermic phase transition, and 2) having at least two phases, at least one of the phases having at least one of its dimensions in the nanoscale.

In some embodiments, nanostructured PCMs also share the property that the first agent's thermal properties are not substantially adversely altered, or in some embodiments, the first agent's thermal properties are enhanced, without requiring high amounts of fillers such as encapsulating agents, reinforcing agents, or fixatives, therefore maximizing heat absorption using minimal quantities of material.

Two main types of nanostructured PCMs are provided herein: nanocomposite PCMs and PCM nanoemulsions.

Therefore, in an embodiment there are provided herein nanostructured PCMs, e.g., nanocomposite PCMs and PCM nanoemulsions, which give improved performance in terms of heat absorption compared to phase-change materials known in the art, due to the small amount of reinforcing agent required to maintain a solid-solid phase transition. Unlike conventional composites, nanostructured PCMs, e.g., nanocomposites PCMs, may need no more than, e.g., 5-10% filler. Without wishing to be bound by theory, it is believed that nanocomposite PCMs may need only small amounts of filler since the high surface area to volume (e.g., high aspect) ratio of the nanocomposite ensures a very high reinforcement surface area. The reinforcement surface area is sufficiently large that a small quantity of filler is sufficient to prevent a phase-change polymer from melting into a liquid, thereby maintaining a solid-solid phase transition.

Likewise, the critical nanoscale dimensions of the dispersed phase in a PCM nanoemulsion, at the right volume fraction range, will lead to a PCM nanoemulsion having solid or solid-like properties in its natural state. Thereafter, this solid-like phase is maintained through the phase transition. It will be understood by the skilled artisan that, for every specific nanoemulsion system, there is a critical particle size and volume fraction at which the nanoemulsion becomes solid or solid-like. This volume fraction range depends on the specific nanoemulsion chemistry and a person skilled in the art will determine this ratio using standard methods, for example by varying concentration and particle size to find the right point on a phase diagram to provide the desired properties (see, e.g., McClements, D. J., Soft Matter: 7, pp. 2297-2316, 2011), which describes emergence of the solid state at a particular volume fraction).

As used herein, "phase-change polymer" refers to a polymer that undergoes an endothermic or exothermic phase change within a specific temperature range. Many types of phase-change polymers are known and may be used in nanostructured PCMs of the invention. In an embodiment, low-melting polymers such as Poly(ethylene glycol) or Poly(caprolactone), which undergo a melting transition at temperatures ranging from 15° C. to 65° C., are used. In another embodiment, temperature-responsive or thermosensitive polymers that display reverse solubility in water are used. Temperature-responsive or thermosensitive polymers are hydrophilic at low temperatures, but turn hydrophobic at a critical temperature known as the Lower Critical Solution Temperature (LCST). In an embodiment, phase-change polymers display a coil-to-globule transition at the LCST. The coil-to-globule transition is an endothermic phase transition and leads to significant heat absorption, generally in the range of about 50-200 J/g.

Many polymers display a coil-to-globule transition. Non-limiting examples of such polymers include Poly(N-isopropylacrylamide), Hydroxypropyl methylcellulose (HPMC), and Poly (diethylacrylamide). Any polymer undergoing an endothermic coil-to-globule transition at a desired LCST temperature may be used in nanostructured PCMs of the invention.

In an embodiment, phase-change polymers for use in nanostructured PCMs of the invention absorb about 50-200 J/g of heat during a coil-to-globule transition at 30-39° C. In another embodiment, phase-change polymers for use in nanostructured PCMs of the invention absorb at least about 50 J/g, at least about 100 J/g, or at least about 150 J/g of heat during a coil-to-globule transition at 30-39° C. In a further embodiment, phase-change polymers for use in nanostructured PCMs of the invention absorb about 50-200 J/g, at least about 50 J/g, at least about 100 J/g, or at least about 150 J/g of heat during a coil-to-globule transition at 35-37° C. In a still further embodiment, phase-change polymers for use in nanostructured PCMs of the invention absorb about 50-200 J/g, at least about 50 J/g, at least about 100 J/g, or at least about 150 J/g of heat during a coil-to-globule transition at 33-40° C. In yet another embodiment, phase-change polymers for use in nanostructured PCMs of the invention absorb about 50-200 J/g, at least about 50 J/g, at least about 100 J/g, or at least about 150 J/g of heat during a coil-to-globule transition at 25-30° C. In yet another embodiment, phase-change polymers for use in nanostructured PCMs of the invention absorb about 50-200 J/g, at least about 50 J/g, at least about 100 J/g, or at least about 150 J/g of heat during a coil-to-globule transition at 20-24° C. In an embodiment, phase-change polymers for use in nanostructured PCMs of the invention absorb about 50-200 J/g, at least about 50 J/g, at least about 100 J/g, or at least about 150 J/g of heat during a coil-to-globule transition at 35-40° C.

It is well-known in the art that the LCST of a temperature-responsive polymer can be adjusted to a desired temperature range through copolymerization with more hydrophilic polymers or hydrophobic polymers, to increase or decrease LCST, respectively. For example, LCST can be adjusted to a desired range, e.g., 30-39° C., 35-37° C., 25-30° C., 20-24° C., 35-40° C., or 33-40° C., through copolymerization with more hydrophilic or hydrophobic polymers, as appropriate. It should be understood that phase-change polymers for use in nanostructured PCMs of the invention include any combination of polymers undergoing a coil-to-globule transition at the desired LCST temperature range and providing a desired amount of heat absorption.

In an embodiment, phase-change polymers used in nanostructured PCMs of the invention maintain their solid state during the coil-to-globule phase transition, as evidenced, e.g., through rheological measurements. Thus, nanostructured PCMs undergo a solid-solid phase transition, in contrast to previously known PCMs which undergo other phase transitions, such as solid-liquid transitions. A solid-solid phase transition provides several advantages over previously known PCMs. For example, one or more of the following advantages may be provided: encapsulating agents are not needed in a nanostructured PCM; a higher loading ratio of phase-change polymer or nanostructured PCM (grams of phase-change polymer or PCM per substrate area) is obtained on a substrate; higher heat absorption is obtained on a substrate; there is no or minimal loss of heat capacity or heat absorption by a phase-change polymer; and/or energy-dense nanostructured PCMs that provide maximal heat absorption using minimal quantities of material are obtained.

In an embodiment, a phase-change polymer undergoes a phase transition, e.g., a coil-to-globule transition or a solid-solid phase transition, at a desired transition temperature. In some embodiments, the presence of nanofillers ensures that nanocomposite PCMs maintain their solid state through the transition.

In an embodiment, a loading ratio of no more than 10 grams PCM/m$^2$, no more than 20 grams PCM/m$^2$, no more than 30 grams PCM/m$^2$, no more than 40 grams PCM/m$^2$, no more than 50 grams PCM/m$^2$, or no more than 60 grams PCM/m$^2$ of substrate is obtained. In another embodiment, a loading ratio of at least 10 grams PCM/m$^2$, at least 20 grams PCM/m$^2$, at least 30 grams PCM/m$^2$, at least 40 grams PCM/m$^2$, at least 50 grams PCM/m$^2$, or at least 60 grams PCM/m$^2$ of substrate is obtained.

Any phase-change polymer that undergoes a phase transition at a desired transition temperature, e.g., melting point or LCST temperature, may be used in nanostructured PCMs of the invention. In an embodiment, any temperature-responsive polymer that undergoes a solid-solid phase transition at a desired LCST temperature may be used in nanostructured PCMs of the invention. It will be understood therefore that the choice of phase-change polymer will depend on several factors, such as the intended application of the nanostructured PCM and the desired transition temperature, e.g., LCST, for that application.

For example, textiles for thermal comfort applications require a phase transition between 33-40° C., which corresponds to the onset of heat stress in the case of textiles, and food spoilage in the case of packaging films. Thus, poly (ethylene glycol) (PEG) is an excellent phase-change polymer for use in textiles and packaging films, particularly as its melting point and high melting enthalpy is strongly correlated to its molecular mass (see FIG. 3). It is thus possible to fine-tune the required melting point or transition temperature by combining two or more PEGs of different molecular weight. PEG has the further advantage of being a non-toxic, skin-safe, and GRAS (Generally Regarded As Safe) polymer, which is already used in a variety of medical and food applications.

In an embodiment, a phase-change polymer for use in a nanostructured PCM of the invention is a low-melting polymer such as PEG or Poly(caprolactone) (PCL). In another embodiment, a phase-change polymer for use in a nanostructured PCM of the invention is a temperature-responsive polymer with an LCST such as Poly N-isopropylacrylamide (PNIIPAM) or HPMC.

In one embodiment, a phase-change polymer for use in a nanostructured PCM of the invention is PEG. For example, a phase-change polymer for use in a nanostructured PCM of the invention may be PEG1000, i.e., PEG of average molecular weight (MW) of 1000. In another embodiment, PEG950-1050 is used. In another embodiment, PEG900, PEG1100, or PEG1150 is used. In another embodiment, PEG 20K (i.e., PEG 20,000) is used. In another embodiment, PEG900-20K is used. In another embodiment, PEG of different molecular weights is mixed to give a PEG composition having a desired LCST temperature. It should be understood that PEG of any molecular weight, or any mixture of PEG of different molecular weights, may be used, as long as the resulting PEG or PEG mixture undergoes a solid-solid phase transition when reinforced with a nanocrystalline filler, e.g., nanoparticles, as described herein, at the desired transition temperature. In an embodiment, a PEG or PEG mixture which undergoes a solid-solid transition at 30-39° C., 35-37° C., 20-25° C., 20-24° C., 25-30° C., 35-40° C., or 33-40° C. is used.

In another embodiment, a nanostructured PCM comprises a first agent, e.g., a phase-change polymer, that undergoes a solid-solid phase transition or coil-to-globule phase transition at 30-39° C., 35-37° C., 20-25° C., 20-24° C., 25-30° C., 35-40° C., or 33-40° C. Any phase-change polymer having the property of undergoing a solid-solid phase transition or coil-to-globule phase transition at 30-39° C., 35-37° C., 20-25° C., 20-24° C., 25-30° C., 35-40° C., or 33-40° C. is contemplated for use in nanostructured PCMs of the invention.

In yet another embodiment, a nanostructured PCM comprises a phase-change polymer having the following structure:

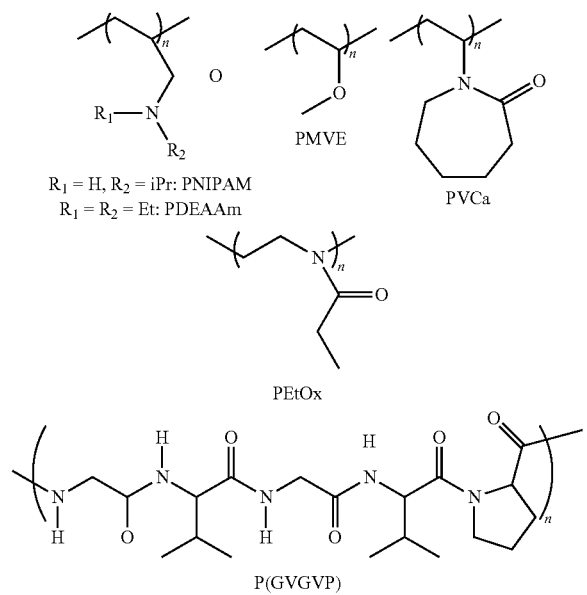

wherein n is selected such that the polymer undergoes a solid-solid phase transition at a desired temperature, or such that the polymer has a desired LCST for a coil-to-globule phase transition. In an embodiment, n is selected to provide a polymer that undergoes a solid-solid or coil-to-globule phase transition at 30-39° C., 35-37° C., 20-25° C., 20-24° C., 25-30° C., 35-40° C., or 33-40° C. It should be understood that n will be determined by a skilled artisan based on the desired size (i.e., molecular weight) and enthalpic properties of the polymer in question. In an embodiment, $1 < n < 1000$ or $40 < n < 1000$. In another embodiment, $40 \leq n \leq 5000$.

In another embodiment, a phase-change polymer is pluronic. It will be understood by a skilled artisan that n represents the degree of polymerization of a polymer, and can range, generally, from as low as 40 to as high as 5000. In an embodiment, n is 10, 20, 30, 40, 50, 60, 60, 80, 90 or 100. For example, in the case of PEG7000, n is 49.

The following abbreviations are used herein: PNIPAM stands for Poly(N-isopropylacrylamide); PDEAAm for poly (N,N-diethylacrylamide); PMVE for Perfluoromethylvinylether; PVCa for Polyvinylcaprolactam; PEtOx for Poly(2-ethyl-2-oxazoline); and P(GVGVP) for a polypeptide with the sequence Glycine, L-Valine, Glycine, L-Valine, L-Proline.

In an embodiment, two or more phase-change polymers may be combined together to achieve the desired phase change and/or heat absorption properties. For example, PEG may be combined with another polymer, such as poly(vinyl alcohol) to produce a thermally-resistant blend. In this case, the PEG-based phase-change polymer undergoes a phase change in the presence of the PVA, ensuring a solid-solid phase change. In another embodiment, PEG is combined with organic esters, producing a phase-change polymer that undergoes multiple phase transitions (e.g., conformational change, melting) in a desired temperature range. For example, PEG may be combined with hydroxypropyl cellulose with chemically grafted sucrose esters. Due to multiple phase transitions, a higher overall heat absorption may be achieved. In an embodiment, at least 200 J/g or at least 250 J/g of heat is absorbed overall from multiple phase transitions. Further, due to the energy density of this material, a relatively low loading capacity may be achieved, e.g., a loading ratio of no more than 10 grams nanostructured PCM/m², no more than 20 grams nanostructured PCM/m², no more than 30 grams nanostructured PCM/m², no more than 40 grams nanostructured PCM/m², no more than 50 grams nanostructured PCM/m², or no more than 60 grams nanostructured PCM/m² of substrate.

In another embodiment, a phase-change polymer, e.g., PEG, is complexed with polyols (also referred to herein as polyalcohols or polyalcohol compounds) to enhance heat properties and shift the peak of the transition temperature. For example, a first agent may comprise poly(ethylene glycol) complexed with a low-molecular weight Polyol, such as one of those shown in Table 1.

TABLE 1

Non-limiting examples of Polyalcohol compounds for use with a phase-change polymer such as PEG in first agents of the invention.

| Polyalcohol names | Compound structure | Solid-solid transition temperature (° C.) |
| --- | --- | --- |
| Pentaerythritol 2,2-Bis(hydroxymethyl)-1,3-propanediol | HO–C(CH₂OH)₂–OH structure | 187-188 |
| 1,1,1-Tris(hydroxymethyl)ethane 2-Hydroxymethyl-2-methyl-1,3-propanediol Trimethylolethane Pentaglycerine | HO–C(CH₂OH)₂–CH₃ structure | 81-89 |
| 2,2-Dimethyl-1,3-propanediol Neopentylglycol NPG Glycol | HO–C(CH₃)₂–OH structure | 40-48 |
| 2-Amino-2-methyl-1,3-propanediol Aminoglycol Ammediol AMPD | HO–C(CH₃)(NH₂)–OH structure | 78 |

TABLE 1-continued

Non-limiting examples of Polyalcohol compounds for use with a phase-change polymer such as PEG in first agents of the invention.

| Polyalcohol names | Compound structure | Solid-solid transition temperature (° C.) |
|---|---|---|
| 2-Amino-2-(hydroxymethyl)-1,3-propanediol<br>Tris(hydroxymethyl) aminomethane<br>Tris base<br>Trometamol<br>THAM | 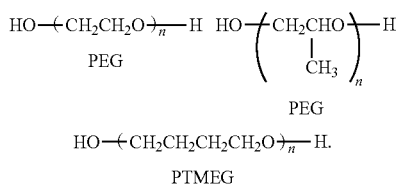 | 134.5 |

Other non-limiting examples of phase-change polymers for use in nanostructured PCMs of the invention include: polyethylene glycol, polypropylene glycol, polytetramethylene glycol, Poly(N-isopropyl acrylamide), Poly(diethyl acrylamide), Poly(tert-butylacrylate), Poly(isopropyl methacrylamide), Hydroxypropyl cellulose, Hydroxymethyl cellulose, Poly(oxazoline), and Poly(organophosphazenes). Other examples of phase-change polymers are as follows:

$$HO\!-\!(CH_2CH_2O)_{\!n}\!-\!H \qquad HO\!-\!\left(\!\!\begin{array}{c}CH_2CHO\\|\\CH_3\end{array}\!\!\right)_{\!n}\!\!-\!H$$

$$\text{PEG} \qquad\qquad \text{PEG}$$

$$HO\!-\!(CH_2CH_2CH_2CH_2O)_{\!n}\!-\!H.$$

$$\text{PTMEG}$$

As used herein, a "nanocrystalline filler" refers to a nanocrystalline material, e.g., a nanocrytalline particle or polymer, capable of providing mechanical reinforcement to a phase-change polymer by forming a nanocomposite material. In an embodiment, a nanocrystalline filler reinforces a phase-change polymer through non-covalent physical interactions such as, without limitation, hydrogen bonds or electrostatic attractions, and without attenuating or substantially adversely affecting heat capacity or heat absorption of the phase-change polymer. In another embodiment, a nanocrystalline filler reinforces a phase-change polymer through non-covalent physical interactions such as, without limitation, hydrogen bonds or electrostatic attractions, and increases heat capacity or heat absorption of the phase-change polymer.

In one embodiment, a phase-change polymer maintains its solid state through a solid-solid, e.g., coil-to-globule, phase transition in the presence of a nanocrystalline filler. In an embodiment, a nanostructured PCM comprises a nanocomposite PCM comprising a phase-change polymer reinforced by a nanocrystalline material, wherein the phase-change polymer maintains its solid state through a coil-to-globule phase transition without substantial loss of heat capacity or heat absorption, at a desired transition temperature. In one embodiment, a nanostructured PCM comprises a nanocrystalline filler dispersed within a phase-change polymer. In another embodiment, a nanostructured PCM is dispersed in a solvent, e.g., water.

In an embodiment, a nanostructured PCM of the invention is a nanocomposite PCM formed between a phase-change polymer and a nanocrystalline filler through non-covalent physical interactions such as hydrogen bonds or electrostatic attractions between the phase-change polymer and the nanocrystalline filler. Without wishing to be bound by theory, it is believed that a nanocrystalline filler provides mechanical reinforcement to a phase-change polymer through non-covalent physical interactions with the phase-change polymer, such as, without limitation, hydrogen bonds or electrostatic attractions. This mechanical reinforcement ensures that a phase-change polymer maintains its solid state through a phase transition without attenuating its heat capacity. In some embodiments, mechanical reinforcement can increase heat capacity or heat absorption of a phase-change polymer.

It is intended that heat capacity or heat absorption of a phase-change polymer is not substantially affected by interaction with a second agent, e.g., a nanocrystalline filler, so as not to adversely affect the thermoregulatory properties of a resulting nanostructured PCM. In some cases, however, heat capacity or heat absorption of a phase-change polymer is affected advantageously, e.g., increased, by interaction with a nanocrystalline filler. For example, in some embodiments an increase in heat capacity of, e.g., up to 10%, has been observed after adding nanocrystalline filler to a phase-change polymer. Accordingly, second agents, e.g., nanocrystalline fillers which can form a nanocomposite with a phase-change polymer but do not substantially adversely affect, e.g., do not substantially reduce or attenuate, heat capacity or heat absorption of the phase-change polymer are encompassed by the invention. In some embodiments, second agents, e.g, nanocrystalline fillers which increase heat capacity or heat absorption of the phase-change polymer are encompassed by the invention. In an embodiment, second agents, e.g., nanocrystalline fillers which reduce or attenuate heat capacity or heat absorption of a phase-change polymer, for example by covalently bonding or grafting to a phase-change polymer such that its heat absorption properties are changed, are excluded from the invention.

In an embodiment, a nanocrystalline filler is a nanocrystalline polymer. Many nanocrystalline and semi-crystalline polymers are known and may be used as nanocrystalline fillers in PCMs of the invention. In an embodiment, a cellulose-based polymer is used as a nanocrystalline filler. Examples of cellulose-based polymers include hydroxypropyl cellulose (HPC), microcrystalline cellulose (MCC) and nanocrystalline cellulose (NCC). In an embodiment, a nanocrystalline filler comprises nanocrystalline cellulose (NCC).

In another embodiment, a nanocrystalline filler is a nanocrystalline starch, a nanoclay, a carbon nanotube, an organic nanoclay, an organoclay, a clay, or any electrospun polymer nanofiber. Non-limiting examples of nanocrystalline fillers for use in PCMs of the invention include montmorillonite, bentonite, kaolinite, hectorite, halloysite, and liquid crystalline polymers such as Poly(γ-benyzl glutamate). In an embodiment, a nanocrystalline filler comprises clay.

An advantage of using a nanocrystalline filler, e.g., a nanocrystalline polymer such as NCC, to mechanically reinforce phase-change polymers in nanocomposite PCMs is the ability to provide reinforcement with small quantities of nanocrystalline filler. The present invention is based, at least in part, on the inventors' surprising finding that small quantities of nanocrystalline filler, e.g., about 5% by weight, can provide mechanical reinforcement properties equivalent to much higher amounts, e.g., about 30% by weight, of conventional fillers such as carbon fibers. This allows a nanocomposite PCM of the invention to have a higher proportion of phase-change polymer in the material, thus increasing the heat capacity of the nanocomposite PCM, and allowing a higher amount of phase-change polymer to be coated on a substrate.

In an embodiment, as little as 5% nanocrystalline filler is used; in other words, the weight of nanocrystalline filler is no more than 5% of the total weight of the nanocomposite PCM. In an embodiment, a nanocomposite PCM of the invention comprises 5% by weight nanocrystalline filler and 95% by weight phase-change polymer. In another embodiment, a nanocomposite PCM comprises about at least about 0.5 wt %, at least about 3 wt %, at least about 5 wt %, at least about 10 wt %, or at least about 15 wt % of nanocrystalline filler by weight. In another embodiment, a nanocomposite PCM comprises no more than about 3 wt %, about 5 wt %, about 8 wt %, or about 10 wt % of nanocrystalline filler. In one embodiment, a nanocomposite PCM comprises no more than 5-8 wt % of nanocrystalline filler. In an embodiment, a nanocomposite PCM comprises about 5 wt % to about 25 wt % of nanocrystalline filler. In another embodiment, a nanocomposite PCM comprises about 0.5 wt % to about 5 wt % nanocrystalline filler. In yet another embodiment, a nanocomposite PCM comprises at least 90% wt % or at least 95 wt % of phase-change polymer.

As used herein, when content is indicated as being present on a "weight basis" or at a "weight percent (wt %)" or "by weight." the content is measured as the percentage of the weight of component(s) indicated, relative to the total weight of all components present in a nanostructured PCM.

As used herein, "substantially adversely affecting heat capacity or heat absorption" refers to reducing heat capacity or heat absorption by more than about 30%. Thus, a second agent or a nanocrystalline filler which does not substantially adversely affect, attenuate or reduce heat capacity or heat absorption, should be understood to adversely affect, attenuate or reduce heat capacity or heat absorption by no more than about 30%. In an embodiment, a second agent or a nanocrystalline filler adversely affects, attenuates or reduces heat capacity or heat absorption by no more than about 10%, about 20%, or about 30%. In one embodiment, a second agent or a nanocrystalline filler adversely affects, attenuates or reduces heat capacity or heat absorption by no more than about 15-25 J/g. In another embodiment, a second agent or a nanocrystalline filler adversely affects, attenuates or reduces heat capacity or heat absorption by no more than about 25 J/g.

In some embodiments, a second agent or a nanocrystalline filler enhances or increases heat capacity or heat absorption by about 5%, about 10%, about 20%, about 30%, or by about 15-30 J/g.

In an embodiment, second agents have a high surface area to volume ratio. In an embodiment, nanocrystalline fillers of the invention have a high aspect ratio. As used herein, "aspect ratio" refers to the proportional relationship between the length and the width of a single particle of material. As used herein, "high aspect ratio" means an aspect ratio of at least about 20:1. In an embodiment, second agents or nanocrystalline fillers of the invention have an aspect ratio of at least about 20:1, at least about 25:1, at least about 30:1, at least about 35:1, at least about 40:1, at least about 45:1, at least about 50:1, or at least about 55:1. In another embodiment, second agents or nanocrystalline fillers of the invention have an aspect ratio of about 20:1, about 25:1, about 30:1, about 35:1, about 40:1, about 45:1, about 50:1, or about 55:1.

As used herein, the term "heat absorption" or "heat capacity" refers to an amount of heat absorbed or released by a material as it undergoes a transition between two states. Thus, for example, a heat absorption or heat capacity can refer to an amount of heat that is absorbed or released as a material undergoes a transition between a liquid state and a crystalline solid state, a liquid state and a gaseous state, a crystalline solid state and a gaseous state, two crystalline solid states, or a crystalline state and an amorphous state. "Heat absorption" or "heat capacity" also refers to an amount of heat absorbed or released by a material as it undergoes a coil-to-globule transition.

As used herein, the term "transition temperature" refers to an approximate temperature at which a material undergoes a transition between two states, i.e., a phase transition. Thus, for example, a transition temperature can refer to a temperature at which a material undergoes a transition between a liquid state and a crystalline solid state, a liquid state and a gaseous state, a crystalline solid state and a gaseous state, two crystalline solid states or crystalline state and amorphous state. "Lower critical transition temperature" or LCST is used herein in some cases to refer to the transition temperature at which a phase-change polymer displays a coil-to-globule transition which is endothermic.

As used herein, the term "phase-change material" or "PCM" refers to a material that has the capability of absorbing or releasing heat to adjust heat transfer at or within a temperature stabilizing range. The term "nanocomposite PCM" is used herein to refer to nanostructured PCMs of the invention comprising a phase-change polymer (a first agent) reinforced with a nanocrystalline filler (a second agent, such as NCC or clay). The term "PCM nanoemulsion" is used herein to refer to nanostructured PCMs of the invention comprising a first agent that undergoes an endothermic phase transition at a desired transition temperature and a second agent that assists in maintaining a nanostructure, wherein the first agent is in a dispersed phase and the second agent is in a continuous phase. First agents used in PCM nanoemulsions include, for example, phase-change polymers, fatty acids and fatty acid esters. Second agents used in PCM nanoemulsions include, for example, surfactants, emulsifiers, and film-forming or non-phase change polymers.

A temperature stabilizing range can include a specific transition temperature or a range of transition temperatures. In some instances, a nanostructured PCM can be capable of inhibiting heat transfer during a period of time when the phase-change material is absorbing or releasing heat, typically as the phase-change material undergoes a transition between two states. This action is typically transient and will occur until a latent heat of the phase change material is absorbed or released during a heating or cooling process. Heat can be stored or removed from a phase-change material, and the phase-change material typically can be effectively recharged by a source emitting or absorbing it. For certain embodiments, a phase-change material can include a mixture of two or more phase-change polymers. By selecting two or more different phase-change polymers and forming a mixture, a temperature stabilizing range can be adjusted for any desired application. The resulting mixture of phase-change polymers can exhibit two or more different transition temperatures or a single modified transition temperature when incorporated in the nanostructured PCMs and articles described herein.

As used herein, the term "polymer" refers to a material that includes a set of macromolecules. Macromolecules included in a polymer can be the same or can differ from one another in some fashion. A macromolecule can have any of a variety of skeletal structures, and can include one or more types of monomeric units. In particular, a macromolecule can have a skeletal structure that is linear or non-linear. Examples of non-linear skeletal structures include branched skeletal structures, such those that are star branched, comb branched, or dendritic branched, and network skeletal structures. A macromolecule included in a homopolymer typically includes one type of monomeric unit, while a macromolecule included in a copolymer typically includes two or more types of monomeric units. Examples of copolymers include statistical copolymers, random copolymers, alternating copolymers, periodic copolymers, block copolymers, radial copolymers, and graft copolymers.

In some instances, a reactivity and a functionality of a polymer can be altered by addition of a set of functional groups, such as acid anhydride groups, amino groups and their salts, N-substituted amino groups, amide groups, carbonyl groups, carboxy groups and their salts, cyclohexyl epoxy groups, epoxy groups, glycidyl groups, hydroxy groups, isocyanate groups, urea groups, aldehyde groups, ester groups, ether groups, alkenyl groups, alkynyl groups, thiol groups, disulfide groups, silyl or silane groups, groups based on glyoxals, groups based on aziridines, groups based on active methylene compounds or other b-dicarbonyl compounds (e.g., 2,4-pentandione, malonic acid, acetylacetone, ethylacetone acetate, malonamide, acetoacetamide and its methyl analogues, ethyl acetoacetate, and isopropyl acetoacetate), halo groups, hydrides, or other polar or H bonding groups and combinations thereof. Such functional groups can be added at various places along the polymer, such as randomly or regularly dispersed along the polymer, at ends of the polymer, on the side, end or any position on the crystallizable side chains, attached as separate dangling side groups of the polymer, or attached directly to a backbone of the polymer. Also, a polymer can be capable of cross-linking, entanglement, or hydrogen bonding in order to increase its mechanical strength or its resistance to degradation under ambient or processing conditions.

As can be appreciated, a polymer can be provided in a variety of forms having different molecular weights, since a molecular weight (MW) of the polymer can be dependent upon processing conditions used for forming the polymer. Accordingly, a polymer can be referred to as having a specific molecular weight or a range of molecular weights. As used herein with reference to a polymer, the term "molecular weight (MW)" can refer to a number average molecular weight, a weight average molecular weight, or a melt index of the polymer.

As used herein, the term "chemical bond" refers to a coupling of two or more atoms based on an attractive interaction, such that those atoms can form a stable structure. Examples of chemical bonds include covalent bonds and ionic bonds. Other examples of chemical bonds include hydrogen bonds and attractive interactions between carboxy groups and amine groups. As used herein, the term "covalent bond" means a form of chemical bonding that is characterized by the sharing of pairs of electrons between atoms, or between atoms and other covalent bonds. Attraction-to-repulsion stability that forms between atoms when they share electrons is known as covalent bonding. Covalent bonding includes many kinds of interactions, including sigma-bonding, pi-bonding, metal-metal bonding, agostic interactions, and three-center two-electron bonds.

As used herein, the term "reactive function" means a chemical group (or a moiety) capable of reacting with another chemical group to form a covalent or an electrovalent bond, examples of which are given above. Preferably, such reaction is doable at relatively low temperatures, e.g. below 200° C., more preferably below 100° C., and/or at conditions suitable to handle delicate substrates, e.g. textiles. A reactive function could have various chemical natures. For example, a reactive function could be capable of reacting and forming electrovalent bonds or covalent bonds with reactive functions of various substrates, e.g., cotton, wool, fur, leather, polyester, or textiles made from such materials, as well as other base materials.

"Polymerization" is a process of reacting monomer molecules together in a chemical reaction to form three-dimensional networks or polymer chains. Many forms of polymerization are known, and different systems exist to categorize them, as are known in the art.

In an embodiment, nanostructured PCMs of the invention are PCM nanoemulsions, which are a specific type of nanostructured PCM in which the phases are inverted as compared to nanocomposite PCMs described herein. Specifically, in a PCM nanoemulsion the continuous phase may be a polymer substrate with no heat-absorbing properties of its own, and the dispersed phase comprises droplets of first agents such as fatty acid esters. This is in contrast to nanocomposite PCMs described herein in which a first agent, i.e., a phase-change polymer, is in the continuous phase rather than the dispersed phase.

Nanoemulsions are thermodynamically unstable emulsions formed through extreme "shear mixing" to form droplets between 50-500 nm. They differ from other nanocomposite PCMs described herein, in that the phase-change component (the first agent) is in the dispersed phase rather than the continuous phase. Nanoemulsions behave like visoelastic solids at a critical radius and volume fraction of the dispersed phase. Further, this property is not disturbed by slight temperature changes, and viscosity of a nanoemulsion can be changed through shear (see Example 6).

In an embodiment, a PCM nanoemulsion of the invention has a dispersed phase comprising a first agent, e.g., a thermoresponsive polymer or a low-molecular weight melting material, that melts in a desired temperature range to absorb large quantities of heat. When pure, a PCM nanoemulsion may go from a solid to a liquid at a transition temperature.

In an embodiment, the dispersed phase of a PCM nanoemulsion forms droplets of about 200 nm or less when mixed under high shear, and an emulsifier, e.g., sodium caseinate, forms a thin interfacial layer around the droplets. At a critical particle size and a critical concentration, the PCM nanoemulsion assumes solid or solid-like properties, and the PCM nanoemulsion remains solid-like when heated to its transition temperature. The continuous (non-dispersed) phase (comprising, e.g., a non phase-change polymer substrate, a film-forming polymer substrate, a surfactant, and/or an emulsifier) is responsible for the PCM nanoemulsion maintaining a solid or solid-like phase throughout the phase transition and does not affect the overall enthalpy of the phase transition. No more than 5% of the continuous phase is required in the PCM nanoemulsion. In an embodiment, a PCM nanoemulsion is dried and used to coat a substrate, e.g., a paper, plastic or textile substrate. The dried nanoemulsion may form a solid film that adheres directly to the substrate and remains firm and solid throughout a phase transition.

Nanoemulsions are formed through shear mixing at high pressures and mixing speeds as described in the methods section below.

In an embodiment, the continuous phase of a PCM nanoemulsion comprises an emulsifier. An emulsifier for use in a PCM nanoemulsion may be a surfactant, such as but not limited to Tween, Sodium Dodecyl Sulphate (SDS), Pectin, Egg Lecithin, Span, or a combination thereof. In another embodiment, an emulsifier for use in a PCM nanoemulsion is sodium caseinate.

In an embodiment, the dispersed phase of a PCM nanoemulsion comprises a first agent which may be for example a fatty acid, a fatty acid ester, a paraffin, an oligomer of PEG, a hydrophilic polymer, or a combination thereof. In an embodiment, a first agent for use in a PCM nanoemulsion is a mix of fatty acid esters, e.g., methyl palmitate and methyl stearate. In another embodiment, a first agent for use in a PCM nanoemulsion is a hydrophilic polymer such as PVA, PVP, HPC, or chitosan.

A PCM nanoemulsion may be dispersed in a suitable solvent, e.g., an organic solvent or an aqueous solvent (e.g., water). A solvent is chosen by a skilled artisan based on PCMs used, desired reaction conditions, substrates or articles to be coated, and so on. Many different solvents are known and may be used with PCM nanoemulsions of the invention. Non-limiting examples include water and a dilute solution of a hydrophilic polymer.

In one embodiment, a PCM nanoemulsion comprises fatty acid esters stabilized with sodium caseinate and dispersed either in water or a dilute solution of a polymer such as Poly(vinyl alcohol) or Poly(vinyl pyrollidone).

Non-limiting examples of first agents that undergo an endothermic phase transition for use in PCM nanoemulsions include the following:

a) Fatty acid ester: glycerol derivatives, having the following general structure:

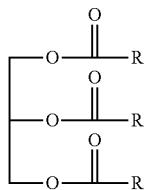

where R is an alkyl chain of general structure —$(CH_2)_n$—$CH_3$ and n is from 2 to 21;

b) End-capped PEG with fatty acid esters, such as:

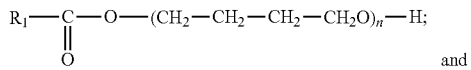

and c) End-capped PEG with fatty acid diesters, such as:

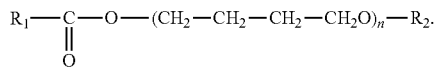

In further embodiments, there are provided herein thermochromic nanostructured PCMs that combine heat absorption and dye release or dye revelation in a single phase transition. For example, a thermoresponsive nanostructured PCM of the invention may comprise a dye that is released during the phase transition process concurrently with heat absorption. Dye release thus indicates that the nanostructured PCM has been activated or that a phase change has occurred. In some embodiments, a dye may be chosen such that it is released at one degree higher than the thermal plateau of the nanostructured PCM, thereby indicating that thermal buffering effect has been exhausted. In yet another embodiment, a colored square is placed underneath nanostructured PCMs in an article. Some first agents, such as PEG, become less opaque during the phase transition and during this change the colored square underneath is therefore revealed.

In other embodiments, nanostructured PCMs are combined with paper glues such as starch, modified starch or PVA to create a stable emulsion that can be directly laminated on paper. Such PCMs can be used to create paper and boxes with intrinsic thermal buffering properties.

In an aspect of the present invention, nanostructured PCMs provided herein are used to form thermoregulatory or thermosensitive coatings on a substrate or article. In an embodiment, a nanostructured PCM of the invention can adhere to a substrate or article, e.g., to the surface of a substrate or article. For example, a nanostructured PCM may possess a reactive function capable of reacting and bonding with a substrate. Once coated onto a substrate, a nanostructured PCM can provide thermoregulatory properties to the substrate. For example, a nanostructured PCM coating may undergo a solid-solid phase transition at 25-30° C. to absorb heat, e.g., to absorb body heat of a subject wearing an article coated with the nanostructured PCM. In some embodiments, a nanostructured PCM coating undergoes a solid-solid phase transition at 30-37° C. to absorb heat, e.g., body heat. In an embodiment, a nanostructured PCM coating which undergoes a solid-solid phase transition at 30-37° C. to absorb heat, e.g., body heat, can also reflect heat from solar or IR radiation in the presence of nanofillers that reflect radiation such as ZnO.

Thermoregulatory coatings provided herein may comprise one nanostructured PCM layer or more than one, i.e., two or more, nanostructured PCM layers. Multiple nanostructured PCM layers in a coating may have the same or different heat absorption properties, depending for example on the composition of phase-change polymers and nanocrystalline filler in each nanostructured PCM layer. This can allow multiple functionalities for a coating. For example, a coating may both absorb body heat and reflect heat from solar or IR radiation, or a coating may have the capability of absorbing heat at more than one transition temperature.

In an embodiment, thermoregulatory coatings of the invention provide a solid-state thermal management system.

In an embodiment, a thermoregulatory or thermosensitive coating of the invention has a single phase change temperature or multiple such temperatures. According to one embodiment, a thermoregulatory or thermosensitive coating has at least one phase change temperature in the range between 25-30° C., and a phase change enthalpy of at least 50 J/g or about 50 to about 200 J/g. A phase change at each temperature has its own enthalpy, so that according to some embodiments, a coated substrate or article has a single phase change enthalpy and, according to other embodiments, multiple such enthalpies. As used herein, the term "overall phase change enthalpy" refers to the enthalpy of phase change in the case of an article with a single phase change temperature and to the combined enthalpies in case of an article with multiple phase change temperatures. According to an embodiment of the invention, an article has an overall phase change enthalpy of at least 50 J/g, at least 100 J/g, at least 150 J/g, at least 200 J/g, or about 50 to about 200 J/g.

A wide range of substrates or articles may be coated with nanostructured PCMs or thermoregulatory or thermosensitive coatings of the invention. In an embodiment, a substrate or article is cotton, wool, fur, leather, polyester, and/or a textile made from such materials. For example, textiles or articles made from natural, regenerated or synthetic polymers, fibers, or materials may be coated with nanostructured PCMs or coatings of the invention. Further non-limiting examples of such substrates include various types of natural products including animal products such as alpaca, angora, camel hair, cashmere, catgut, chiengora, llama, mohair, silk, sinew, spider silk, wool, and protein based materials; various types of vegetable based products such as bamboo, coir, cotton, flax, hemp, jute, kenaf, manila, pina, raffia, ramie, sisal, and cellulose based materials; and various types of mineral based products such as asbestos, basalt, mica, or other natural inorganic fibers. Generally, man-made fibers are classified into three classes: those made from natural polymers, those made from synthetic polymers and those made from inorganic materials.

The most common natural polymer fibre is viscose, which is made from the polymer cellulose obtained mostly from farmed trees. Other cellulose-based fibers are cupro, acetate and triacetate, lyocell, and modal. Less common natural polymer fibers are made, for example, from rubber, alginic acid and regenerated protein.

Many synthetic fibers, i.e., organic fibers based on petrochemicals, are known. The most common are polyester, polyamide (often called nylon), acrylic and modacrylic, polypropylene, segmented polyurethanes which are elastic fibers known as elastanes (or spandex in the USA), and specialty fibers such as high performance aramids.

Inorganic man-made fibers are fibers made from materials such as glass, metal, carbon, or ceramic. These fibers are very often used to reinforce plastics to form composites.

In an embodiment, a nanostructured PCM or thermoregulatory coating is adhered to a substrate, e.g., chemically bound to a substrate. Binding may be one of covalent binding, electrovalent binding, direct binding, or binding via a connecting compound.

In an embodiment, a substrate is selected from the group consisting of textiles, e.g., natural fibers, fur, synthetic fibers, regenerated fibers, woven fabrics, knit fabrics, non-woven fabrics, etc., foams, paper, leather, plastic, polymeric layers, plastic films, plastic sheets, laminates, and combinations thereof.

Textiles described herein can be used for any garment or article that comes in contact with a human or animal body. Non-limiting examples include hats, helmets, glasses, goggles, masks, scarves, shirts, baselayers, vests, jackets, underwear, lingerie, bras, gloves, liners, mittens, pants, overalls, bibs, socks, hosiery, shoes, boots, insoles, sandals, bedding, sleeping bags, blankets, mattresses, sheets, pillows, textile insulation, backpacks, sports pads/padding, etc. A textile article can contain a nanostructured phase change material (PCM) as described herein or can be coated, laminated or molded with a nanostructured phase change material of the invention. For instance, fibers can be manufactured with a nanostructured phase change material contained in the fiber, coated onto the fiber, or used to treat the fiber. This is applicable to any step in a textile manufacturing process.

In another embodiment, a substrate may be from one or more of the following categories of products and articles:

(a) Shipping, storage or packaging containers/equipment such as paper, glass, metal, plastic, ceramic, organic or inorganic materials in the form of envelopes, sleeves, labels, cardboard, wrapping, wires, tiedowns, insulation, cushioning, pads, foams, tarps, bags, boxes, tubes, containers, sheet, film, pouches, suitcases, cases, packs, bottles, jars, lids, covers, cans, jugs, glasses, tins, pails, buckets, baskets, drawers, drums, barrels, tubs, bins, hoppers, totes, truck/ship containers or trailers, carts, shelves, and racks. These articles can especially be used in, for example, food packaging, food shipment, food delivery, medical shipment, medical delivery, and/or body shipment industries;

(b) Medical, health, therapeutic, curative, and/or wound management articles such as bandages, wraps, wipes, stents, capsules, drug, delivery devices, tubes, bags, pouches, sleeves, foams, pads, sutures, and wires;

(c) Building, construction, and/or interior articles where energy management and off-peak energy demand reduction is desired. These articles include, for example, upholstery, furniture, beds, furnishings, windows, window coatings, window treatments, window coverings, wallboard, insulation, fiberglass insulation fibers, fiberglass insulation batting, fiberglass insulation fill, cellulosic fill insulation, polystyrene foam insulation, polyisocyanate foam insulation, polyisocyanurate foam insulation, insulation boards, gypsum boards, wall boards, foams, piping, tubes, wiring, laminates, bricks, stones, siding, panels for wall or ceiling, flooring, cabinets, building envelopes, building wrap, wallpaper, paint, shingles, roofing, and frames;

(d) Electronics and/or electrical articles such as conductors, heat sinks, semiconductors, transistors, integrated circuits, wiring, switches, capacitors, resistors, diodes, boards, coverings, motors, and engines;

(e) Articles for use in industries, for example automotive, heavy equipment, trucking, food/beverage delivery, cosmetics, civil service, agriculture, hunting/fishing, and/or manufacturing industries, which incorporate articles described herein; and/or (f) Cosmetics such as, for example, creams, lotions, shampoos, conditioners, bodywash, soaps, hair gels, mousse, lipstick, deodorant, moisturizers, nail polish, glosses, lipsticks, makeup, eyeliners/eyeshadow, foundations, blushes, and mascara.

In another embodiment, a substrate or article to be coated is a packaging film, a wall, or a building material. In an embodiment, a substrate or article to be coated is for use in packaging, e.g., for packaging food, e.g., chocolate. In an embodiment, a substrate or article to be coated or laminated is a packaging material, such as a packaging box, used for transportation of a temperature-sensitive product such as food, blood, plasma, or other medical products. In some embodiments, coated substrates or articles provided herein are thermal packaging boxes which provide thermal protection of temperature-sensitive products during transportation. For example, a coated article of the invention may be a disposable box, e.g., a disposable paper or cardboard box, wherein a nanostructured PCM has been directly coated onto the paper or cardboard to provide thermal protection.

It should be understood that nanostructured phase change materials, i.e., nanocomposite PCMs, PCM nanoemulsions, and thermoregulatory or thermosensitive coatings thereof, and articles described herein, can be used in any application where temperature regulation, temperature buffering, temperature control or latent heat of fusion is utilized, or any phase transition phenomenon is employed. Further, in some embodiments, nanocomposite phase change materials may be used in conjunction with hydrophilic properties, hydrophobic properties, moisture absorption or release, sweat absorption, organic material absorption or release, inorganic material absorption or release, crosslinking, anti-microbial, anti-fungal, anti-bacterial, biodegradable, decomposable, anti-odor, odor-controlling, odor-releasing, grease and stain resistance, stabilization for oxidation or aging, fire retardant, anti-wrinkle, enhanced rigidity or flexibility, UV or IR screening, impact resistance or control, color addition, color change, color control, catalytic or reaction control, sound, light, optical, static or energy management, surface tension, surface smoothness, or surface properties control, anti-fraud or brand-marking control, controlled release/containment, or controlled barrier properties.

Thus, in an embodiment a substrate or article further comprises at least one additional component or additive, which provides such additional properties. For example, a substrate or article may further comprise an additive for sweat absorption, water-repellency, water absorption, odor resistance, flame retardancy, water wicking ability, or stain resistance. In an embodiment, a substrate or article further comprises xylitol, e.g., 1% xylitol, maltitol, sorbitol, erythritol, and/or starch. In one embodiment, a substrate or article comprises a nanostructured PCM or thermoregulatory coating of the invention for heat absorption; an additive for water absorption; and an additive for sweat solubilization such as xylitol, e.g., 1% xylitol, maltitol, sorbitol, erythritol, or starch.

In one embodiment, an article provided herein has multiple coating layers, each providing a different functionality. For example, an article may have a first coating layer comprising a nanostructured PCM or thermoregulatory coating of the invention; a second coating layer comprising an additive for sweat solubilization, such as xylitol, maltitol, sorbitol, erythritol, or starch; and a third coating layer comprising a component for reflecting heat. In an embodiment, a coating layer, e.g., the third coating layer, comprises sweat solubilization agents such as xylitol, maltitol, sorbitol, erythritol, or starch. In an embodiment, the third coating layer comprises a nanostructured PCM of the invention having a transition temperature of about 30-37° C. In an embodiment, the first coating layer absorbs heat. For example, the first coating layer may comprise a nanostructured PCM of the invention having a transition temperature of about 20-25° C.

In accordance with another aspect of the invention, there is provided a method for production of an article described herein, comprising providing a nanostructured PCM, providing a substrate and combining the nanostructured PCM with the substrate. According to one embodiment, the substrate carries at least one reactive function and the combining comprises chemically reacting a functional group of the nanostructured PCM with a functional group of the substrate. In an embodiment, a nanostructured PCM is combined with a substrate in the presence of crosslinking agents, so that the nanostructured PCM is crosslinked to the surface of the substrate. In some embodiments, a nanostructured PCM is mixed with a substrate with agitation, and a film-forming composite occurs spontaneously in the absence of crosslinking agents. It should be understood that a skilled artisan will select mixing conditions such as temperature, speed of agitation, and duration of mixing based on a number of factors, such as the nanostructured PCM being used, the substrate to be coated, etc.

Selection of a substrate or article to be coated with a nanostructured PCM or thermoregulatory coating of the invention will be made based on numerous factors, such as, for example, its ability to adhere to a nanostructured PCM or thermoregulatory coating, its breathability, its drapability, its flexibility, its softness, its water absorbency, its film-forming ability, its resistance to degradation under ambient or processing conditions, and/or its mechanical strength. It will be appreciated that in some cases, it may be desirable or necessary to modify a substrate or article first, before combining with the nanostructured PCM or thermoregulatory coating, in order to facilitate adherence of the nanostructured PCM or thermoregulatory coating. For example, a substrate can be chemically modified so as to include a set of functional groups. Chemical modification can be performed using any suitable technique, such as using oxidizers, corona treatment, or plasma treatment, of which many are known in the art.

A nanostructured PCM can be adhered to a substrate or an article as a coating, laminate, infusion, treatment or ingredient in a coating, laminate, infusion, treatment that is formed adjacent to, on or within the substrate using any suitable coating, laminating, infusion, etc., technique. During use, a nanostructured PCM or thermoregulatory coating can be positioned so that it is adjacent to an internal compartment or an individual's skin, thus serving as an inner coating. It is also contemplated that a nanostructured PCM can be positioned so that it is exposed to an outside environment, thus serving as an outer coating. In an embodiment, a nanostructured PCM or thermoregulatory coating covers at least a portion of a substrate or article. Depending on characteristics of the substrate or the specific coating technique that is used, a nanostructured PCM can penetrate below the top surface and permeate at least a portion of the substrate or article.

Articles described herein comprising nanostructured PCMs or thermoregulatory coatings of the invention may have a single phase change temperature or multiple phase change temperatures. It should be understood that the phase change at each of the temperatures has its own enthalpy, so that the article has according to some of the embodiments a single phase change enthalpy and, according to others, multiple such enthalpies. According to an embodiment of the invention, an article has an overall phase change enthalpy of about 50 to about 200 J/g, at least about 50 J/g, at least about 100 J/g, or at least about 150 J/g.

Coatings may be applied to a substrate or article using conventional techniques, such as brushing, painting, printing, stamping, rolling, dipping, spin-coating, spraying, or electrostatic spraying. In an embodiment, solutions of nanostructured PCMs are uniformly spray coated on a substrate. In an embodiment, nanostructured PCMs are coated on a substrate via screen printing.

Nanostructured PCMs and thermoregulatory coatings described herein provide certain advantages in comparison to phase change materials available in the art. For example, a nanostructured PCM described herein may have one or more of the following properties: 1) it may be able to endow materials with excellent thermosensitivity or heat absorption capacity; 2) it may be used to coat a variety of different materials; 3) it may provide thermoregulatory coatings with a highly enthalpic phase change, i.e., heat absorption capacity of about 50 to about 200 J/g; 4) it may undergo a solid-solid phase transition; maintaining a solid state eliminates the need for encapsulating agents, thus allowing coatings to comprise a higher content of phase-change material or phase-change polymer, consequently providing higher heat absorption capability than phase change materials available in the art; 5) it may comprise a nanocrystalline filler wherein a phase-change polymer is non-covalently reinforced by a nanocrystalline filler, such that the phase-change polymer is reinforced structurally by the nanocrystalline filler without substantially adversely altering the heat absorption properties of the phase-change polymer; 6) it may comprise a nanocomposite wherein a phase-change polymer is non-covalently complexed with a nanocrystalline filler, wherein only relatively small amounts of a nanocrystalline filler (e.g., 5-8 wt %) are required to reinforce structurally the phase-change polymer, allowing a higher concentration of phase-change polymer in the nanostructured PCM; 7) it may provide a thermoregulatory coating which lasts longer than coatings known in the art, e.g., at least 30 minutes; 8) it may provide a thermoregulatory coating that is not flammable, not toxic, and/or not irritating to the skin; and/or 9) it may provide a thermoregulatory coating which is more cost-effective than existing coatings.

As used herein, the term "substrate" is used to refer to the surface of a material which is to be coated with, or which is coated with, nanostructured PCMs or thermoregulatory coatings of the invention, i.e., for which it is desired to provide thermoregulatory, e.g., cooling, properties. It is expected that any substrate can be turned thermoregulatory, e.g., cooling, using nanostructured PCMs of the invention.

Nanostructured PCMs and thermoregulatory coatings may be applied using any methods known in the art. Methods of application are selected by a skilled artisan based on, for example, substrate to be coated, intended application, etc. For example, coatings may be sprayed, brushed, painted, printed, stamped, screen-printed, wiped (e.g., applied to a cloth or a wipe which is used to wipe a coating onto a substrate), sponged, rolled, spin-coated or electrostatically sprayed onto a substrate, or a substrate may be dipped, submerged or soaked in a solution containing nanostructured PCMs of the invention, and so on. Coatings may also be applied by soaking a substrate, e.g., fabric, cotton, etc., in a coating solution containing nanostructured PCMs of the invention. Coatings may also be applied electrostatically, i.e., in solid form.

Thermoregulatory coatings prepared using nanostructured PCMs and methods described herein can have a broad range of thicknesses, depending for example on compositions employed and application processes used. The amount of nanostructured PCM loaded onto a substrate can also vary. In an embodiment, the thickness of a thermoregulatory coating is from about 10 micrometers to about 100 micrometers thick. In another embodiment, a thermoregulatory coating has a thickness of about 10 micrometers, about 20 micrometers, about 30 micrometers, about 40 micrometers, about 50 micrometers, about 60 micrometers, about 70 micrometers, about 80 micrometers, about 90 micrometers, or about 100 micrometers.

In some embodiments, multiple coatings may be applied to a substrate, e.g., multiple coating layers of nanostructured PCMs may be applied.

Performance of nanostructured PCMs described herein may be measured by any of a variety of tests, which are relevant to a coating's ability to perform under a variety of circumstances. In an embodiment, nanostructured PCMs and thermoregulatory coatings described herein provide a cooling effect, due to the endothermic nature (heat absorption) of the solid-solid phase change. In some embodiments, nanostructured PCMs and thermoregulatory coatings described herein may also be used to provide a warming effect, or temperature stabilization effect (e.g., both cooling and warming effects within a fluctuating temperature range), due to the exothermic nature (heat release) of the solid-solid phase change. It will be well-understood by those of skill in the art that phase change reactions are reversible and that, depending on the nature of the temperature shift that occurs, a phase change reaction may proceed in an endothermic or an exothermic direction. Nanostructured PCMs and thermoregulatory coatings may thus be used in a wide range of applications where temperature stabilization or thermoregulation of an article or substrate is desired.

In some embodiments, coatings described herein can withstand laundry washing cycles. Coatings described herein may also be UV-resistant in some embodiments. In other embodiments, coatings described herein are stable and/or durable to environmental conditions such as sun exposure, wetting, salt resistance, or the like, indicating that they can be employed in a variety of harsh environments for purposes such as cooling.

Nanostructured PCMs and thermoregulatory coatings of the invention may be tested for performance, stability, durability, resistance to washing, etc., using methods known in the art. Appropriate performance testing and parameters are selected by a skilled artisan based on several factors, such as desired properties, substrate to be coated, application, etc. In some embodiments, properties of nanostructured PCMs and thermoregulatory coatings are determined using standardized techniques known in the art, such as ASTM tests or techniques.

The terms "resistance" and "repellence" are used interchangeably herein to refer to ability of a coating to resist or repel a substance.

To coat a substrate, a nanostructured PCM of the invention may be used in a solvent, e.g., an organic solvent or an aqueous solvent (e.g., water), optionally in combination with additives. A solvent is chosen by a skilled artisan based on nanostructured PCMs used, desired reaction conditions, substrates or articles to be coated, and so on. Many different solvents are known and may be used with nanostructured PCMs of the invention. In an embodiment, a nanostructured PCM is used as a dispersion in a solvent.

In some embodiments, nanostructured PCMs are used with an additive. Additives may be used, for example, to stabilize a formulation, to provide additional functional properties, to facilitate crosslinking to a substrate or article, etc. In certain embodiments, one or more than one additive is used. Non-limiting examples of crosslinking agents to be used with nanostructured PCMs of the invention include divynilbenzene, phenol/formaldehyde, polyethylenimine, carbodiimides, isocyanates, ethylene glycol and methylenbisacrylamide. Non-limiting examples of additives to be used with nanostructured PCMs of the invention include fixatives, rheology modifiers, UV stabilizers, plasticizers, surfactants, emulsifiers, antistatic additives, flame retardants, friction reduction agents, anti-blocking agents, freezing point depressants, IR reflecting agents, and lubricants. Additives and crosslinking agents are chosen by a skilled artisan based on nanostructured PCMs used, desired reaction conditions, substrates or articles to be coated, and so on.

A variety of substrates can be coated using nanostructured PCMs described herein, including but not limited to metal oxides, semi-conductor oxides, metals, metalloids, metal oxides, concretes, clay particles, sand particles, cement particles, saw dust, semiconductors, particles, glasses, ceramics, papers and textile fibers, plastic films, packaging materials, or articles comprising these substrates. In some embodiments, substrates to be coated will be in the form of plates (e.g., metal plates), sheets (e.g., metal sheets) or ribbons (e.g., metal ribbons).

Many applications are anticipated for nanostructured PCMs and thermoregulatory coatings. For example, articles of clothing which provide cooling for individuals in hot climates can be provided. Non-limiting examples of cooling garments which can be provided using nanostructured PCMs and thermoregulatory coatings of the invention include: a cooling spacer vest to be worn under protective armour, e.g., for military applications; a cooling spacer vest to be worn under protective gear, e.g., for firefighter applications; a cooling spacer vest to be worn under protective gear, e.g., for metallurgical furnace operations; a cooling wrap for therapeutic hypothermia, e.g., in the case of sudden cardiac arrest; a cooling garment for thermosensitive individuals, e.g., multiple sclerosis patients; a cooling blanket to mitigate impact of injury, e.g., brain injury; a cooling product such as bandages and wraps for use to treat severe burns; cooling orthopaedic socks for prosthetic limbs; a cooling liner for a cushion, e.g., a wheelchair cushion; a cooling garment for individuals living or working in hot climates, e.g., tropical countries, desert climates; and a cooling headgear for sportsmen, e.g., cyclists and motorcyclists.

Nanostructured PCMs and thermoregulatory coatings can be used to produce paper, paperboard and films (e.g., plastic films) for food-contact applications, such as pizza boxes, sandwich wraps and chocolate wrappers. Non-limiting examples of packaging materials which can be produced include interior and exterior of metal cans, flexible packaging, paper, paperboard, film and foil finishes.

Nanostructured PCMs and thermoregulatory coatings described herein can be applied to virtually any substrate or article to provide thermoregulatory, e.g., cooling, properties. Choice of coating forms and processes for applying coatings are determined by a skilled artisan, based on factors such as chosen substrate, application, etc. Thermoregulatory coatings may take any desired shape or form. In some embodiments, a coating completely covers a substrate or article. In other embodiments, coatings cover only a portion of a substrate or article, such as one or more of a top, side or bottom of an object.

Nanostructured PCMs and thermoregulatory coatings may take any desired shape or form, limited only by the manner and patterns in which they can be applied. In some embodiments, nanostructured PCMs and thermoregulatory coatings will completely cover a substrate or article. In other embodiments, nanostructured PCMs and thermoregulatory coatings will cover only a portion of a substrate or article, such as one or more of a top, side or bottom of an object.

In another embodiment, nanostructured PCMs and thermoregulatory coatings are applied to a ribbon, tape, or sheet that may then be applied to a substrate or article by any suitable means including adhesive applied to the substrate or article, the ribbon, tape, or sheet, or a combination thereof.

To improve adherence of nanostructured PCMs and thermoregulatory coatings to a substrate or article, a substrate or article may be treated or primed, such as by abrasion, cleaning with solvents or application of one or more undercoatings or primers.

As discussed above, a wide variety of articles may be coated with nanostructured PCMs and thermoregulatory coatings of the invention. Non-limiting examples of such articles include metal plates, metal sheets, metal ribbons, wires, cables, boxes, insulators for electric equipment, roofing materials, shingles, pipes, cardboard, glass shelving, glass plates, printing paper, metal adhesive tapes, plastic adhesive tapes, paper adhesive tapes, fiber glass adhesive tapes, bridges, roads, buildings, car seats, automobile interiors, electronic devices, machinery, furniture, aerospace equipment, packaging, medical equipment, semiconductors, solar cells, solar panels, windmill blades, pumps, propellers, railings, and industrial equipment. In an embodiment, "smart" (e.g., energy efficient, environmentally-friendly) building envelopes are provided using nanostructured PCMs or thermoregulatory coatings of the invention. In another embodiment, solar thermal storage capture is provided using nanostructured PCMs or thermoregulatory coatings of the invention.

In some embodiments, a coated article's breathability, flexibility, softness, appearance, feel and/or hand is substantially the same as that of an uncoated article.

In some embodiments, cooling textiles can be obtained by depositing nanostructured PCMs and thermoregulatory coatings on fibers or fabrics. It should be understood that any fibrous surface or fabric which can bind nanostructured PCMs and thermoregulatory coatings of the invention may be used. Fibrous surfaces according to the present invention include fibers, woven and non-woven fabrics derived from natural or synthetic fibers and blends of such fibers, as well as cellulose-based papers, leather and the like. They can comprise fibers in the form of continuous or discontinuous monofilaments, multifilaments, staple fibers and/or yarns containing such filaments and/or fibers, and the like, which fibers can be of any desired composition. The fibers can be of natural, manmade or synthetic origin. Mixtures of natural fibers and synthetic fibers can also be used. Included with the fibers can be non-fibrous elements, such as particulate fillers, binders and the like. Fibrous surfaces of the invention are intended to include fabrics and textiles, and may be a sheet-like structure comprising fibers and/or structural elements. A sheet-like structure may be woven (including, e.g., velvet or a jacquard woven for home furnishings fabrics) or non-woven, knitted (including weft inserted warp knits), tufted, or stitch-bonded.

Thermoregulatory, e.g., cooling, fabrics can thus be used to make clothing and apparel. For example, socks, hosiery, underwear, garments such as jackets, coats, shirts, pants, uniforms, wet suits, exercise clothing, diving suits and bathing suits, hats, scarves, fabrics for footwear, and shoes can be coated. Home furnishing fabrics including bedding items, bedsheets, bedspreads, comforters, blankets, pillows or pillow coverings, fabrics for outdoor furniture and equipment, car upholstery, floor coverings such as carpets, area rugs, throw rugs and mats, and fabrics for industrial textile end uses may also be coated. Cotton-containing materials may be coated after procedures such as dyeing of the cotton. Cotton materials may be provided as a blend with other natural and/or synthetic materials.

Cooling fabrics can thus be used to make clothing and apparel. In further embodiments, thermoregulatory coatings are used on leather products, such as leather jackets, leather shoes, leather boots, and leather handbags. Thermoregulatory coatings may also be used on suede products.

Nanostructured PCMs and thermoregulatory coatings may be applied to textiles before manufacture of an article, e.g., before manufacture of an article of clothing, or coatings may be applied after an article has been made. In some cases, coatings may be applied by a retailer or by a consumer after purchase.

In an embodiment, there is provided a cooling garment comprising a nanostructured PCM or thermoregulatory coating of the invention, wherein the nanostructured PCM or thermoregulatory coating undergoes multiple endothermic phase transitions. In an embodiment, the nanostructured PCM or thermoregulatory coating absorbs at least 200 J/g or at least 250 J/g of heat during phase transition. In another embodiment, the cooling garment further reflects solar heat or IR radiation, e.g., up to 90% of solar heat or IR radiation. In yet another embodiment, the cooling garment further solubilizes sweat. In one embodiment, the cooling effect of the cooling garments persists for at least 60 minutes. In another embodiment, the cooling effect persists for at least 30 minutes, at least 45 minutes, at least 60 minutes, at least 75 minutes, at least 90 minutes, or at least 120 minutes. In another embodiment, the cooling garment further comprises an infrared (IR) reflective layer. An IR reflective layer may comprise, for example, a thermotropic polymer that undergoes an optical transition at elevated temperatures and scatters light; Tannin, a substance that naturally reflects solar heat or IR radiation in tree leaves (Tannin deflects radiation in the Near Infrared region, thus deflecting solar heat or IR radiation); and/or a liquid crystalline polymer that reflects heat or IR radiation.

In one embodiment, cooling garments provided herein provide both heat absorption and IR reflection. For example, a cooling garment may provide a cooling effect to a subject of 5-10° C. for at least one hour. In an embodiment, a cooling garment comprises an inner coating which absorbs at least 200 J of heat per g of textile at a transition temperature range of 29-40° C., and an outer coating which reflects at least 90% of IR radiation or solar heat. Such a garment may also promote dryness and comfort of the subject. In an embodiment, a cooling garment is made from non-flammable, non-toxic, and non-irritating materials.

In another embodiment, a thermoregulatory coating is resistant to wash/dry cycles, e.g., resistant to at least about 10 wash/dry cycles, at least about 15, at least about 20, at least about 25, or at least about 30 wash/dry cycles.

In an embodiment, nanostructured PCMs and thermoregulatory coatings provided herein are easily integrated into standard textile manufacturing processes, without requiring new machinery or extensive revisions to existing processes.

EXAMPLES

The present invention will be more readily understood by referring to the following examples, which are provided to illustrate the invention and are not to be construed as limiting the scope thereof in any manner.

Unless defined otherwise or the context clearly dictates otherwise, all technical and scientific terms used herein have the same meaning as commonly understood by one of ordinary skill in the art to which this invention belongs. It should be understood that any methods and materials similar or equivalent to those described herein can be used in the practice or testing of the invention.

Example 1. Effect of Cellulose-Based Polymers on Heat Capacity of Nanocomposite PCMs Although hydroxypropyl cellulose (HPC), microcrystalline cellulose (MCC) and nanocrystalline cellulose (NCC) are in the same family of cellulose-based polymers, they differ significantly from each other. In HPC, the hydroxyl groups of cellulose are replaced with hydroxypropylated groups. Due to this esterification, HPC is more hydrophobic than pure cellulose and undergoes phase transition at a lower critical solution temperature of 45° C. HPC remains crystalline and forms nematic phases.

On the other hand, MCC maintains the hydrophilic nature of pure cellulose with free OH groups. MCC is obtained through depolymerisation of native α-cellulose with mineral acids. NCC, of the same chemical structure as MCC, is obtained through sulphuric acid hydrolysis of MCC whereby the acid dissolves the amorphous domains of the cellulosic backbone, leaving nanoscopic crystalline domains. NCC can also be obtained from biological processes as a product of biodegradation of native α-cellulose by bacteria. NCC surface can be modified either by chemical or biological processes to add functional groups to its surface, such as carboxiles, urethanes, esters, etc.

In addition to their highly hydrophilic nature, MCC and NCC are distinguished from HPC by the high aspect ratio of the fibrils or whiskers formed during the crystallization process. NCC has the highest aspect ratio (l/d) of 70 while the aspect ratio for MCC is around 20-40, depending on the source of cellulose. The aspect ratio of HPC is between 1 and 5.

The structure of HPC is as follows:

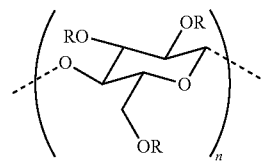

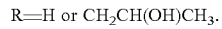

R=H or $CH_2CH(OH)CH_3$.

The structure of MCC is as follows:

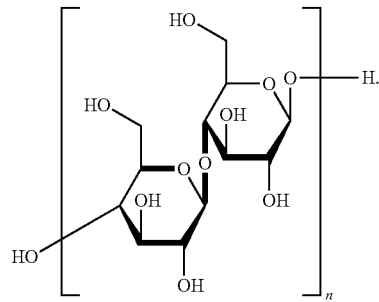

Figure 6:
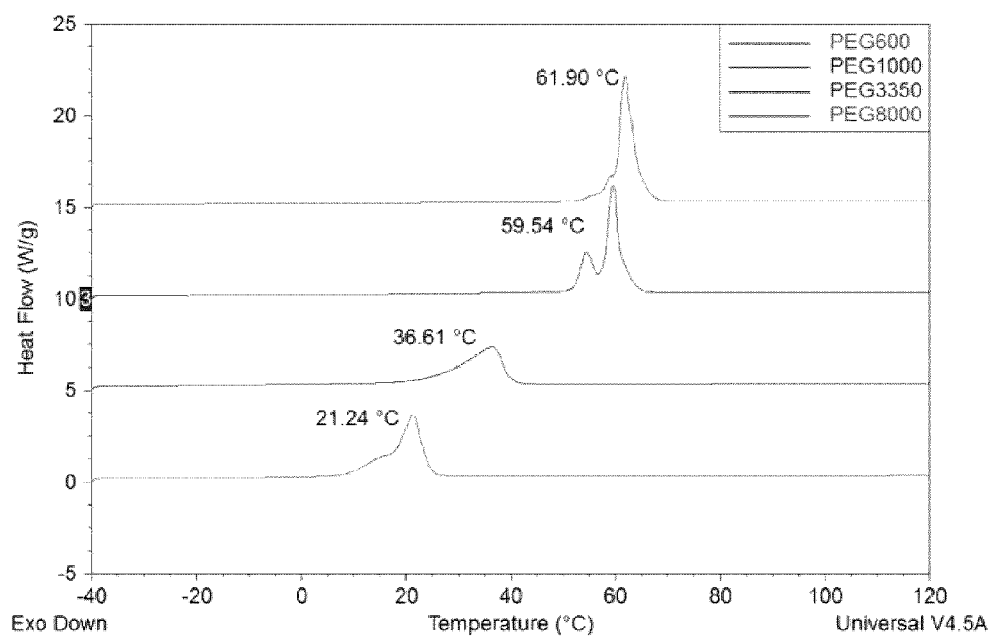
FIG. 6 shows DSC measurements for PEGs of different molecular weights. Green: PEG600; Blue: PEG1000; Brown: PEG3350; Red: PEG8000. PEG1000 (blue) had a transition temperature in the 35-37° C. range, indicating its suitability for use as a nanostructured PCM in cooling textiles or garments.

In order to evaluate these three polymers as possible crystalline fillers or reinforcing agents for use in nanocomposite PCMs of the invention, various blends of a phase-change polymer, PEG, with cellulosic polymers were prepared, as described below (see section headed "Method of Dispersion"). The choice of molecular mass of PEG was determined through DSC measurements (see FIG. 6). Textile and packaging film applications require a transition between 33-40° C., which corresponds to the onset of heat stress in the case of textiles, and food spoilage in the case of packaging films. PEG1000 was chosen as it would be best suited for textile and packaging film applications, based on data in FIG. 6.

Figure 2:
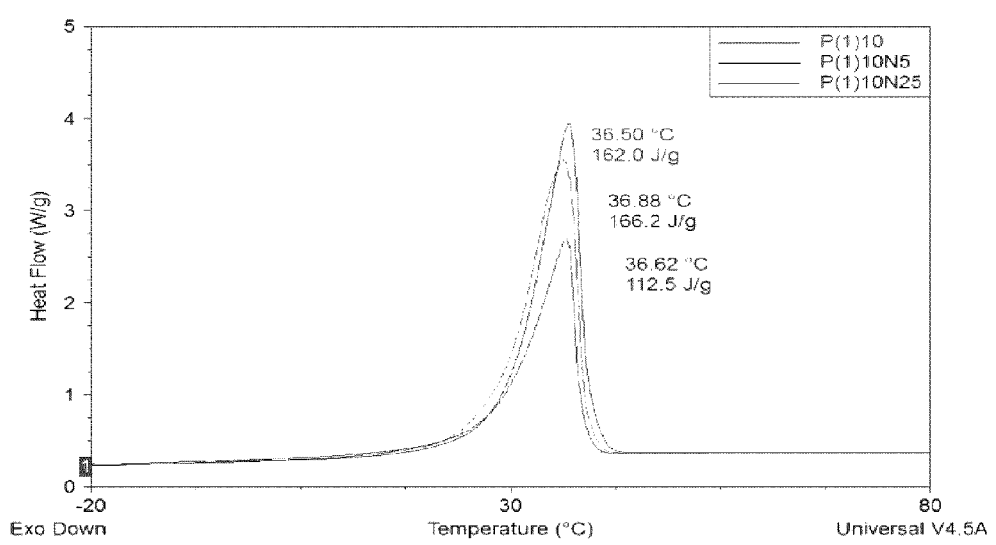
FIG. 2 shows a plot of Dynamic Scanning calorimetry (DSC) measurements for PEG1000 (Green), PEG1000 with 5% NCC (blue), and PEG1000 with 25% NCC (red). Melting temperature (° C.) and heat enthalpy (J/g) are given. The figure shows that melting temperature and heat enthalpy of PEG1000 were unaffected by addition of 5% NCC and only slightly lowered by mixtures of up to 25% NCC.
Figure 5:
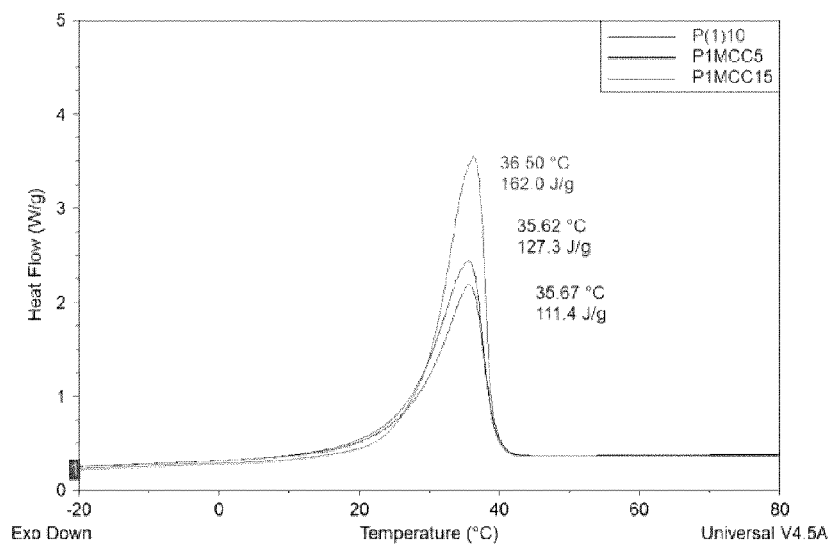
FIG. 5 shows DSC measurements for PEG1000 (green) mixed with either 5% (blue) or 15% (red) of microcrystalline cellulose (MCC) (A) or hydroxypropyl cellulose (HPC) (B). In contrast to mixtures of NCC, heat enthalpy was markedly diminished with addition of 5% MCC or HPC.
Figure 5:
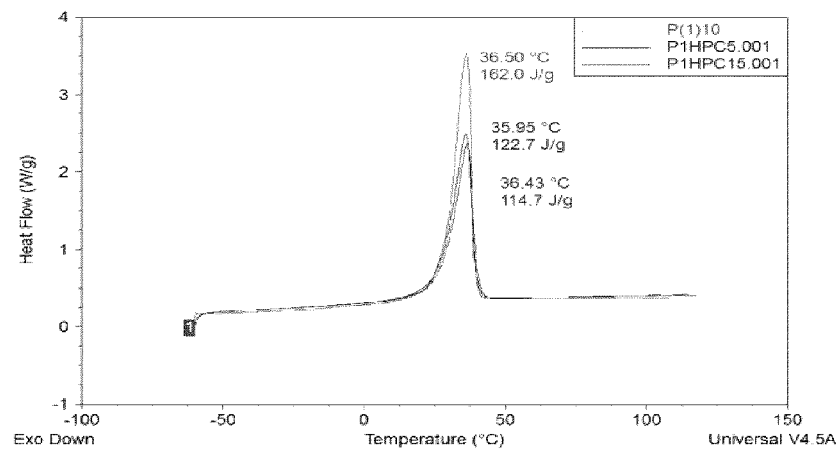

We saw strong differences in behaviour among the three cellulosic materials tested (FIGS. 2 and 5). MCC had a negative effect on the heat capacity of PEG1000. While pure PEG1000 has a high melting enthalpy of 165 J/g, its heat capacity significantly decreased with the addition of even 5% MCC (127 J/g) and 15% MCC (111 J/g) (FIG. 5). Similar results were observed with a HPC-PEG blend.

Figure 8:
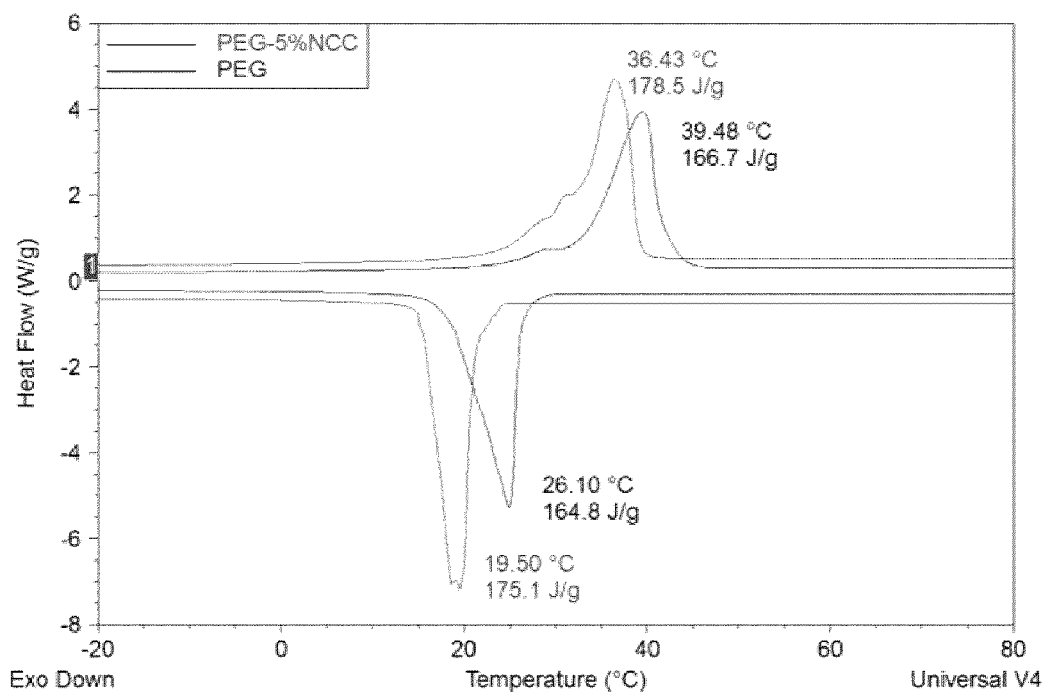
FIG. 8 shows comparison between DSC measurements for a phase-change polymer (PEG1000) with and without nanocrystalline filler (5% of spray-dried NCC). It is evident that including the nanocrystalline filler into the phase-change polymer matrix enhances heat absorption.
Figure 9:
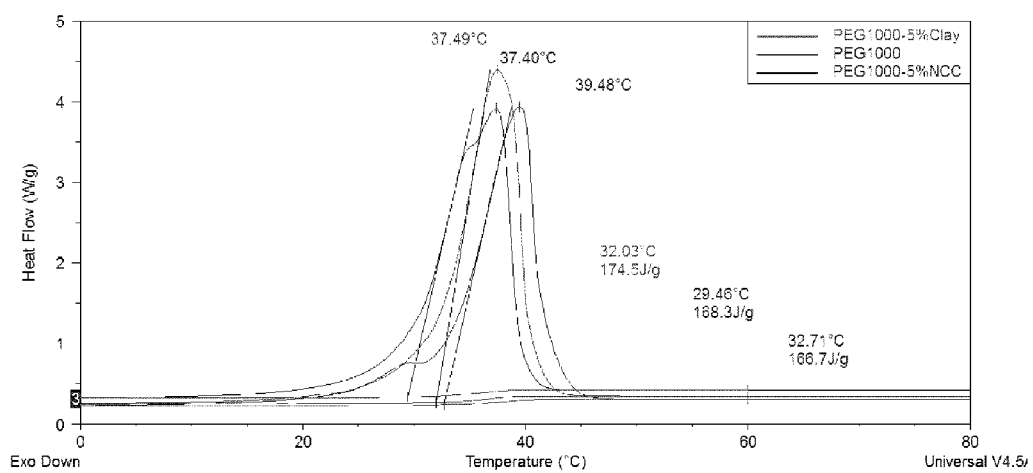
FIG. 9 shows comparison between DSC measurements for PEG1000 reinforced with 5% of nanoclay and 5% of NCC, dispersed in water. Composites with nanoclay gave better heat absorption results, even better than PEG1000 alone.
Figure 10:
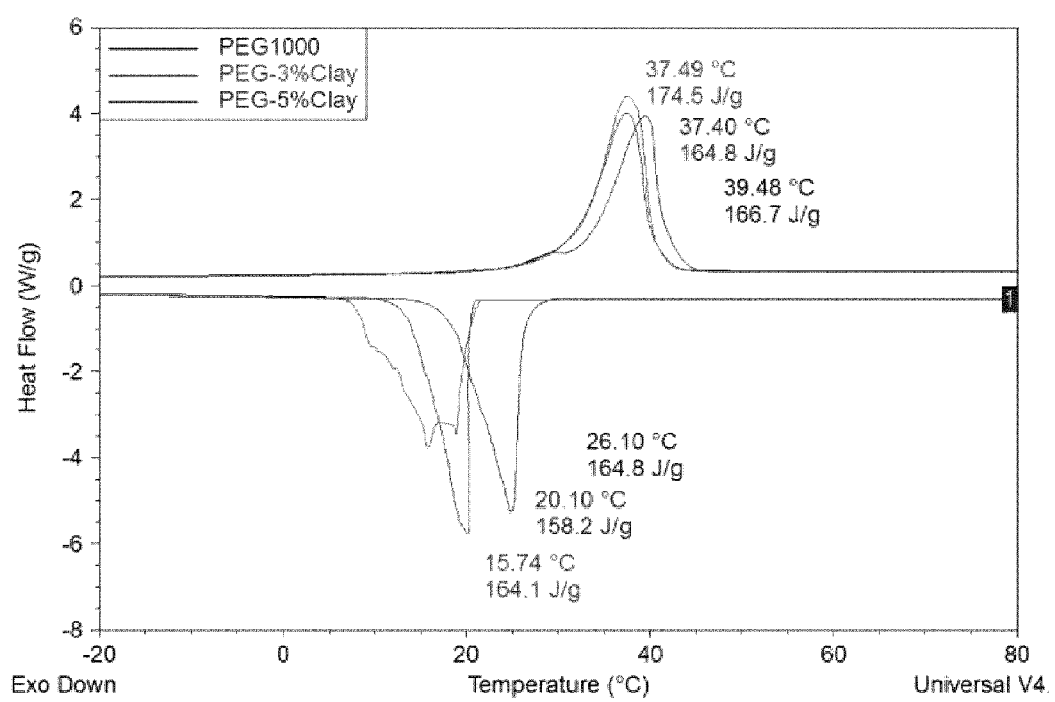
FIG. 10 shows comparison between DSC measurements for PEG1000 reinforced with 3% and 5% of nanoclays. Composites reinforced with 5% of nanoclay gave the best heat absorption results, showing heat absorption improvement compared with that obtained with NCC composites.
Figure 11:
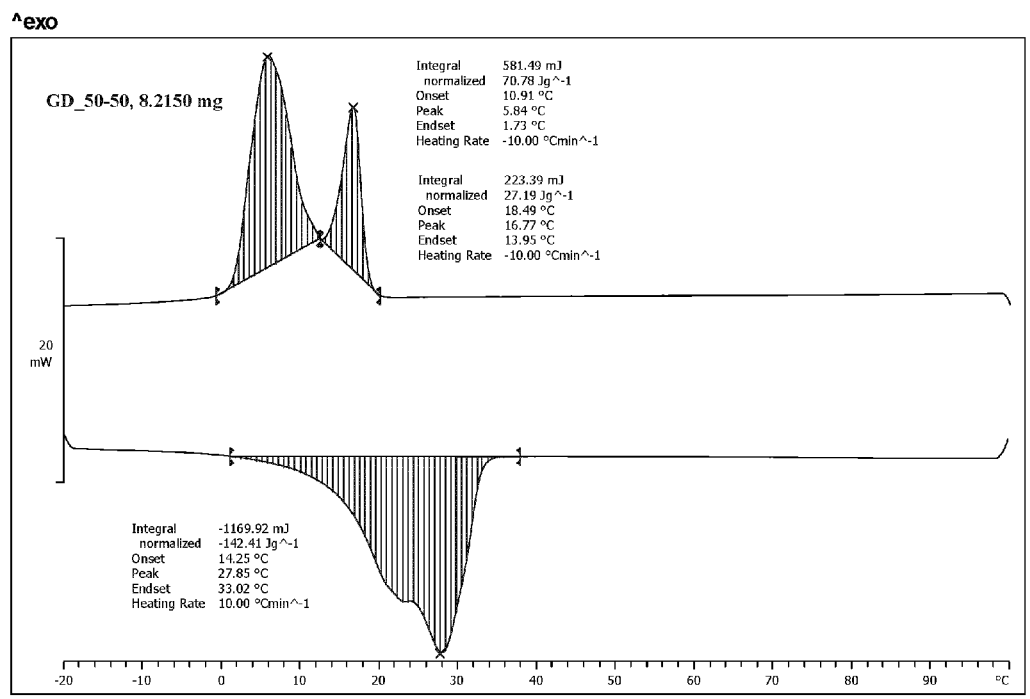
FIG. 11 shows a DSC scan of a blend of PEG1000 and Fatty Acids (34% Myristic Acid/66% Capric Acid) with the endotherm (melting enthalpy) shown in the bottom peak. The peak transition temperature was 27.9° C. which is substantially shifted from the 36.5° C. peak of PEG alone (shown in FIG. 2).
Figure 12:
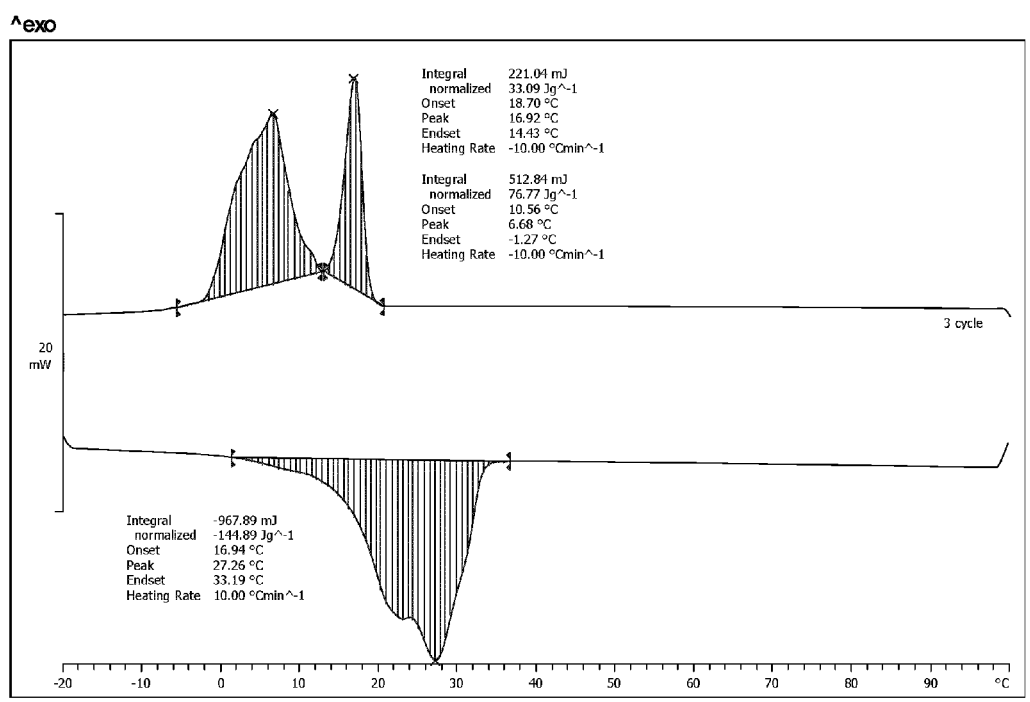
FIG. 12 shows a DSC scan of a blend of PEG1000 and Fatty Acids (34% Myristic Acid/66% Capric Acid) reinforced with a nanoclay filler. The endotherm (melting enthalpy) is shown in the bottom peak. The melting enthalpy of 145 J/g showed no significant change from that of the PCM in the previous figure (FIG. 11) (142 J/g).

However, NCC did not significantly decrease heat capacity of PEG1000. A 5% PEG-NCC blend produced a statistically insignificant decrease in heat capacity at 162 J/g (compared to 166 J/g) (FIG. 2). In addition, we found that a 5% PEG-NCC blend produced using a spray-dried sample of NCC increased heat capacity from 167 to 179 J/g (FIGS. 8, 9). Further, a 3% PEG-nanoclay blend produced from hydrophilic nanoclay increased heat capacity from 167 to 175 J/g (FIG. 10).

Figure 13:
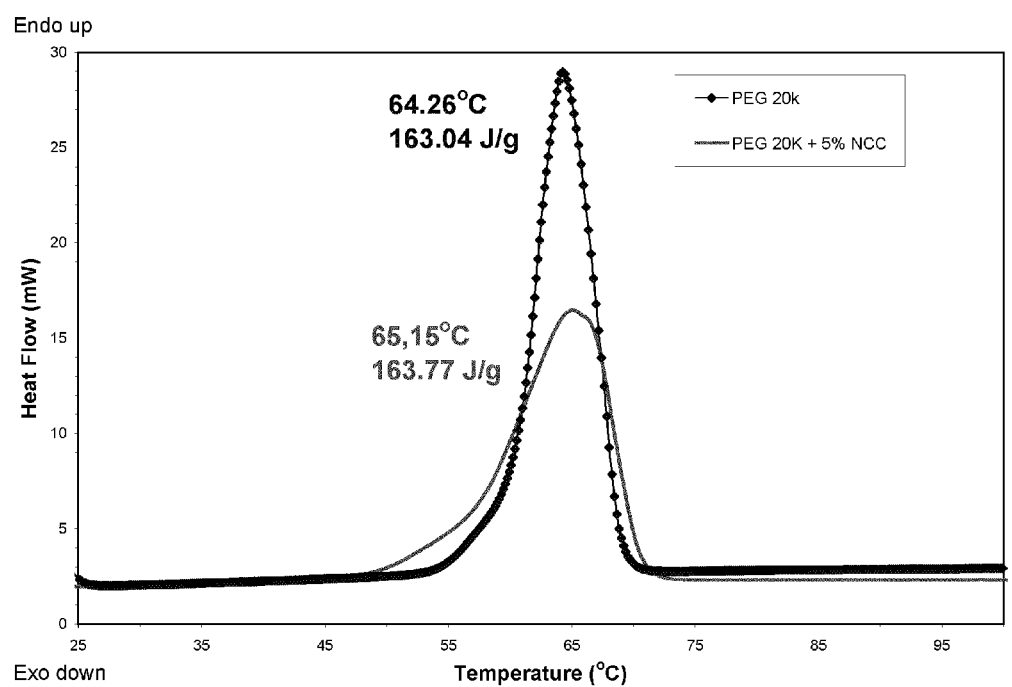
FIG. 13 shows DSC measurements of pure PEG 20k (♦) and PEG 20k with 5% NCC (w/w) (–). Melting temperatures (° C.) and heat enthalpy (J/g) are given. The data show that the melting temperature and the enthalpy were unaffected by the addition of NCC.

DSC measurements of pure PEG20K (purchased from Sigma-Aldrich) and PEG20K with 5% NCC (w/w) are also shown in FIG. 13. Melting temperatures and heat enthalpy are given. Data in FIG. 13 shows that melting temperature and enthalpy were unaffected by addition of NCC in a temperature range up to 70° C.

This marked difference in physicochemical behaviour of NCC as compared to MCC and HPC warranted further investigation through Fourier Transform Infrared Spectroscopy (FTIR) and Rheometry.

Figure 7:
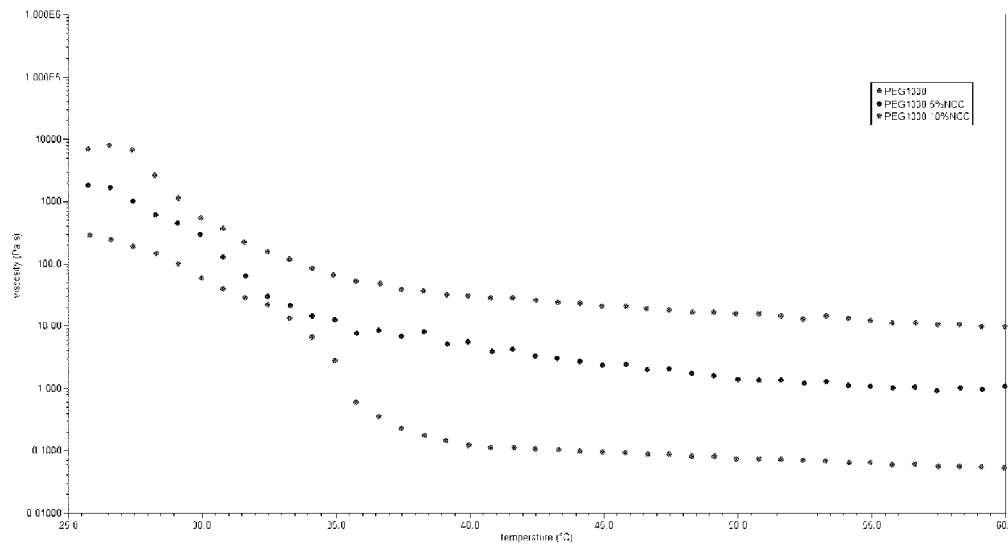
FIG. 7 shows Rheology measurements of PEG1000 mixtures with either NCC (A) or MCC (B). A change in sample viscosity at a transition temperature of 35° C. was seen with pure PEG1000 samples, indicating phase transition to liquid. NCC mixtures attenuated this change in viscosity, whereas MCC mixtures did not alter the viscosity change, indicating that only NCC was capable of supporting solid-solid phase transitions with PEG1000 as a nanocomposite PCM. In (A): Red: PEG1000; Blue: PEG1000 plus 5% NCC; Green: PEG1000 plus 10% NCC. In (B): Red: PEG1000; Blue: PEG1000 plus 5% MCC; Green: PEG1000 plus 15% MCC.
Figure 7:
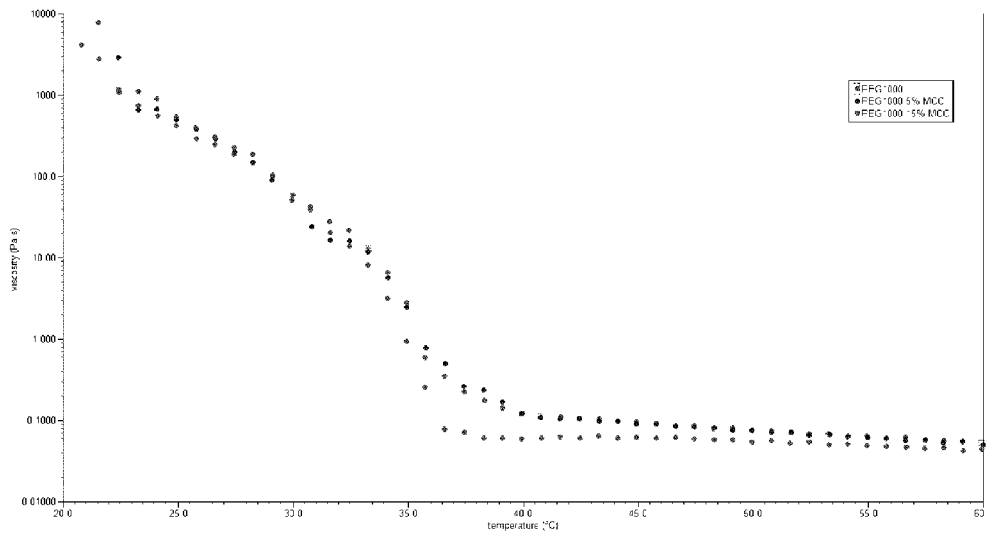

Rheological measurements for PEG blends with MCC and NCC, respectively, are shown in FIG. 7. Rheometry was used to measure the change in viscosity of a blend at various temperatures. For the PEG-MCC blend (FIG. 7B), a discontinuous decrease in viscosity from 1000 to 1 Pa. at around 35° C. was observed, corresponding to the onset of phase transition. In contrast, NCC underwent a much smaller, more continuous change in viscosity through heating.

Figure 3:
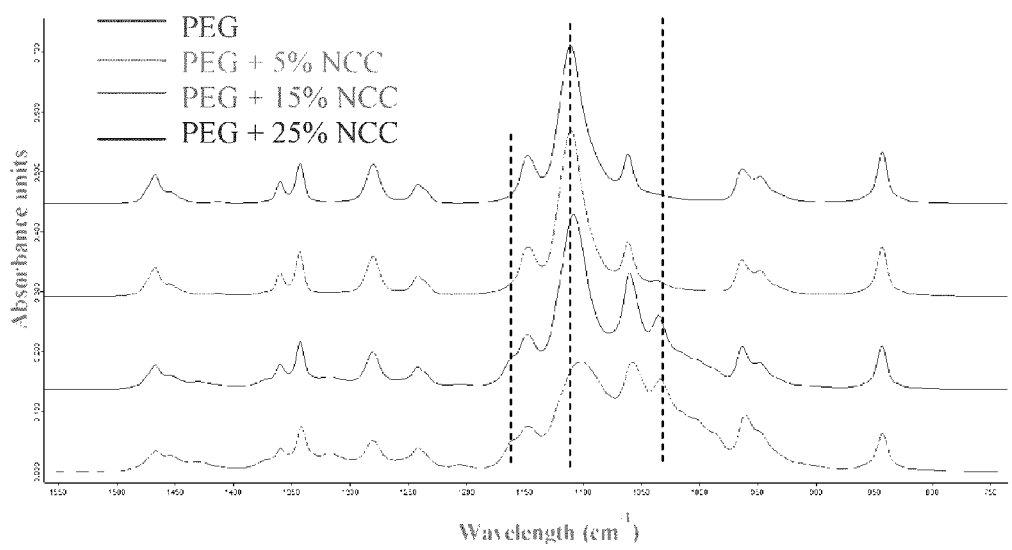
FIG. 3 shows a plot of Absorbance units vs. Wavelength for Fourier Transform Infrared Spectroscopy (FTIR) of different mixtures of NCC with PEG1000. Alterations in bands (dashed lines) suggest that hydrogen bonding occurred between PEG oxygen atoms and hydroxyl groups on NCC surface. Red: PEG1000; Blue: PEG1000+5% NCC; Green: PEG1000 plus 15% NCC; Black: PEG1000 plus 25% NCC.
Figure 4:
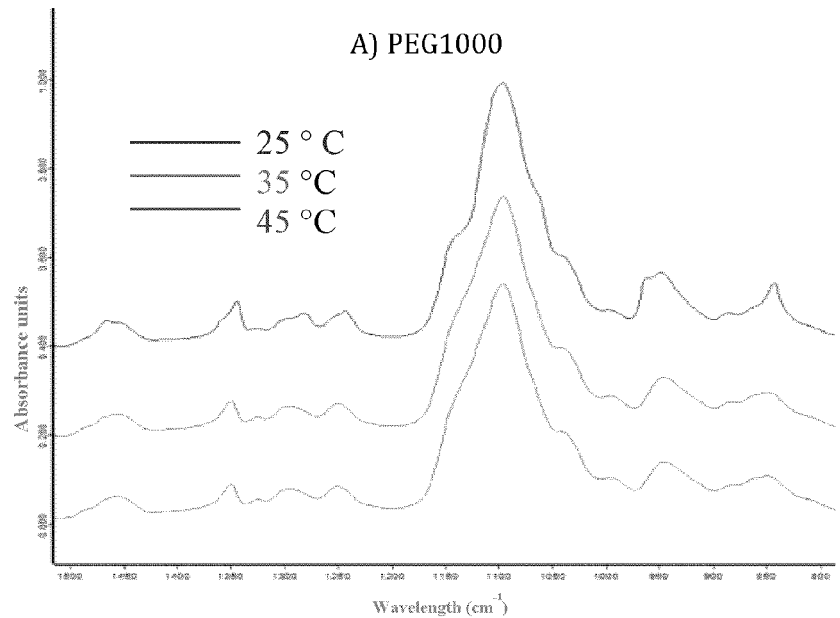
FIG. 4 shows FTIR measurements of pure PEG1000 (A) and PEG1000 plus 25% NCC (B) made at increasing temperatures. Spectra obtained at 35° C. (green) show that pure PEG has undergone melting transition, as highlighted by smooth peaks and its similarity to the spectra seen at 45° C. (red). The PEG/NCC mixture showed a different spectra at 35° C. with some sharp peaks, but melting transition was seen to be complete by 45° C. as the spectra resembled that seen for melted pure PEG. Black: 25° C.; Green: 35° C.; Red: 45° C.
Figure 4:
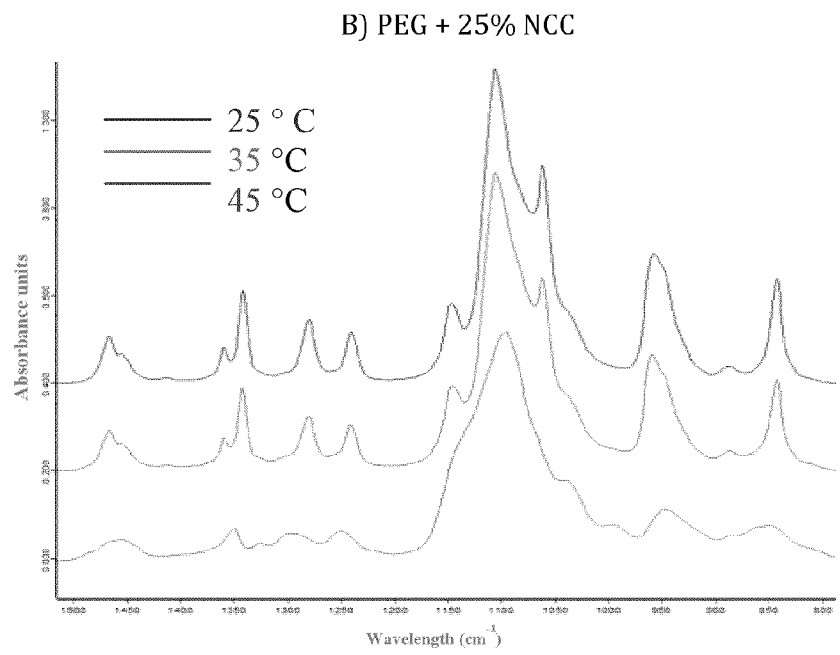

FTIR measurements indicated the presence of sharp hydrogen bonds (1100 and 1050 $cm^{-1}$) (FIG. 3). Without wishing to be bound by theory, these hydrogen bonds are believed to be key to stabilizing solid-solid PCMs of the invention. We showed that hydrogen bonds are maintained during the transition temperature at 35° C., before being destroyed at higher temperatures of 45° C., as expected (FIG. 4B). This result explains the stark difference between the behaviour of HPC and NCC in stabilizing a nanocomposite PCM. However, as both MCC and NCC are capable of forming hydrogen bonds with PEG1000, the difference between MCC and NCC is likely due to their different aspect ratios.

Figure 15:
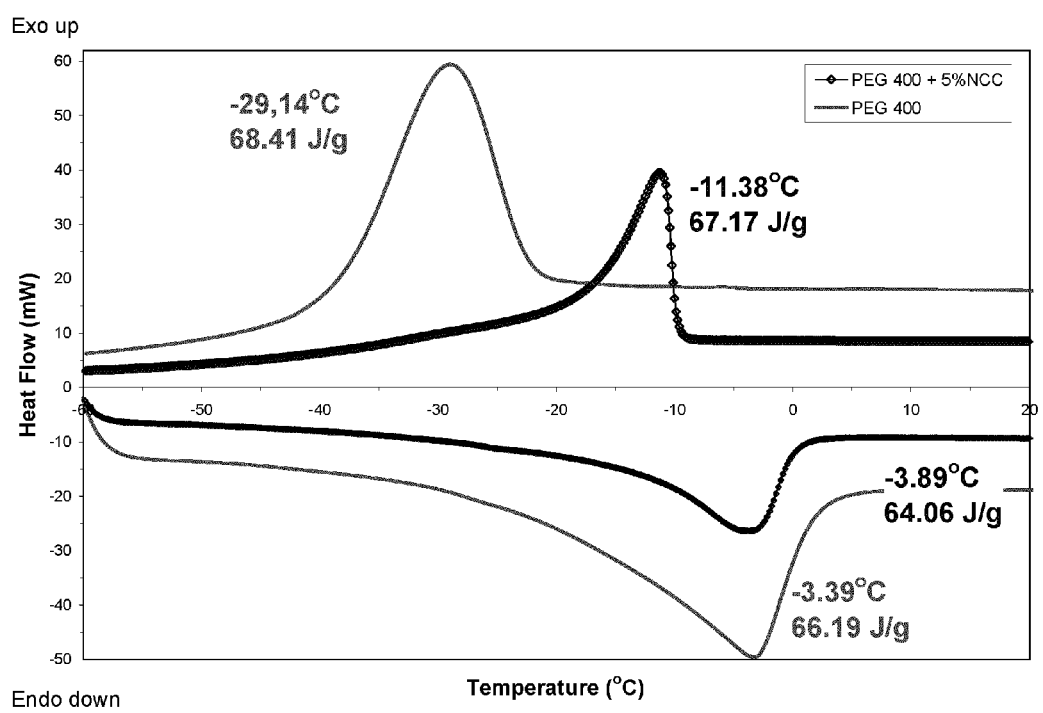
FIG. 15 shows DSC measurements of pure PEG 400 (–) and PEG 400 with 5% NCC (◊). Melting temperatures (° C.) and heat enthalpy (J/g) are given. The data show that the melting temperature and the enthalpy were unaffected by the addition of NCC. However, the presence of NCC affected the crystallization of PEG as the crystallization temperature increased in presence of NCC. NCC behaved as a nucleation agent and favored PEG crystallization.

FIG. 15 shows DSC measurements of pure PEG 400 (–) and PEG 400 with 5% NCC (◊). Melting temperatures (° C.) and heat enthalpy (J/g) are given. The data show that the melting temperature and the enthalpy were unaffected by the addition of NCC, including at temperatures below zero. However, the presence of NCC affected the crystallization of PEG as the crystallization temperature increased in the presence of NCC. NCC behaved as a nucleation agent and favored PEG crystallization. PEG 400 was purchased from Sigma-Aldrich.

Figure 16:
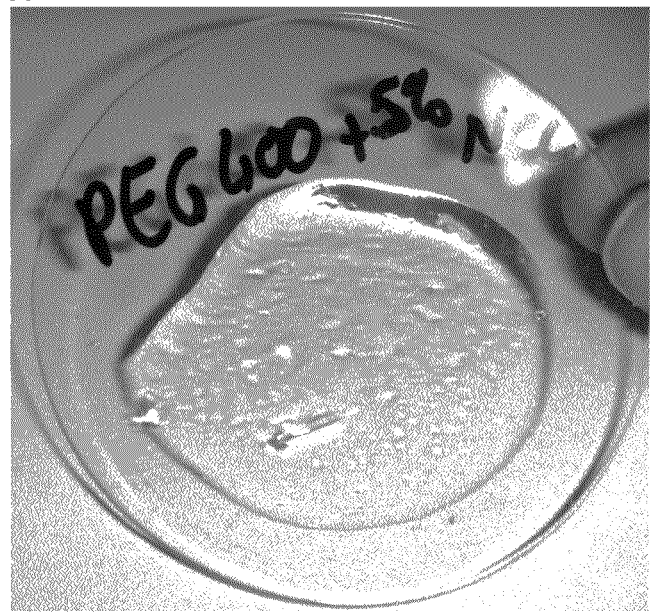
FIG. 16 shows pictures of PEG 400+5% NCC mixture (A) and PEG 400 (B) at room temperature. Addition of NCC to PEG 400 formed a highly viscous mixture compared to pure PEG 400, well beyond the phase transition of PEG 400. These results show that PEG 400+5% NCC has a solid-like behavior (under no shear and no stress) at temperatures higher than its melting temperature.
Figure 16:
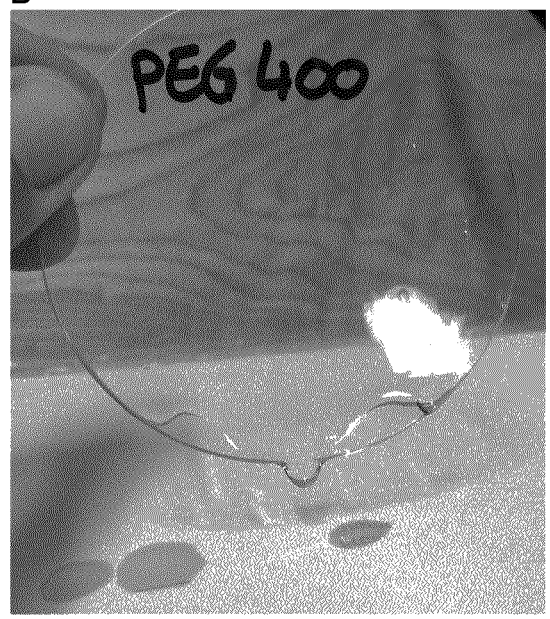

FIG. 16 shows that PEG400+5% NCC has a solid-like behavior, under no shear and no stress, at temperatures higher than its melting temperature. A few mL of pure PEG 400 or PEG 400+5% NCC solution were deposited on a wash glass for drying. Addition of NCC to PEG 400 formed a highly viscous mixture compared to pure PEG 400, well beyond the phase transition of PEG 400.

Example 2. Thermoregulatory PET Packaging Film

Crosslinked PNIPAM was synthesized by combining a 10% (w/w) NIPAAM solution with 2% MBA crosslinker and ammonium persulfate as a crosslinker. The resulting solution was degassed with nitrogen, applied directly to a PET packaging film and allowed to react at room temperature for 2 hours. The resulting coating was rinsed repeatedly in deionized water to remove residual reagents and monomers. The process was repeated a few times to achieve a coat thickness of about 200 microns.

The resulting packaging film was used to wrap chocolate bars. The chocolate bars stayed cool and melt-resistant at elevated air temperatures of 25° C. to 35° C., for up to an hour.

Example 3. Thermoregulatory Wipe

Poly(ethylene glycol) reinforced by NCC as described herein was sandwiched between two plys of facial tissue. A 1% xylitol solution was added to the blend. The resulting wipe, when placed in contact with the brow and face, provided an instant cooling sensation through heat and sweat absorption.

Example 4. Cooling Garment

HPMC dispersed in NCC as described herein was directly applied, through screen printing, to an upper garment (a polyester-blend shirt) to provide a thermoregulatory coating on the shirt. The coated shirt can be worn in hot and humid weather (75% humidity, 40° C.) and may keep the wearer cool for up to an hour.

Example 5. Paper

Figure 14:
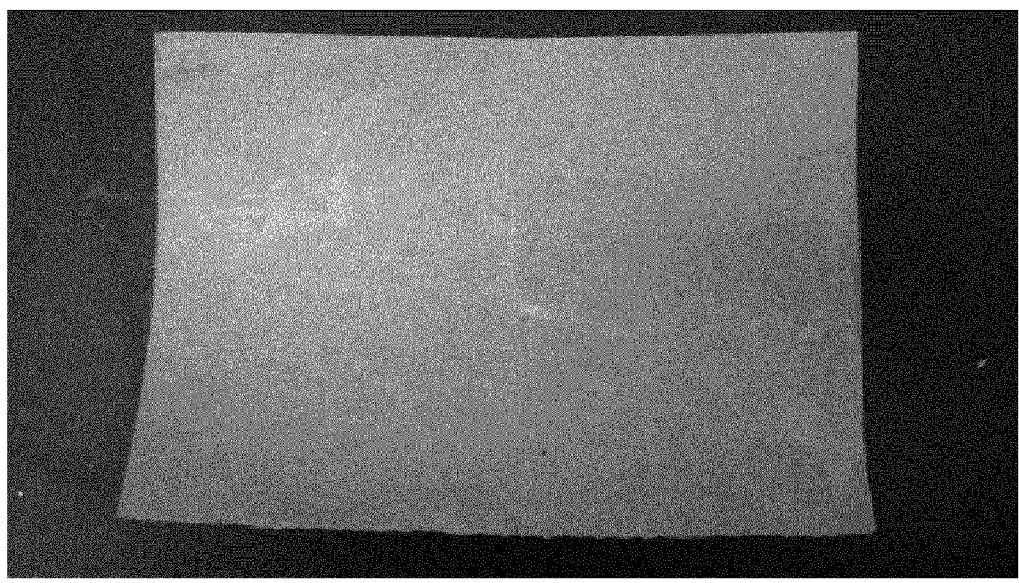
FIG. 14 shows that PEG/NCC nanocomposites are coatable on paper.

About 3 mL of a solution containing a PEG8000/NCC nanocomposite was deposited on paper and coated on the paper using a glass stir rod. The solution was coated on the paper to form a thin film. These results show that PEG/NCC nanocomposites are coatable on paper (FIG. 14).

Materials and Methods for Above Examples

Reagents

PEG600 (MW 570-630), PEG1000 (MW 950-1050), PEG3350 (MW 3,015-3685), PEG8000 (MW 7,000-9,000), Fatty acids (Myristic and Capric Acid) and microcrystalline cellulose powder were all purchased from Sigma-Aldrich (St. Louis, Mo.). Organically modified nanoclay (Closite 116) was purchased from Southern Clay products (Gonzales, Tex.). Nanocrystalline cellulose powder was supplied by FP Innovations (Point-Claire, QC) and was obtained from bleached paper pulp by sulfuric acid hydrolysis and dried up to obtain crystals. 9% nanocrystalline cellulose dispersion in water was supplied by Biovision Technology (Mount-Royal, QC) and was obtained from a biological process. Hydroxypropyl cellulose (1500 cps) was purchased from Galenova (St. Hyacinthe, QC).

Method of Dispersion

To create physical nanocrystalline cellulose (NCC)/polyethyleneglycol (PEG) blends, the mass of NCC to be added was calculated as a percentage of the final mass of PEG used in a dispersion. The appropriate amount of NCC powder was added to distilled water which was pre-heated to 80 or 90° C. for microcrystalline and hydroxypropyl cellulose dispersions. The NCC/water mixture was agitated vigorously with a stir bar until the mixture appeared homogeneous. A 10% mass to volume ratio of PEG was then added to the water dispersion. The mixture was then heated at 60° C. for 2 hours while stirring and then dried in a vacuum oven at 60° C. for 48 hours to obtain coating material.

Alternatively, a higher solids content dispersion was prepared as follows: 5% spray-dried NCC powder was added directly to melted PEG and the mix was subjected to ultrasonification for two hours. Finally 10% of final volume of distilled water was added to dispersion and the mix was again sonicated for two hours.

Physical blends of PEG and organically modified nanoclays were prepared by dispersing 3-5% nanoclay in distilled water and sonicating for 1 hour before mixing at 500 rpm for 20 minutes. The clay dispersion was added in equal proportion to melted PEG to form a 50% solids dispersion that was then sonicated for 10 minutes and mixed vigorously. Further, this dispersion was also used to mix in equal measures with a melted 34% Myristic Acid/66% Capric Acid blend, forming a PEG/Fatty Acid/Nanoclay composite.

PNIIPAM and HPC nanocomposites were made at room temperature or below the LCST of the phase-change polymer, under conditions where the total (monomer+reactant) solution does not exceed 20% of the total reagent concentration. Thus, PNIIPAM and HPC gels were all carried out at room temperature and the total monomer+reactant solution was 20% total.

Dynamic Scanning Calorimetry (DSC)

DSC experiments were performed on a Q1000 Dynamic Scanning Calorimeter from TA Instruments (New Castle, Del.) calibrated with Indium. Briefly, 5-10 mg of dried samples were inserted in a DSC pan. Starting at room temperature, samples were heated up to 120° C. at 10° C./min to erase thermal history and then kept isothermal for 10 min. For crystallization, samples were cooled down to −60° C. at 10° C./min and then kept isothermal for 10 min. To perform the scan, samples were heated up to 120° C. at 10° C./min.

Fourier Transform Infrared Spectroscopy (FTIR)

FTIR experiments were performed with a Vertex 70 FTIR instrument from Bruker Optics (Billerica, Mass.). Briefly, dried samples were placed into a single reflection attenuated total reflectance (ATR) accessory from Pike Technologies (Madison, Wis.), with a silicon ATR crystal and scanned using a MCT detector cooled by liquid nitrogen. Temperature IR spectra were generated with golden gate ATR accessory from Specac (Slough, UK).

Rheology

Rheological experiments were performed using an AR 2000 rheometer from TA instruments equipped with a Peltier plate to control temperature. Measurements were made using a control shear rate of 10 (s−1) and a test geometry consisting of a cone plate with 40 mm diameter and 2 deg. cone angle. Prior to test, samples were heated by the plate to melting, then cooled to 10 degrees for crystallization. Temperature sweep was performed by heating at 10 degrees/min.

Example 6. PCM Nanoemulsions

In an embodiment, nanostructured PCMs of the invention are in the form of PCM nanoemulsions, which are a type of nanostructured PCM. PCM nanoemulsions are thermodynamically unstable emulsions formed through extreme "shear mixing" to form droplets between about 50-500 nm.

Nanoemulsions behave like viscoelastic solids at a critical radius and volume fraction of the dispersed phase. Further, this property is not disturbed by slight temperature changes, and viscosity of a nanoemulsion can be changed through shear.

In a PCM nanoemulsion, the phases are inverted when compared to PEG-NCC nanocomposites described herein. The continuous phase in a PCM nanoemulsion is a polymer substrate with no heat-absorbing properties of its own, whereas the dispersed phase has droplets of first agents such as fatty acid esters.

We designed and tested PCM nanoemulsions, based on fatty acid esters stabilized with sodium caseinate and dispersed either in water or a dilute solution of polymer such as Poly(vinyl alcohol).

Sodium caseinate (80% protein content) and fatty acid esters (methyl palmitate and methyl stearate) were purchased from Sigma-Aldrich. Emulsions of sodium caseinate and fatty acid esters were prepared by weighting 100 g of sodium caseinate 1.8% aqueous solution and 45 g of fatty acid ester. The final ratio (w/w) of sodium caseinate to fatty acid ester was 1:25. The mixture was pre-homogenized using a Polytron for three (3) minutes at 9000 rpm. The mixture was further homogenized under pressure using a Emulsi-Flex C5 (Avestin) homogenizer. The mixture was homogenized three (3) times at 5000 psi and one (1) time at 500 psi. 20 mL of the emulsion was used for particle size analysis while the rest of the emulsion was lyophilized.

Table 2 shows particle size of fatty acid ester droplets in emulsions prepared with different ratios of sodium caseinate to fatty acid ester.

Figure 17:
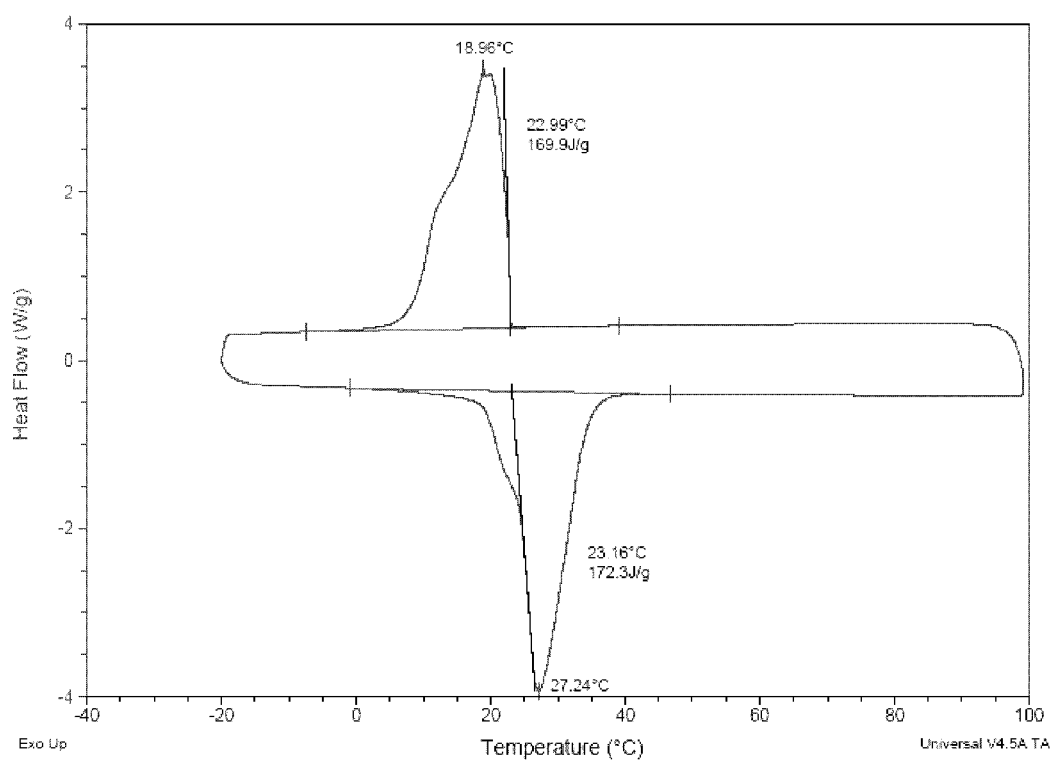
FIG. 17 shows DSC measurements of a lyophilized sodium caseinate/fatty acid ester (80% methyl palmitate/20% methyl stearate) emulsion. Melting and crystallization temperatures (° C.) and heat enthalpy (J/g) are given. The ratio of sodium caseinate to fatty acid ester was 1:25 (w/w).
Figure 18:
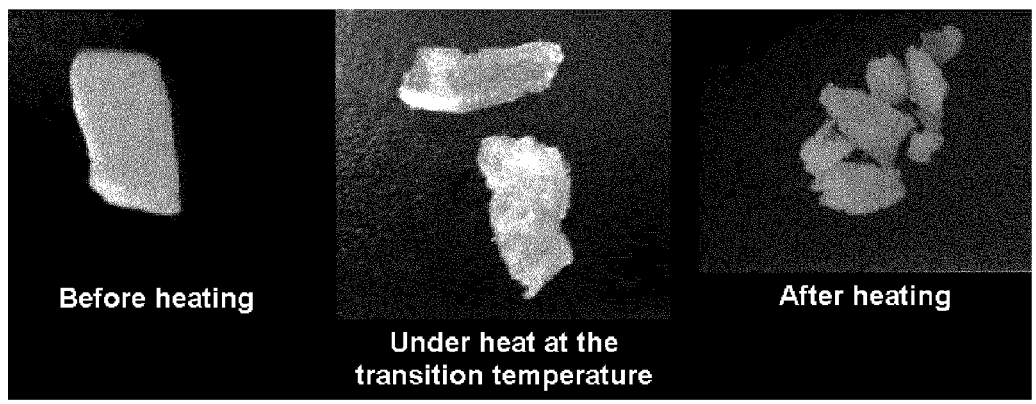
FIG. 18 shows: (A) Pictures of a lyophilized sodium caseinate/fatty acid ester (80% methyl palmitate/20% methyl stearate) emulsion below the transition temperature (Before heating), above the transition temperature (After heating) and at the transition temperature (Under heat at the transition temperature). The ratio of sodium caseinate to fatty acid ester was 1:25 (w/w): (B) shows a viscosity profile showing solid-solid transition of fatty acid esters stabilized with sodium caseinate (open circles) vs. pure fatty acid esters (filled circles).
Figure 18:
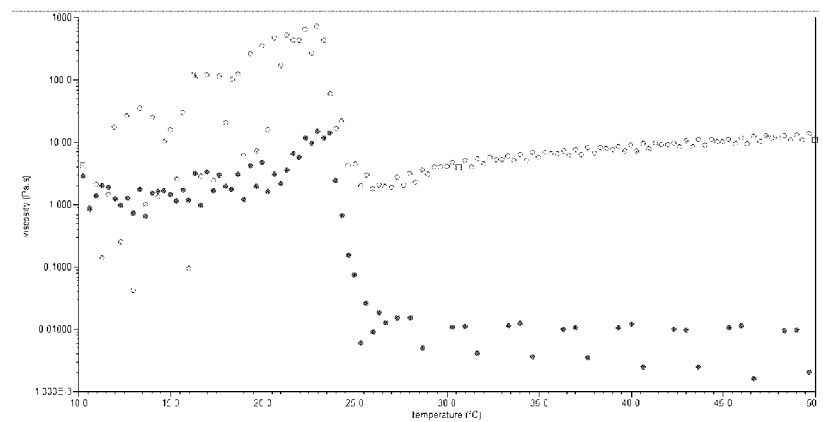

When freeze-dried, PCM nanoemulsions maintained their morphology and the particles were prevented from coalescing. These lyophilized nanoemulsions displayed solid-solid PCM behavior just like PEG-NCC nanocomposites described herein (FIGS. 17, 18).

TABLE 2

Particle size of fatty acid ester droplets in PCM nanoemulsions prepared with different ratios of sodium caseinate to fatty acid ester.

| Sodium caseinate:fatty acid ester (w/w) | Particle size (nm) | Poly-dispersity |
|---|---|---|
| 1:05 | 235 | 0.15 |
| 1:10 | 224 | 0.3 |
| 1:15 | 236 | 0.19 |
| 1:20 | 230 | 0.12 |
| 1:25 | 217 | 0.16 |
| 1:45 | 290 | 0.13 |

Example 7. Pluronic-NCC Nanocomposites

Nanocomposite PCMs using pluronic as the phase-change polymer were made and tested. Pluronic is a nonionic triblock copolymer composed of a central hydrophobic chain of polyoxypropylene (poly(propylene oxide)) flanked by two hydrophilic chains of polyoxyethylene (poly(ethylene oxide)). Its melting point is 55° C. where it undergoes a transition from a solid to a viscous liquid as shown in the rheological data in FIG. 19.

Figure 19:
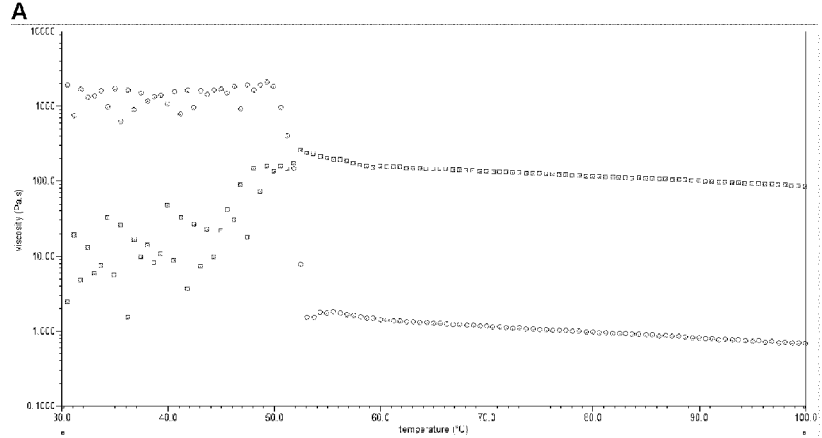
FIG. 19 shows rheological data for a pluronic-NCC nanocomposite. In (A), circles show pure pluronic and squares show pluronic)+5% NCC. In (B), DSC measurements of pure Pluronic (–) and Pluronic with 5% NCC (◊) are shown. Melting temperatures (° C.) and heat enthalpy (J/g) are given. The data show that the melting temperature and the enthalpy were unaffected by the addition of NCC. Further, NCC did not lose its viscosity properties after the transition temperature; NCC reinforced the polymer matrix and maintained a solid-solid like transition.
Figure 19:
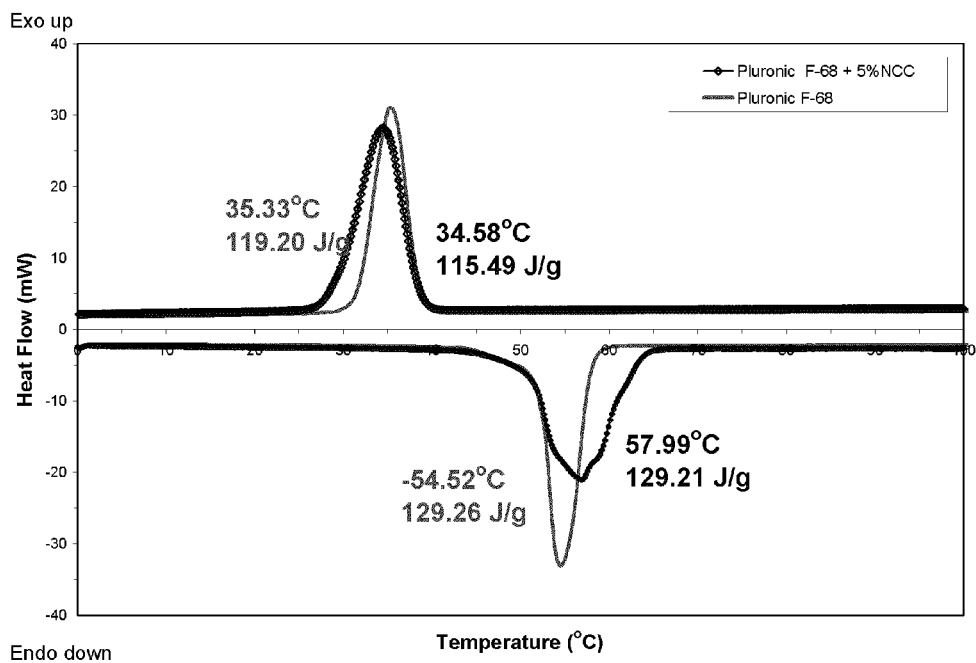

To 8.4 g of an aqueous NCC dispersion at 6.8%, 10 g of Pluronic was added and the mixture was stirred at room temperature until a homogeneous solution was obtained. A given amount of the mixture (~100 mg) was then dried at room temperature under a fume hood for at least 24 hours. The dried product was used for DSC and rheology measurements (FIG. 19).

The composition of the Pluronic was Poly(ethylene glycol)-b-poly(propylene glycol)-b-poly(ethylene glycol), 80 wt % PEG, MWt~8400:

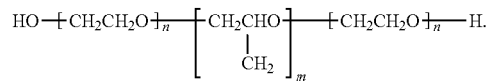

The data shows that, as in the case of PEG, the addition of a nanofiller such as NCC not only mechanically reinforced the polymer, as evidenced by an increase in viscosity at lower temperatures, but also maintained a solid-like state post-transition, as can be seen by a very slight dip in the viscosity. Further, the melting temperature and enthalpy of pluronic were unaffected by the addition of NCC (FIG. 19).

Example 8. PEG 20K vs PEG 20K+NCC

Figure 20:
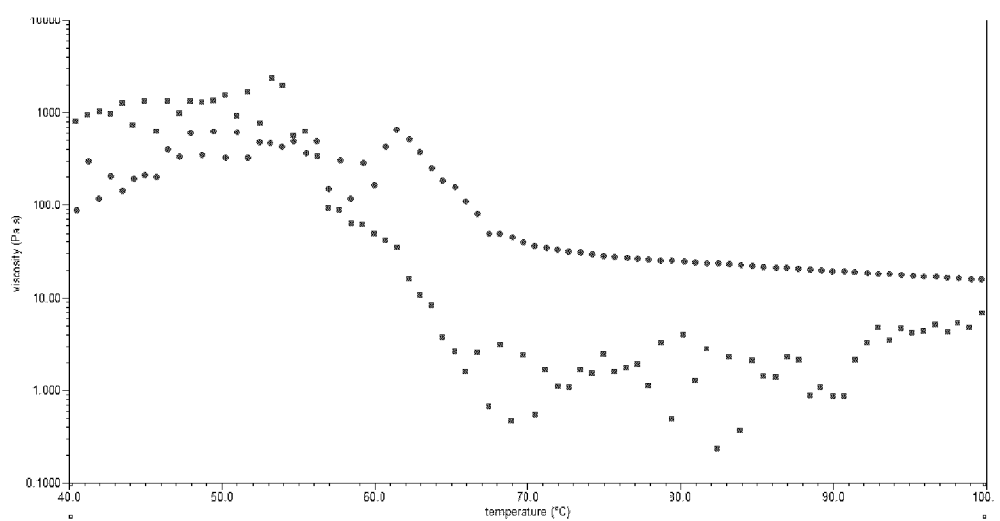
FIG. 20 shows PEG-NCC nanocomposites using PEG 20K. Squares show pure PEG 20K while circles show PEG 20K+5% NCC. NCC reinforced the polymer matrix and maintained a solid-solid like transition for PEG 20K.

The ability of NCC to create solid-solid PEG-based nanocomposite PCMs covers a wide range of molecular masses. FIG. 20 shows that while pure PEG 20K underwent a steep decrease in viscosity at the transition temperature of 60° C., the viscosity change in the case of PEG 20K-NCC was attenuated by the presence of nanofillers and as such remained solid-like when inspected visually. NCC reinforced the polymer matrix and maintained a solid-solid like transition, as seen for PEG of lower molecular mass.

Example 9. Performance Testing: Thermal Buffering Tests for Cardboard Boxes

We tested the thermal buffering behavior of our nanostructured PCMs in comparison with a reference substance and a negative control.

Figure 21:
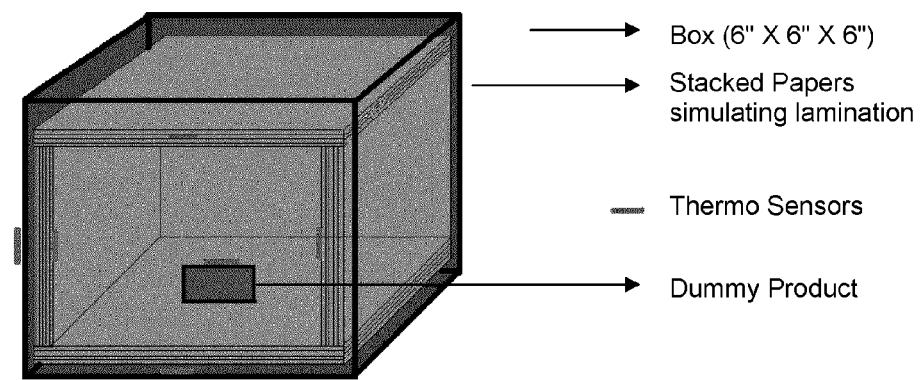
FIG. 21 shows a box containing stacked papers (inside rectangle) and indicates the position or assembly of thermal sensors.

Four cardboard boxes were prepared placing identical amounts of stacked papers in each internal face of the box (as shown in FIG. 21). Each box was loaded with stacked papers of the same weight and size, in order to compare our formulations to a positive and a negative control. Seven thermo sensors were placed inside each box in order to get sufficient data from different locations, inside and outside the box.

Thermocouples were fixed to the following positions in each of the test boxes: (A) Inside the box: centered at the bottom; centered on a wall; on an edge; on the middle of a dummy product; and centered on top; and (B) Outside the box: centered on a wall; and on the top.

Four boxes were prepared as follows:

(1) First box: This was the positive control. 10 sheets of paper (14.8 cm×20.8 cm) per face, 60 per box, were coated with a total amount of 140 g of Octadecane ($\Delta H_m$=220 J/g) as a reference product. Each sheet had on average 2.3 g of octadecane formulation, giving an average of 75 grams of coated formulation per square meter of paper. The sheets were stacked and introduced into the box along with 5 plastic bags containing a total amount of 1 liter of a glycerine solution in water, acting as a dummy product. This box was intended to act as a reference performance with a high heat-absorption capacity. However, the transition temperature turned out to be higher than that of our test nanostructured PCM formulation, and therefore its performance in the studied temperature range was inferior to the performance of our test formulation.

(2) Second box: This was the negative control. An amount of 10 uncoated sheets of paper (14.8 cm×20.8 cm) per face, 60 per box, were stacked and introduced into the box along with 5 plastic bags containing a total amount of 1 liter of a glycerine solution in water, acting as a dummy product. This box showed the performance that an untreated cardboard box (with the same amount of paper as insulation) delivered under the test conditions, and gave us a clear indication of how well our formulation performed compared with paper, which acted as passive insulation.

(3) Third box: This box contained a test nanostructured PCM formulation. We introduced into the box the same amount of paper sheets with the same specifications as in the first and second boxes, as well as the same amount of dummy product. Paper sheets were coated with a test nanostructured PCM formulation which was compatible with starch-based glues, containing a water-based starch solution and fatty acid ester mixture (80% methyl palmitate/ 20% methyl stearate) in a nanoemulsion, totaling 140 g as for the first box.

(4) Fourth box: This box contained a second test nanostructured PCM formulation. We introduced into the box the same amount of paper sheets with the same specifications as in the first three boxes, as well as the same amount of dummy product. Paper sheets were coated with a test nanostructured PCM formulation which was compatible with vinyl-based glues, containing a water-based poly(vinyl alcohol) solution and fatty acid ester mixture (80% methyl palmitate/20% methyl stearate) in a nanoemulsion, totaling 140 g as for the first box.

Figure 22:
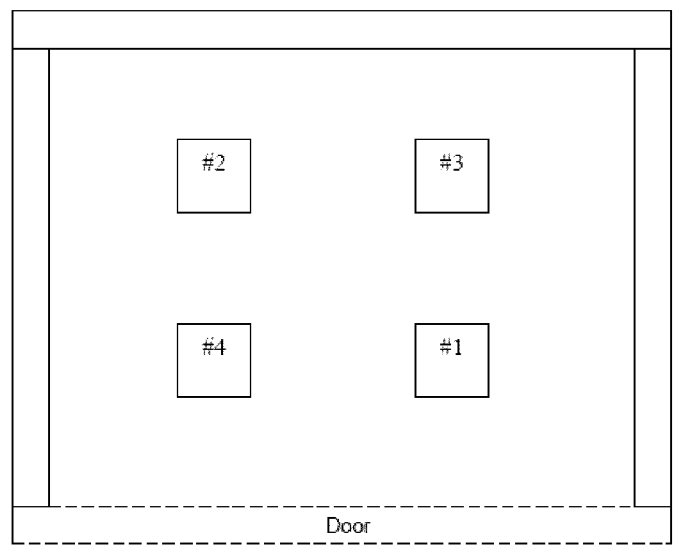
FIG. 22 shows an environmental chamber (36"×36"×36") containing test cardboard boxes.

Performance testing was performed in environmental chambers with temperature control. The four boxes were introduced into an environmental chamber (as shown in FIG. 22) and tested under the same environmental conditions. Thermal behaviour of the boxes was tracked using seven thermal electronic sensors previously introduced into each box, and strategically placed to provide a complete description of the temperature distribution.

The distribution of boxes inside the chamber was strategically designed to provide the same heat and air flow around each one. Three external thermo sensors provided the temperature behaviour of the chamber. Wired boxes were placed in the environmental chamber and submitted to the temperature cycles described below. The temperature was recorded at 60 second intervals.

Technical specifications for the chamber and data loggers were as follows: Test Chamber: Inventory #MI-EQ-123 (#3), Manufacturer: Thermotron; IRTD probe: Inventory #MI-EQ-220, Manufacturer: Kaye; Constant Temperature Bath: Inventory #MI-EQ-326, Manufacturer: Lauda; Temperature logger and thermocouples: Inventory #MI-EQ-328, Manufacturer: Techmatron. This system was composed of 64 thermocouples connected to four 16-channel thermocouple input boards with an onboard microprocessor that handled cold junction compensation, gain and offset calibration, scaling and thermocouple linearization. The thermocouple input boards were mounted in a computer.

Testing Protocol Design

Figure 23:
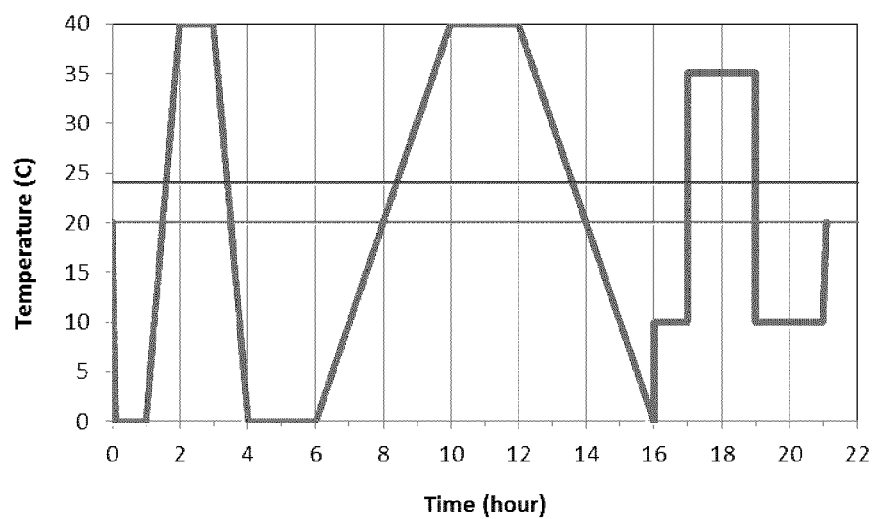
FIG. 23 shows a schematic representation of the three temperature cycles used in performance testing on cardboard boxes.

Three different testing protocols were performed in order to evaluate performance of our test nanostructured PCM formulations under different environmental conditions (a schematic representation of the three temperature cycles is shown in FIG. 23).

For the first cycle, temperature was stabilized at 0° C. for one hour and then temperature was increased (for a period of one hour) up to 40° C. A stabilization time at 40° C. for one extra hour was performed. This cycle was intended to show the behaviour of the test formulation in summer conditions, at a low-paced heating rate. Next, temperature was decreased down to 5° C. (for a period of one hour) followed by a stabilization time at 0° C. for one hour. This process showed the test formulation's behaviour in winter conditions.

For the second cycle, temperature was stabilized at 0° C. for one more hour and then temperature was increased very slowly (over a period of four hours) up to 40° C. A stabilization time at 40° C. for two extra hours was provided. This cycle was intended to show the behaviour of the test formulation in summer conditions at a very low-paced heating rate. Next, temperature was decreased down to 0° C. (for a period of four hours). This process showed the test formulation's behaviour in winter conditions.

For the third cycle, temperature was stabilized at 10° C. for one hour and then temperature was rapidly increased up to 35° C., followed by a stabilization time of two hours. This process showed the behaviour of the test formulation in summer conditions when a box is carried from a conditioned room to an external environment. Next, temperature was rapidly decreased back to 10° C., followed by a stabilization time of two hours. This process showed the behaviour of the test formulation in winter conditions when a box is carried from a conditioned room to an external environment.

Test Results

Figure 24:
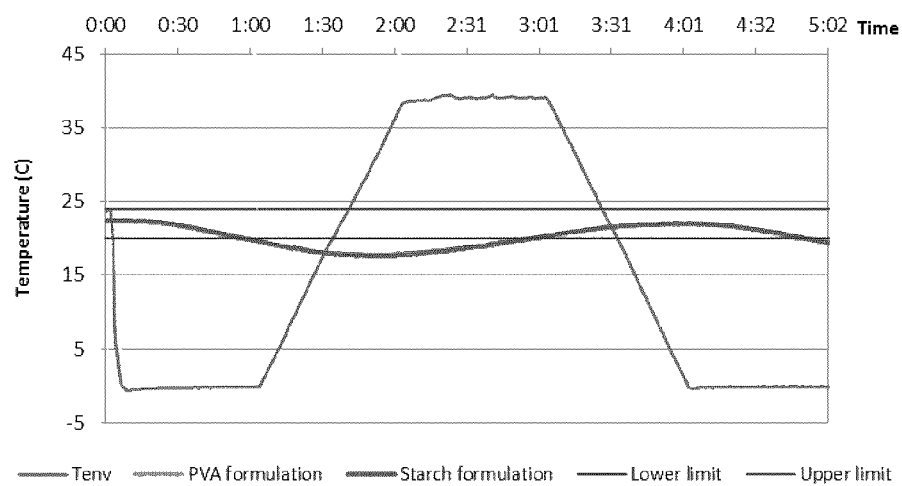
FIG. 24 shows behavior of the temperature inside the cardboard boxes (purple line) under a 5 hour temperature cycle in an environmental chamber. Temperature profile shows that coated papers acted as a thermal buffer, keeping the temperatures inside the desired limits, during the time of the experiment.

Test results from the first cycle are shown in FIG. 24. FIG. 24 shows that after 1 hour 50 minutes at 24° C. (including one hour at 40° C.), the dummy product's temperature inside the boxes coated with the PCM nanoemulsion never exceeded 22.5° C., showing that the formulation worked very well at hot temperatures. However, on the cooling side, after 50 minutes at 0° C. the temperature inside the box had dropped below 20° C., arriving at a minimum of 17.6° C. one hour after. This clearly showed that the formulation worked well, but thermal buffering wasn't sufficient to keep the temperature inside the limits of 20-24° C.

It is noted that these results may be due to the fact that exothermic processes are generally slower than endothermic ones, as well as the fact that the difference between the lower limit of the specifications and the lowest temperature tested (20 degrees) was bigger than the difference between the upper limit of the specifications and the highest temperature tested (16 degrees). These factors could affect heat release and absorption.

Figure 25:
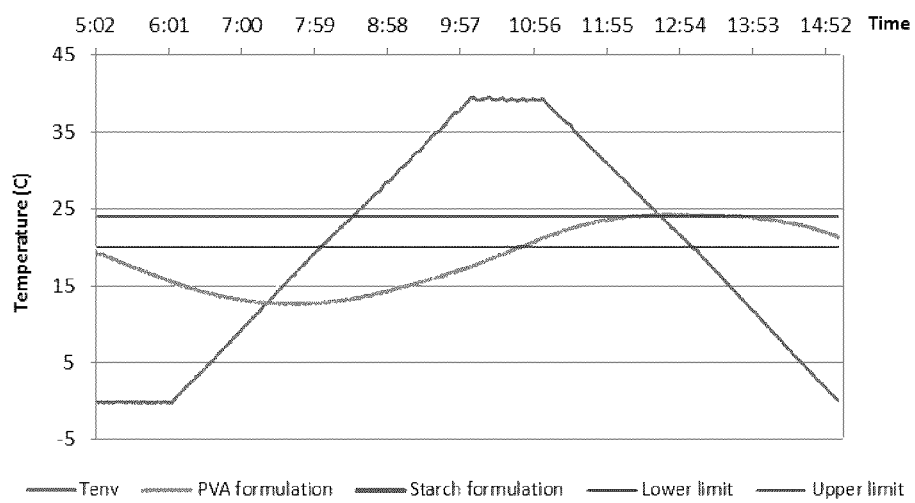
FIG. 25 shows behavior of the temperature inside the cardboard boxes (purple line) under 10 hours in an environmental chamber. Temperature profile shows that coated papers acted as a thermal buffer, keeping the temperatures inside the desired limits, during most of the time of the experiment.

Test results from the second cycle are shown in FIG. 25. FIG. 25 shows that even after 4 hours at temperatures higher than 24° C. (including two hours at 40° C.), the dummy product's temperature inside the box never exceeded 24° C. These results show that the test formulation working very well for heat absorption. At the same time, on the cooling side, the dummy product's temperature continued decreasing (from the previous cycle), reaching a minimum of 12.7° C. after four hours below 20° C. (including two hours at 0° C.).

Figure 26:
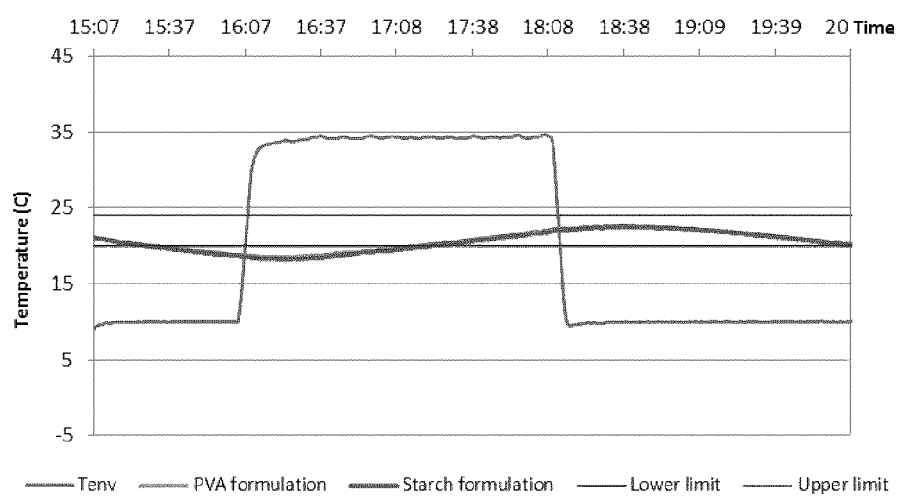
FIG. 26 shows behavior of the temperature inside the cardboard boxes (purple line) under a 5 hour temperature cycle, with fast temperature changes, in an environmental chamber. Temperature profile shows that coated papers acted as a thermal buffer, keeping the temperatures inside the desired limits, during the time of the experiment.

Test results from the third cycle are shown in FIG. 26. FIG. 26 shows that the test formulation worked very well for both heat absorption and heat release, managing to buffer the external temperature and keep it within the limits of 20-24° C. (or at least very close to the limits). As for the first two cycles, despite the extreme tested, the test formulation performed as expected, protecting the dummy product inside the box and buffering the temperature, both in hot conditions as well as in extreme cool conditions. Under conditions of 10-35° C., a smaller deviation was seen on the heat-releasing side, perhaps due to a slower response at cool temperatures.

Figure 27:
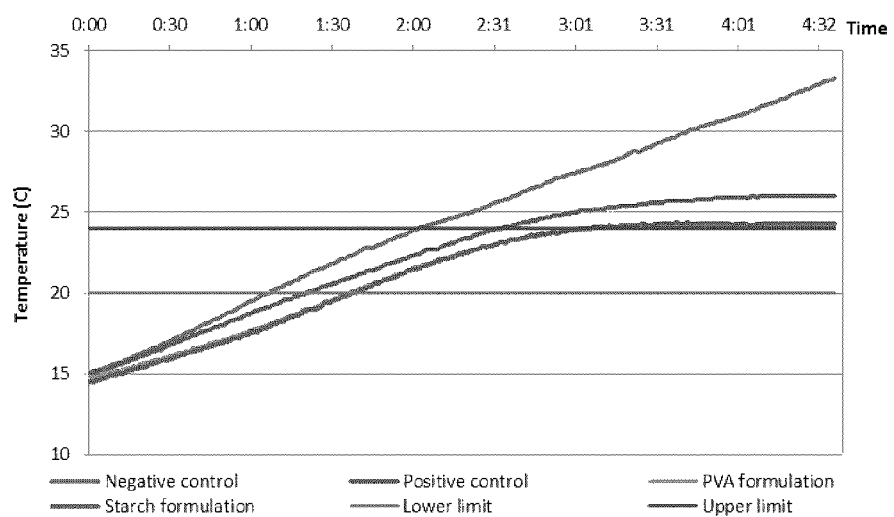
FIG. 27 shows the temperature profile inside different cardboard boxes during a 5 hour temperature cycle in an environmental chamber. Green line shows a normal cardboard box. Blue/purple lines show the temperature behaviour inside boxes coated with the indicated PCM formulations. Temperature profile shows that coated papers acted as a thermal buffer, keeping the temperatures inside the desired limits, during the time of the experiment.
Figure 28:
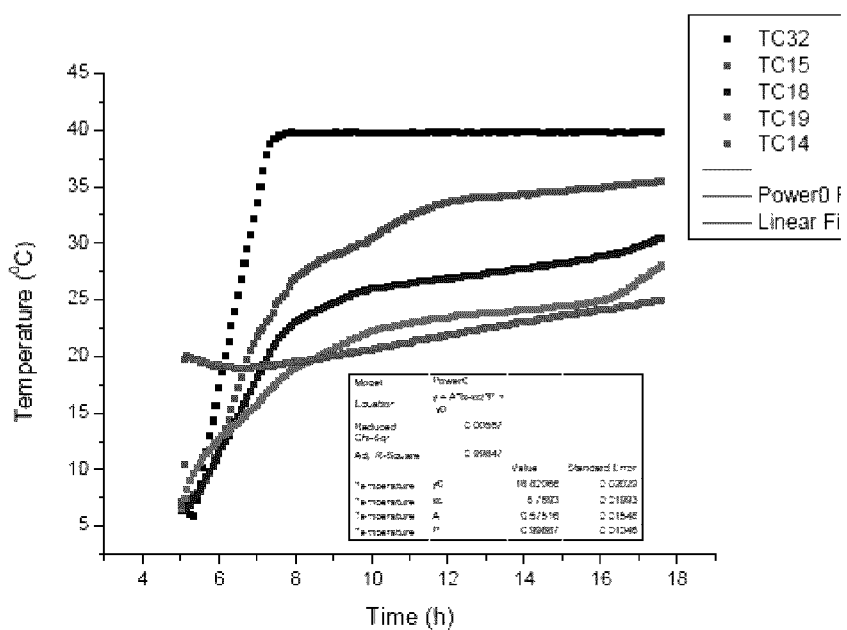
FIG. 28 shows temperature-time recordings of different probes placed differentially from the outside wall to the payload. There is shown a temperature profile of different points inside and outside of a cardboard box, during a 12 hour temperature cycle in an environmental chamber. TC14: a temperature sensor on the dummy product surface; TC15: a temperature sensor on the top surface inside the box; TC18: a temperature sensor on the inner side of the dummy product; TC19: a temperature sensor between dummy product piles; TC32: a temperature sensor measuring the environmental temperature. Temperature profiles in the indicated time window show that coated papers acted as a thermal buffer, preventing the temperature inside the boxes from rising as fast as the environmental temperature, during the time of the experiment.
Figure 29:
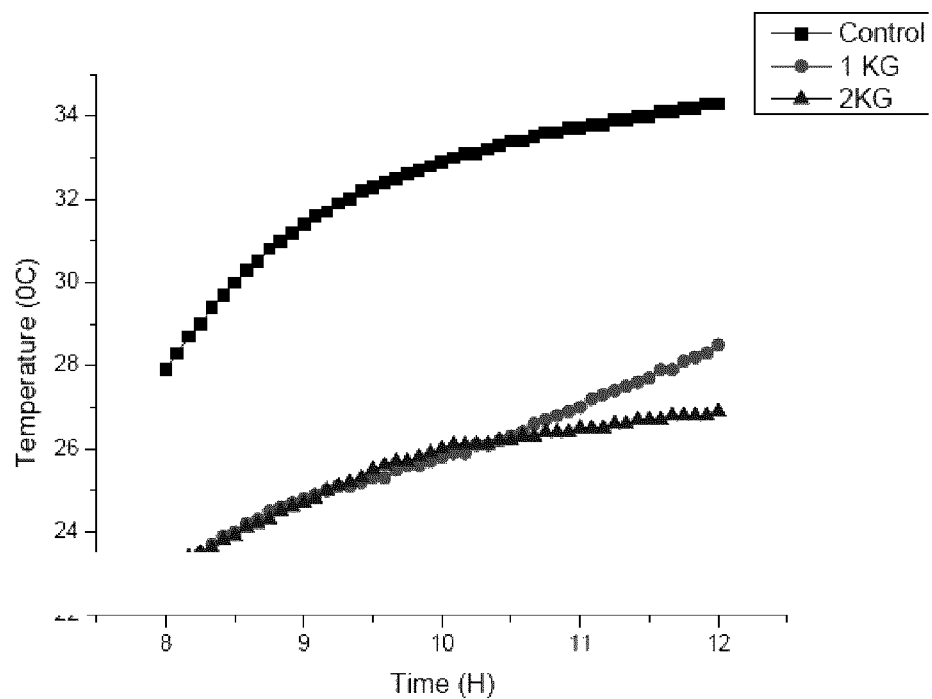
FIG. 29 shows a comparison of a control box vs. a coated box for a specific time window. There is shown a comparison of temperature profiles between a control box (Box No. 1) and coated boxes (Boxes No. 2 and 3) for a specific time window. Box No. 1: negative control; Box No 2: a box containing 1 kg of thermal buffering nanostructured PCM coated on paper; Box No 3: a box containing 2 kg of thermal buffering nanostructured PCM coated on paper. Temperature profiles in the time window show that coated papers acted as a thermal buffer, preventing the temperature inside the boxes from rising as fast as the environmental temperature, during the time of the experiment.
Figure 30:
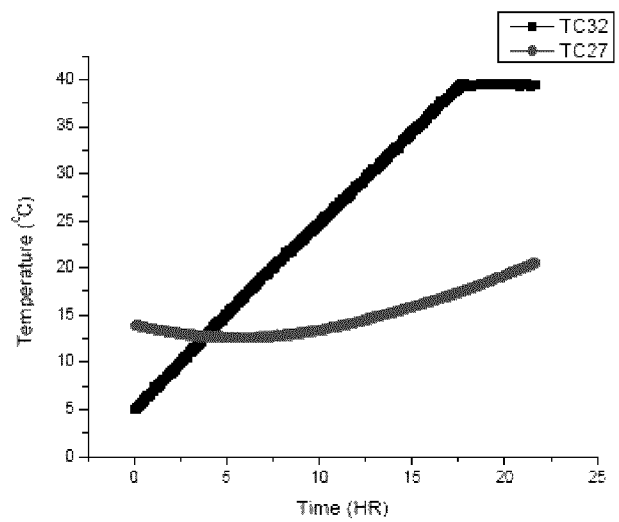
FIG. 30 shows enlarged views of FIG. 28 for specific time windows, as indicated. In (A) is shown a comparison of temperature profiles between the environment and Box No. 3, for a specific time window. In (B) is shown a comparison of temperature profiles between the environment and Box No. 2, for a specific time window. TC32: a temperature sensor measuring the environmental temperature; TC27: a temperature sensor on the inner side of the dummy product in Box No. 3; TC15: a temperature sensor on the top surface inside the box of Box No. 2; TC18: a temperature sensor on the inner side of the dummy product of Box No. 2; TC19: a temperature sensor between dummy product piles in Box No. 2. Temperature profiles in the time window show that coated papers acted as a thermal buffer, preventing the temperature inside the boxes from rising as fast as the environmental temperature, during the time of the experiment.
Figure 30:
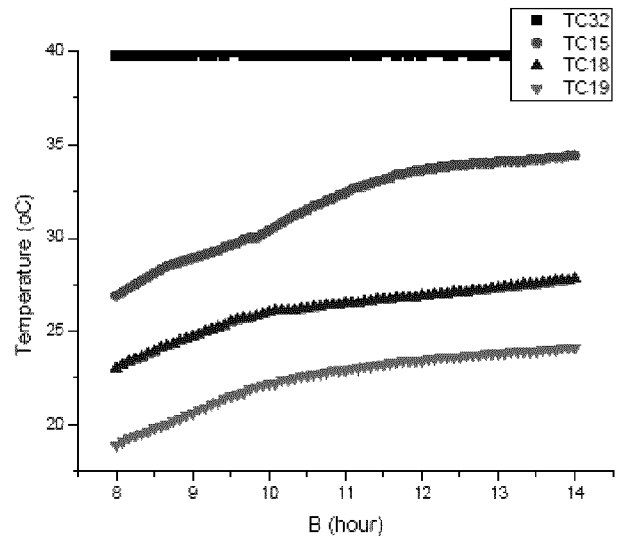
Figure 31:
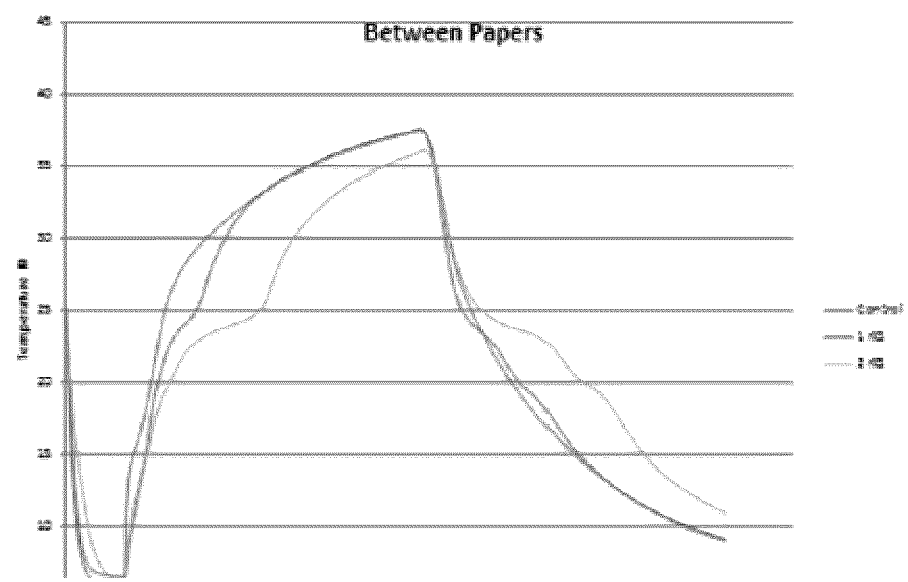
FIG. 31 shows the temperature profile of the three tested boxes (Box. Nos. 1-3), during a 24 hour temperature test in the environmental chamber. Total recording for the three boxes showed a total buffering capacity of 18-24 hours. Red line: 1 kg; Green line: 2 kg; Blue line: Control.

FIG. 27 shows a comparison with positive and negative controls. Thermo-buffering behavior can be clearly observed in the graph shown in FIG. 27. The temperature of the negative control box rose steadily during heating, whereas the positive control box and test formulation boxes reached a plateau at the desired temperatures. Unfortunately, the positive control didn't work at the same precise temperature as the test formulations, and for this reason the graph goes slightly out of limits.

FIGS. 28 to 31 show the temperature profile of different points inside and outside of a cardboard box, during a 12 hour temperature cycle in an environmental chamber. Temperature profiles in the different time windows show that coated papers (containing different loads) acted as a thermal buffer, preventing the temperature inside the boxes from rising as fast as the environment temperature, during the time of the experiment. Three polyurethane-insulated boxes were prepared placing identical amounts of stacked papers in each internal face of the box. Each box was loaded with stacked papers of the same weight and size, in order to compare our formulations to a positive and a negative control. Inside each box, several thermo sensors were placed as shown in order to get sufficient data from different locations, inside and outside the box.

Three boxes were prepared as follows:

(1) First box: This was the negative control. A total amount of 160 uncoated sheets of paper (21 cm×29.7 cm) per box, were stacked and introduced into the box along with 5 plastic bags containing a total amount of 4 L of milk, acting as a dummy product. This box showed the performance that an untreated box (with the same amount of paper as insulation) delivered under the test conditions, and gave us a clear indication of how well our formulation performed compared with paper, which acted as passive insulation.

(2) Second box: This box contained a test nanostructured PCM formulation. We introduced into the box the same amount of paper sheets with the same specifications as in the first box, as well as the same amount of dummy product. Paper sheets were coated with a test nanostructured PCM formulation which was compatible with vinyl-based glues, containing a water based poly(vinyl alcohol) solution and fatty acid ester mixture (80% methyl palmitate/20% methyl stearate) in a nanoemulsion, totaling 1 kg of nanoemulsion coated.

(3) Third box: This box contained a test nanostructured PCM formulation. We introduced into the box the same amount of paper sheets with the same specifications as in the first and second boxes, as well as the same amount of dummy product. Paper sheets were coated with the same test nanostructured PCM formulation as in box two, but this time totaling 2 kg of nanoemulsion coated.

Performance testing was performed in environmental chambers with temperature control. The three boxes were introduced into an environmental chamber and tested under the same environmental conditions. Thermal behaviour of the boxes was tracked using thermal electronic sensors previously introduced into each box, and strategically placed to provide a complete description of the temperature distribution.

The distribution of boxes inside the chamber was strategically designed to provide the same heat and air flow around each one. Three external thermo sensors provided the temperature behaviour of the chamber. Wired boxes were placed in the environmental chamber and submitted to the temperature cycle described below. The temperature was recorded at 60 second intervals.

Technical specifications for the chamber and data loggers were as follows: Test Chamber: Inventory #MI-EQ-123 (#3), Manufacturer: Thermotron; IRTD probe: Inventory #MI-EQ-220, Manufacturer: Kaye; Constant Temperature Bath: Inventory #MI-EQ-326, Manufacturer: Lauda; Temperature logger and thermocouples: Inventory #MI-EQ-328, Manufacturer: Techmatron. This system was composed of 64 thermocouples connected to four 16-channel thermocouple input boards with an onboard microprocessor that handled cold junction compensation, gain and offset calibration, scaling and thermocouple linearization. The thermocouple input boards were mounted in a computer.

Testing Protocol Design

Temperature was stabilized at 0° C. for four hours and then temperature was increased (for a period of two hours) up to 40° C. A stabilization time at 40° C. for twelve hours was performed. This cycle was intended to show the behaviour of the test formulation in summer conditions, at a high-paced heating rate.

In sum, the performance testing in climate chambers showed efficient thermal buffering by test nanostructured PCM formulations. Flatlining of the temperature curves at designated temperatures indicated a distinct PCM-buffering effect. The test boxes were able to thermally buffer the contents in the indicated temperature ranges for at least 18 hours.

Based on our calculations (not shown), about 34-50 double-coated sheets of paper, or slightly over 2 kg of coating, should provide thermal buffering for 24 hours. It is expected that the grammage of coating used for a 24-hour buffering effect can be reduced to as little as 800-900 grams per box by: a) incrementally increasing total heat capacity by 10 J/g to 200 J/g, e.g., by reducing concentration of emulsifiers in the test formulation. A heat capacity increase of 5% is expected to increase total buffering capacity by an extra 7 hours; b) packing the box contents better, as the buffering effect is felt more on the walls and less on the dummy product in the middle of the box (a 4 degree difference). A fully packed box is expected to show better buffering properties; and/or c) increasing slightly the amount of grams per layer and coating double layers instead of single layers. In addition, simply placing a layer of two of laminates in the middle of the box could provide a significant increase in buffering time. In contrast, paper alone did not insulate the contents of the box, but provided only a passive, bulk insulation effect when a critical mass of papers were stacked together (about 30 or more).

Our results indicate that nanostructured PCMs can provide efficient thermal buffering for a multitude of thermal buffering applications.

Although this invention is described in detail with reference to embodiments thereof, these embodiments are offered to illustrate but not to limit the invention. It is possible to make other embodiments that employ the principles of the invention and that fall within its spirit and scope as defined by the claims appended hereto.

The contents of all documents and references cited herein are hereby incorporated by reference in their entirety.

What is claimed is:

1. A nanocomposite phase-change material (PCM), the PCM comprising at least one phase-change polymer and a nanocrystalline filler having a high aspect ratio, wherein the at least one phase-change polymer and the nanocrystalline filler interact together non-covalently, and wherein the phase-change polymer undergoes a solid-solid phase transition or an endothermic phase transition at a desired transition temperature; wherein heat absorption of the phase-change polymer is not substantially adversely affected by the nanocrystalline filler or is increased by the nanocrystalline filler; and wherein at least about 50 J/g of heat is absorbed or released during the solid-solid phase transition;

wherein the phase-change polymer has the following structure:

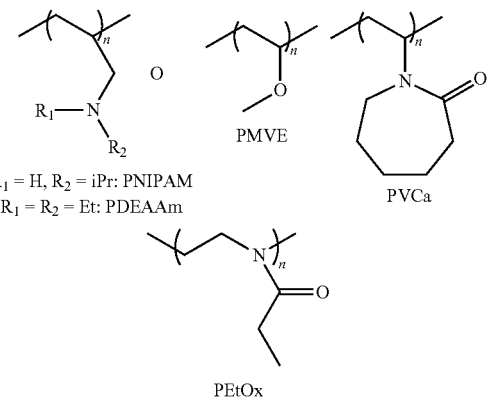

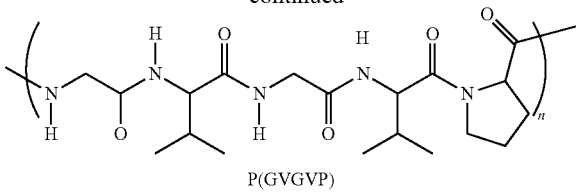

P(GVGVP)

wherein n is selected such that the phase-change polymer undergoes a solid-solid phase transition at about 30-39° C., 35-37° C., 20-24° C., 20-25° C., 25-30° C., 35-40° C., or 33-40° C.

2. The nanocomposite PCM of claim 1, wherein the endothermic phase transition is a coil-to-globule transition.

3. The nanocomposite PCM of claim 1, wherein the nanocrystalline filler increases heat capacity of the phase-change polymer by at least about 5%.

4. The nanocomposite PCM of claim 1, wherein about 50-200 J/g, at least about 100 J/g, or at least about 150 J/g of heat is absorbed or released during the solid-solid phase transition.

5. The nanocomposite PCM of claim 1, wherein $1<n<1000$.

6. The nanocomposite PCM of claim 1, wherein the nanocrystalline filler is nanocrystalline cellulose (NCC), a clay, a nanocrystalline starch, a nanoclay, a carbon nanotube, an organic nanoclay, or an organoclay.

7. The nanocomposite PCM of claim 6, wherein the organoclay is montmorillonite, bentonite, kaolinite, hectorite, or halloysite.

8. The nanocomposite PCM of claim 1, wherein the nanocrystalline filler reflects IR radiation.

9. The nanocomposite PCM of claim 1, wherein the nanocrystalline filler is Poly(γ-benyzl glutamate).

10. The nanocomposite PCM of claim 1, wherein the PCM comprises no more than about 5% nanocrystalline filler by weight, or wherein the PCM comprises no more than about 3 wt %, about 5 wt %, about 8 wt %, about 5-8 wt %, about 10 wt %, or about 25 wt % of nanocrystalline filler, or wherein the PCM comprises about 5 wt % to about 25 wt % nanocrystalline filler.

11. The nanocomposite PCM of claim 1, wherein the phase-change polymer is dispersed in the nanocrystalline filler to form a solid solution.

12. A thermoregulatory coating on a substrate comprising the nanocomposite PCM of claim 1.

13. The thermoregulatory coating of claim 12, wherein the coating further comprises an additional layer comprising a sweat solubilization agent.

14. The thermoregulatory coating of claim 13, wherein the sweat solubilization agent is xylitol, maltitol, sorbitol, erythritol, or starch.

15. The thermoregulatory coating of claim 12, wherein the coating further comprises an additive for water absorption and/or a IR-reflective component or layer and/or a solar-heat reflective component or layer.

16. The thermoregulatory coating of claim 12, wherein the substrate is a textile or a packaging material.

17. An article comprising the thermoregulatory coating of claim 12, wherein the article is a cooling garment or a material for food packaging.

18. The article of claim 17, wherein the material for food packaging is a material for packaging chocolate.

19. The article of claim 17, wherein the material for food packaging is a paper or cardboard box.

\* \* \* \* \*